(12) United States Patent
Rivere et al.

(10) Patent No.: US 12,332,959 B2
(45) Date of Patent: Jun. 17, 2025

(54) MOBILE WORKFORCE WORKFLOW AUTOMATION DATA STRUCTURE

(71) Applicant: MOBIWORK, LLC, Boca Raton, FL (US)

(72) Inventors: Hervé Rivere, Boca Raton, FL (US); Bijoy Abraham, Boynton Beach, FL (US); Dinesh Kumbham, Boynton Beach, FL (US)

(73) Assignee: MOBIWORK, LLC, Boca Raton, FL (US)

( * ) Notice: Subject to any disclaimer, the term of this patent is extended or adjusted under 35 U.S.C. 154(b) by 207 days.

(21) Appl. No.: 18/228,188

(22) Filed: Jul. 31, 2023

(65) Prior Publication Data

US 2025/0045337 A1     Feb. 6, 2025

(51) Int. Cl.
*G06F 16/9537* (2019.01)
*G06F 3/0482* (2013.01)
*G06F 3/04845* (2022.01)

(52) U.S. Cl.
CPC ........ *G06F 16/9537* (2019.01); *G06F 3/0482* (2013.01); *G06F 3/04845* (2013.01)

(58) Field of Classification Search
CPC . G06F 16/9537; G06F 3/0482; G06F 3/04845
See application file for complete search history.

(56) References Cited

U.S. PATENT DOCUMENTS

| | | | |
|---|---|---|---|
| 8,971,853 B2 | 3/2015 | Rivere | |
| 8,977,236 B2 | 3/2015 | Rivere | |
| 9,123,005 B2 | 9/2015 | Rivere | |
| 9,228,843 B2 * | 1/2016 | Rangarajan | H04W 24/08 |
| 9,740,999 B2 | 8/2017 | Rivere | |
| 9,818,074 B2 | 11/2017 | Rivere | |
| 11,800,317 B1 * | 10/2023 | Dugar | H04W 4/021 |
| 2002/0133470 A1 * | 9/2002 | Gruber | G06Q 10/087 |
| | | | 705/76 |
| 2009/0170482 A1 * | 7/2009 | Alessio | H04M 3/42221 |
| | | | 455/414.1 |
| 2012/0089432 A1 * | 4/2012 | Podgurny | G06Q 10/06311 |
| | | | 705/7.13 |
| 2015/0286788 A1 * | 10/2015 | Arkoff | G16H 40/20 |
| | | | 705/2 |

(Continued)

*Primary Examiner* — Daniel W Parcher
(74) *Attorney, Agent, or Firm* — Robert C. Kain, Jr.; Scott D. Smiley; The Concept Law Group, P.A.

(57) ABSTRACT

Mobile work force (MF) workflow automation data structure (ADS) uses a cloud-based or web-based server coupled to a data store. Stored, dynamic and security-siloed MF-user personal profile (UPP) and customer UPPs feed main menu and sub-menu datasets for MF worker cell-phone-type devices. A MF vendor back-office has an assigned MF worker scheduling dashboard. The ADS system is a series of menus, sometimes sequentially tied together and at other times hierarchically linked for MF user selectable and actuatable menus. Downloaded menu datasets react to MF worker inputs resulting in uploaded MF datasets to the server. For each job/task/project "Type," initially configured in ADS data store, the ADS provides downloadable datasets to multiple mobile MF servicing multiple customers at diverse destinations for a MF vendor, all supported by the vendor's secured data store.

18 Claims, 54 Drawing Sheets

(56) References Cited

U.S. PATENT DOCUMENTS

| | | | |
|---|---|---|---|
| 2018/0165642 A1* | 6/2018 | Krieg | G06F 9/44 |
| 2018/0276591 A1* | 9/2018 | Kim | G06Q 10/063114 |
| 2019/0137290 A1* | 5/2019 | Levy | B60Q 1/507 |
| 2021/0365680 A1* | 11/2021 | Mossberg | G06Q 10/08 |
| 2022/0067670 A1* | 3/2022 | Beshidze | G06Q 10/20 |
| 2022/0092521 A1* | 3/2022 | Hunter | G06F 40/205 |
| 2023/0266749 A1* | 8/2023 | Kanai | G05B 23/027 |
| | | | 700/108 |
| 2023/0351316 A1* | 11/2023 | Sperau | G06Q 10/0833 |

* cited by examiner

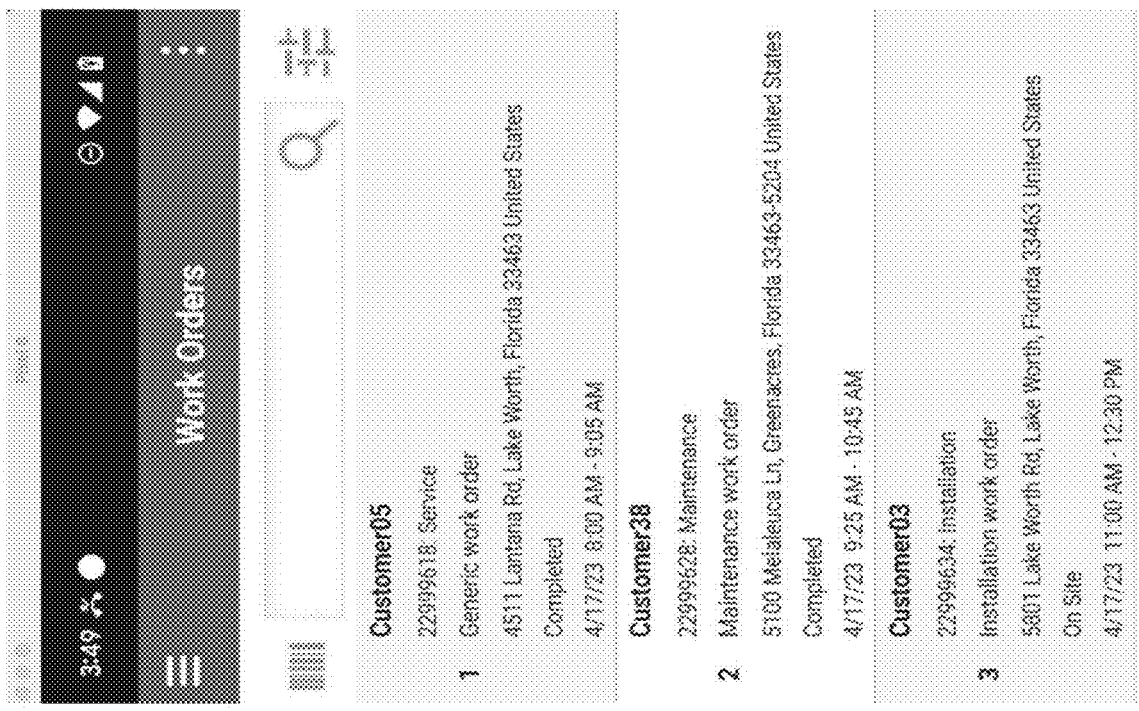
Fig. 1 Worker Assigned Job/Project/Task Menu

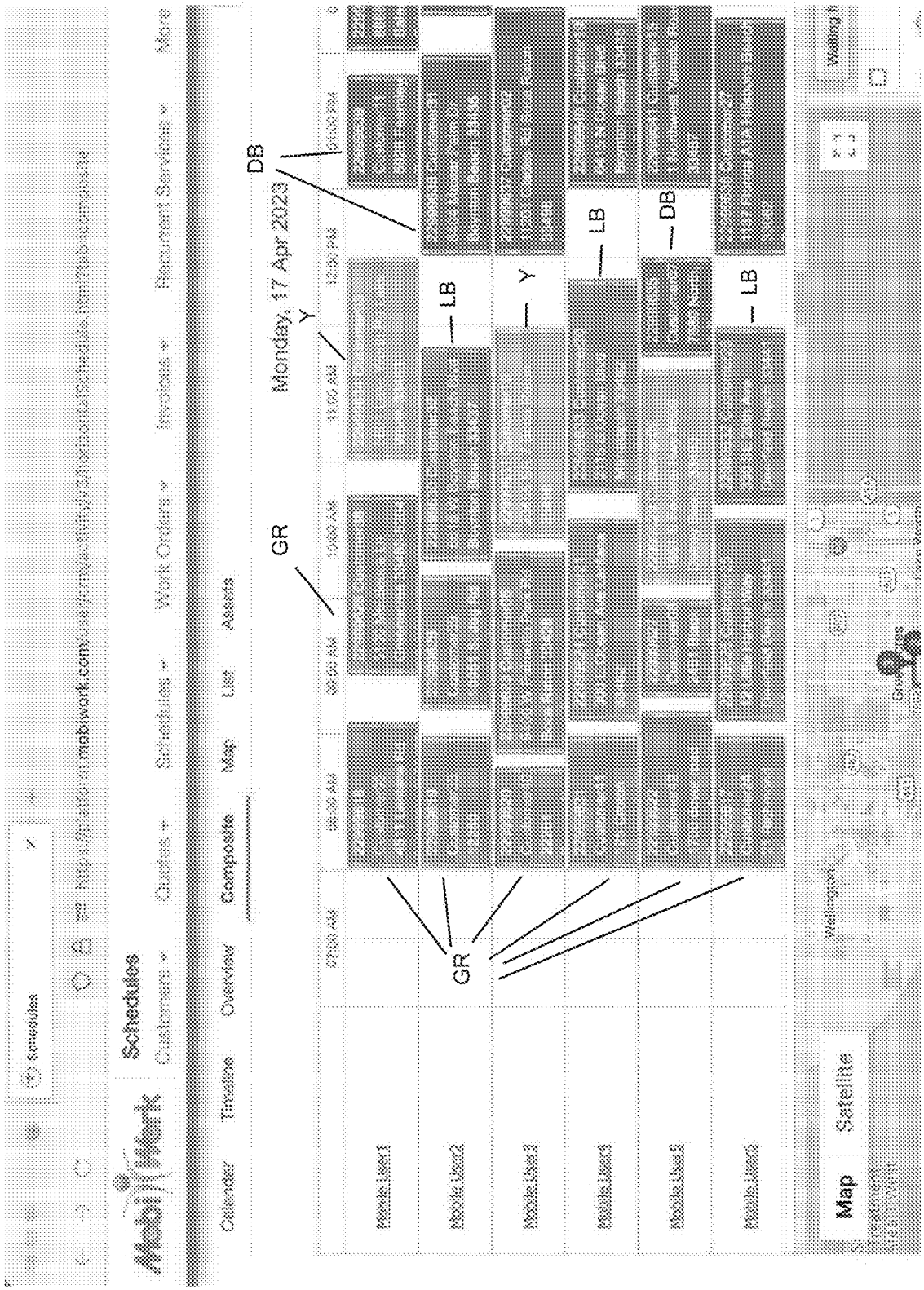
FIG. 2 Transit Data Structure (TDS) Backend dashboard showing worker schedules

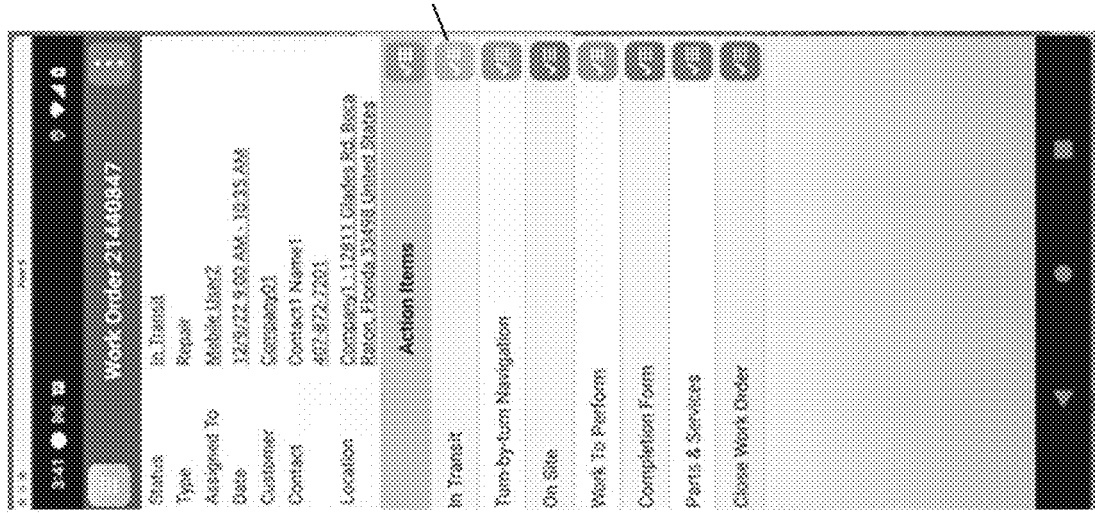
Fig. 4 Worker Main Menu for Repair (In Transit)
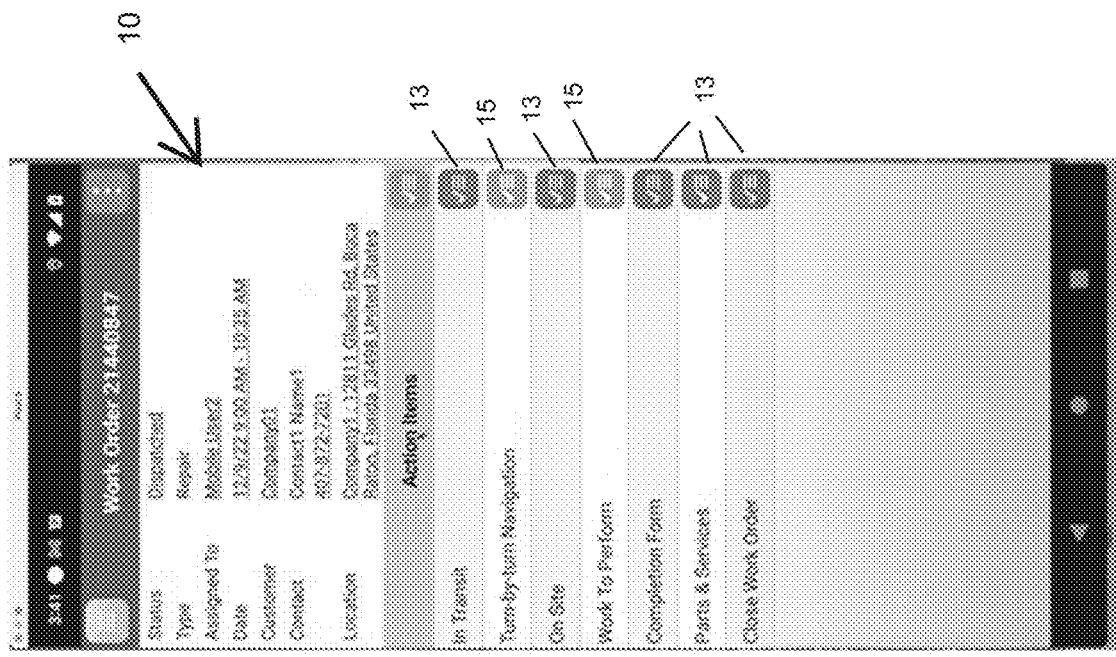
Fig. 3 Worker Main Menu for Repair (Dispatched)

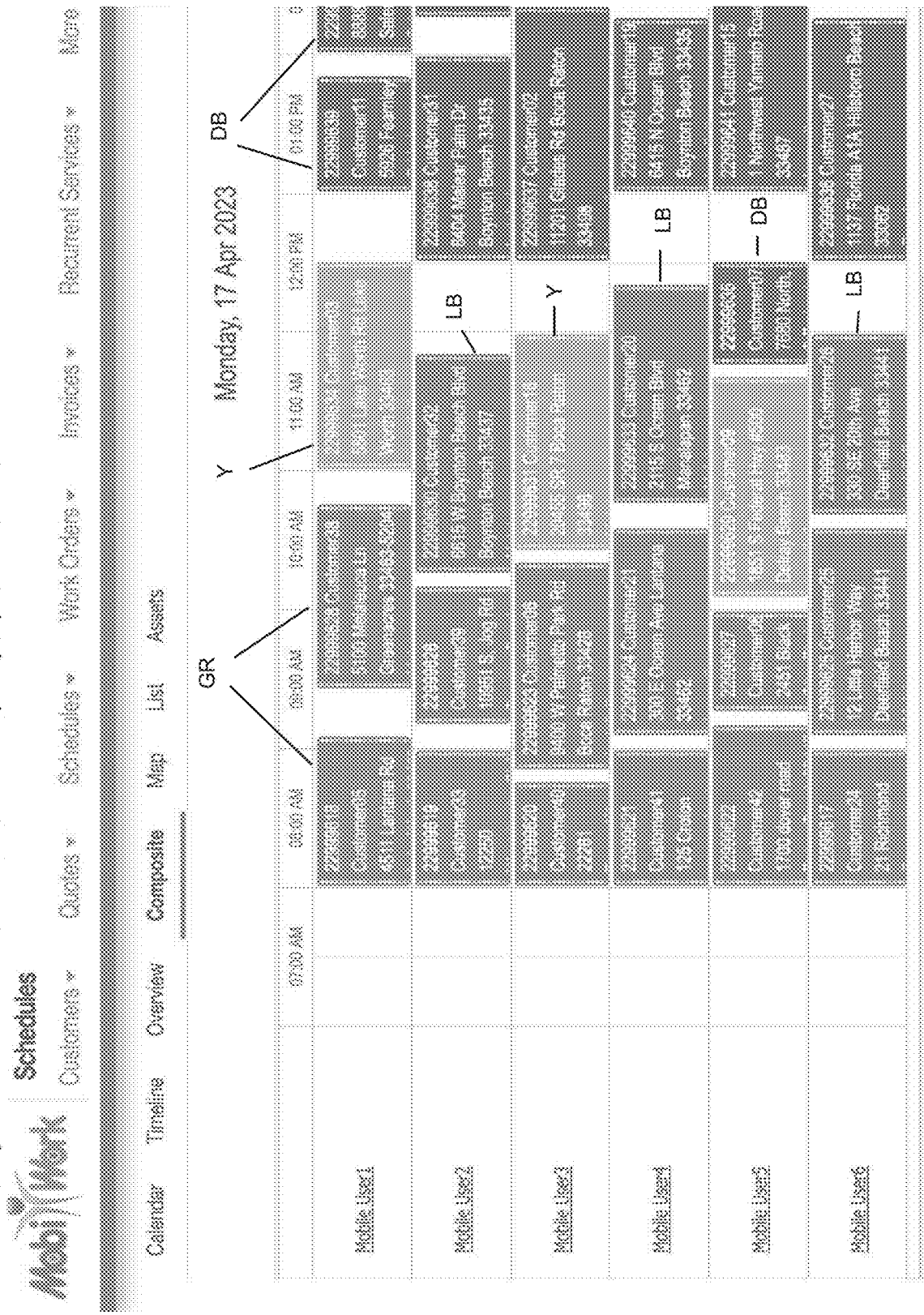

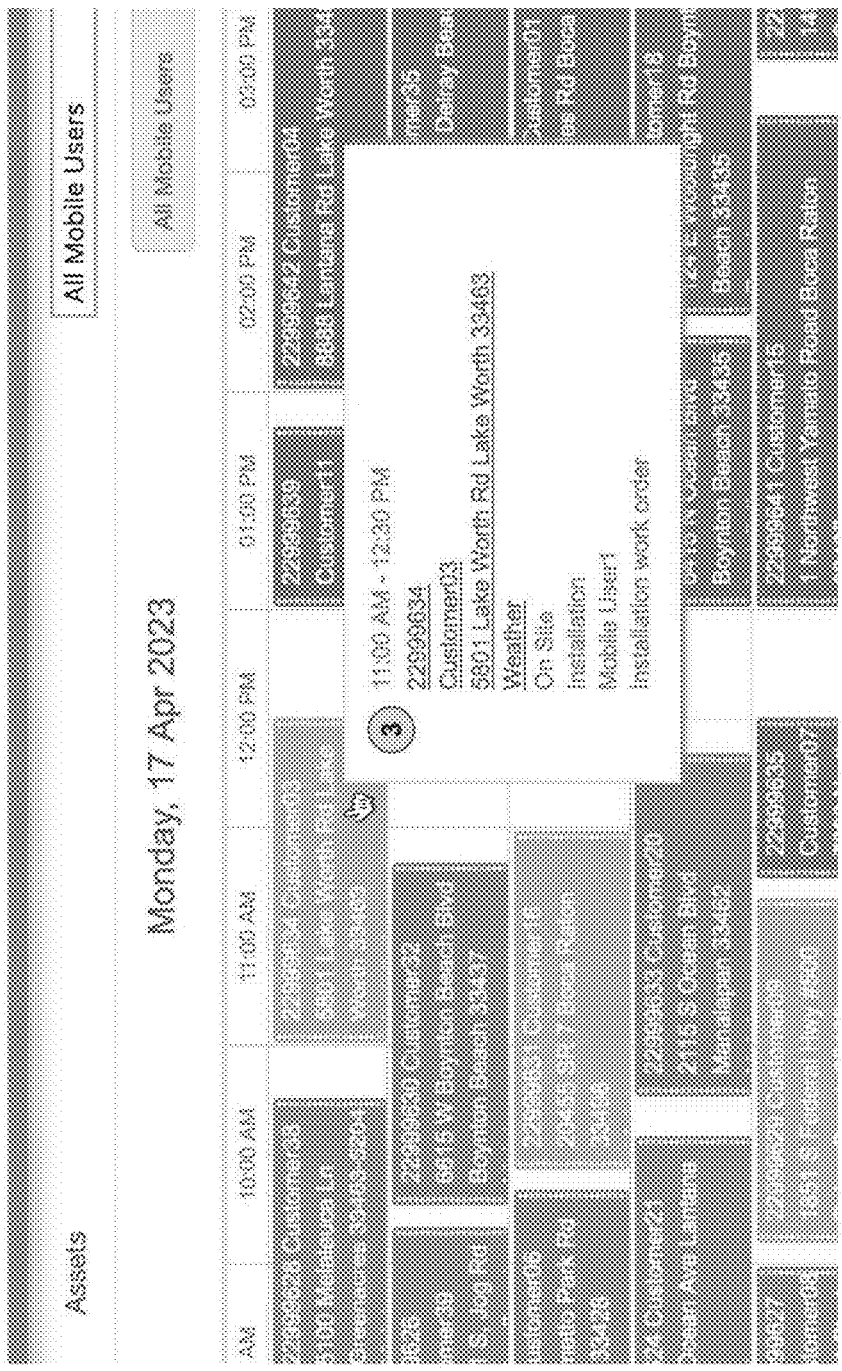
FIG. 5B TDS Backend Dashboard (In Sync) with Popup Display and Current ACTION ITEM FIG. 6 TDS Backend Sub-Menu for worker time tracking
| Time Tracking | | | | |
|---|---|---|---|---|
| Name | Billable hours | Non-billable hours | Total hours | Action |
| Employee Able | | | | |
| Employee Backer | | | | |
| Employee Charles | | | | |
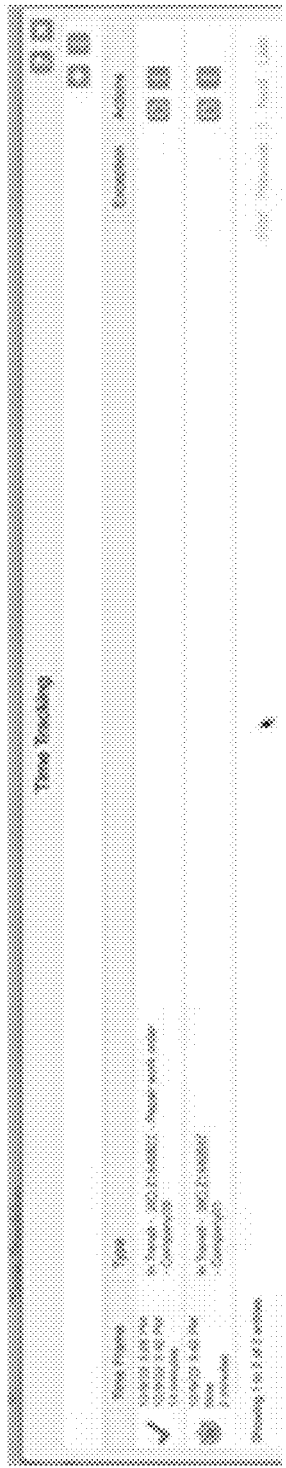
FIG. 7 Worker Selected Data from TDS Backend Worker Tracking Sub-Menu (check mark: in transit, Clock ON)

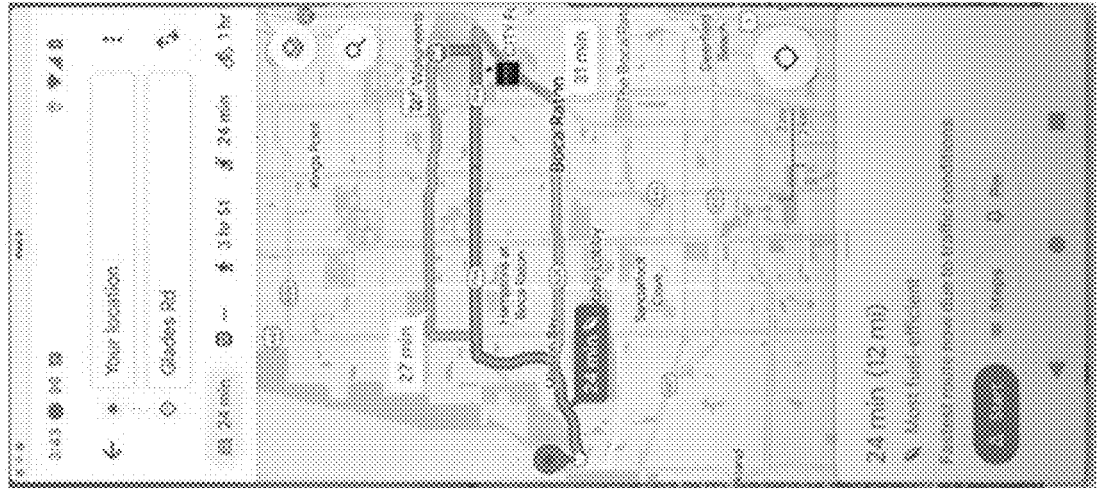
FIG. 8B Navigation Selected - Navi Displayed
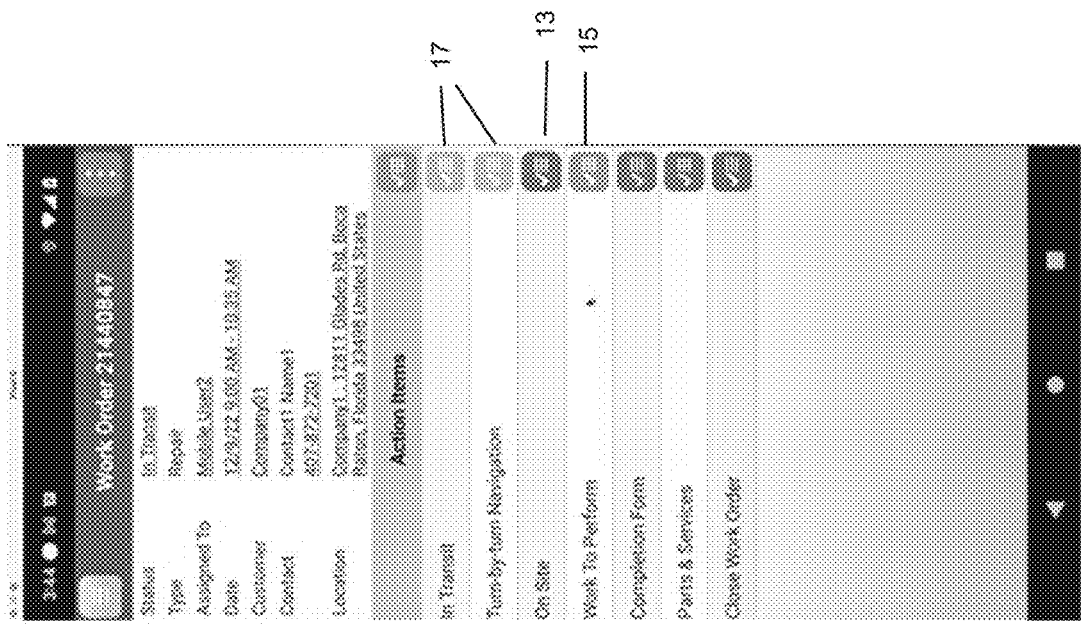
FIG. 8A Worker Main Menu Navigation Selected
(Green icon: in-transit and Navi activated)

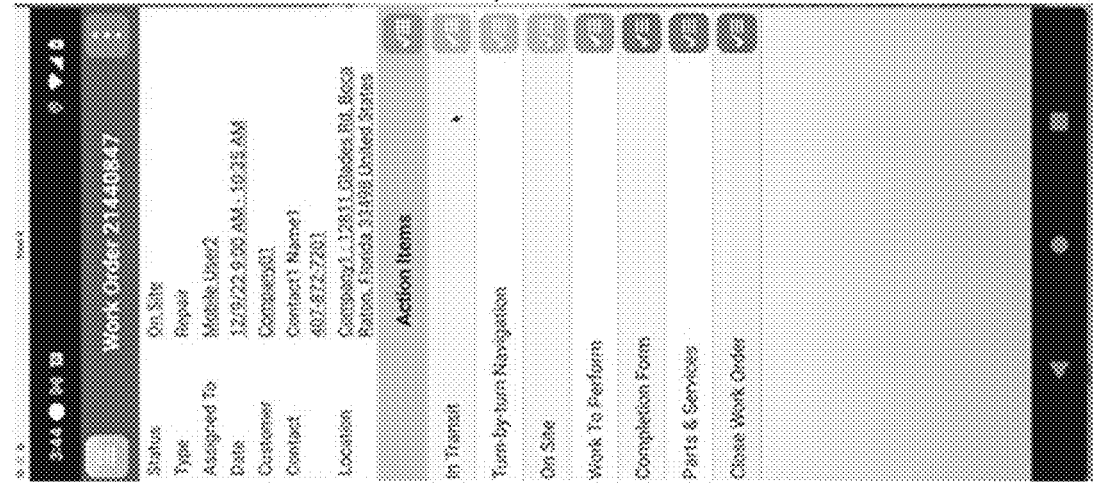
FIG. 9A Worker Main Menu ON Site to be selected (Red icon: to be selected)
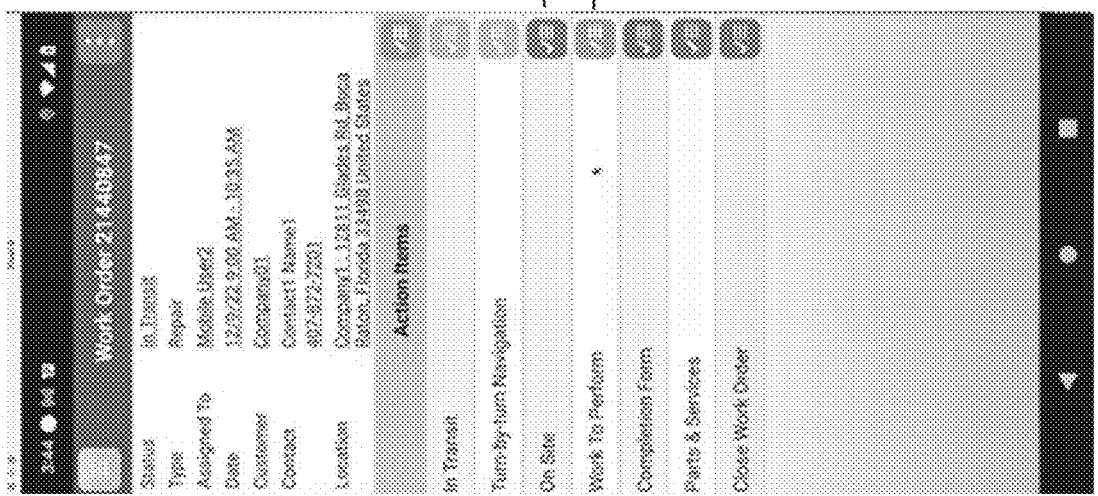
FIG. 9B Worker Main Menu ON SITE Selected (Green icon: on site indicator ON)

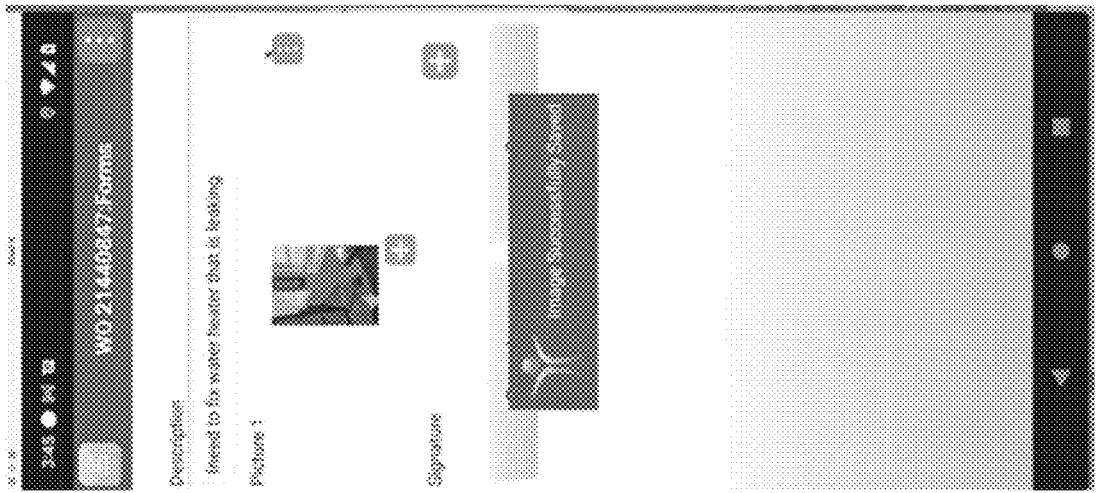
FIG. 10B Work to Perform Sub-Menu (photo)
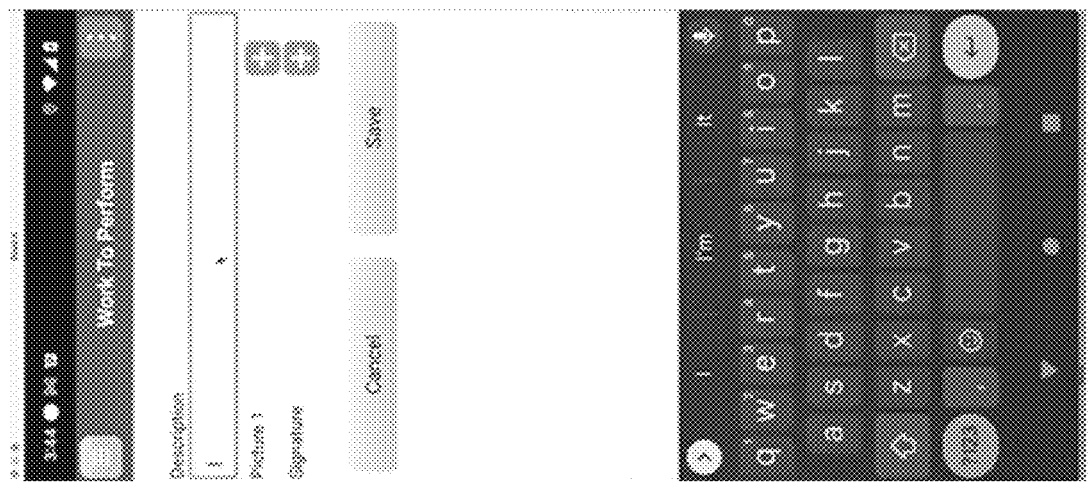
FIG. 10A Work to Perform Sub-Menu (Worker input text Description)

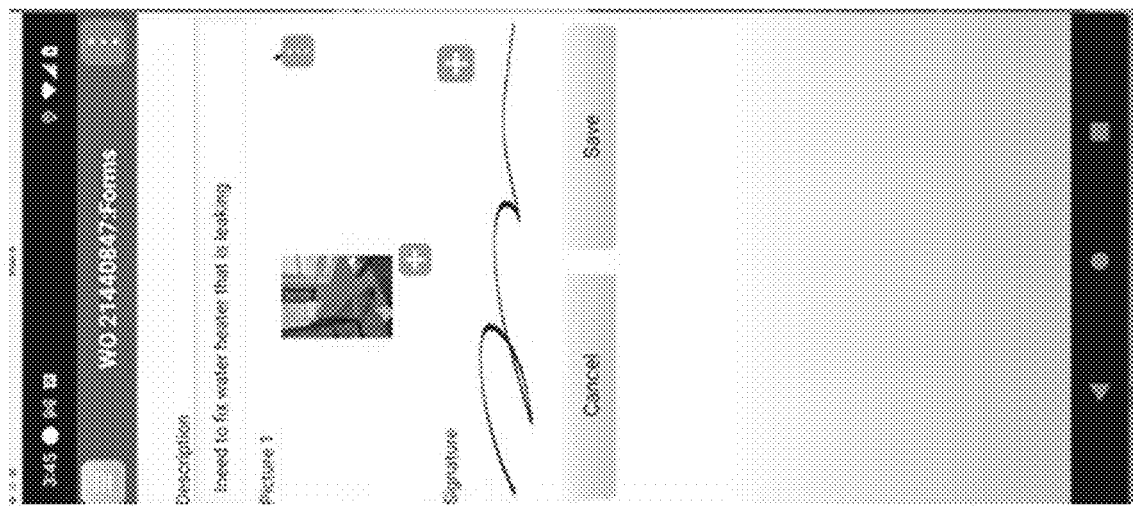

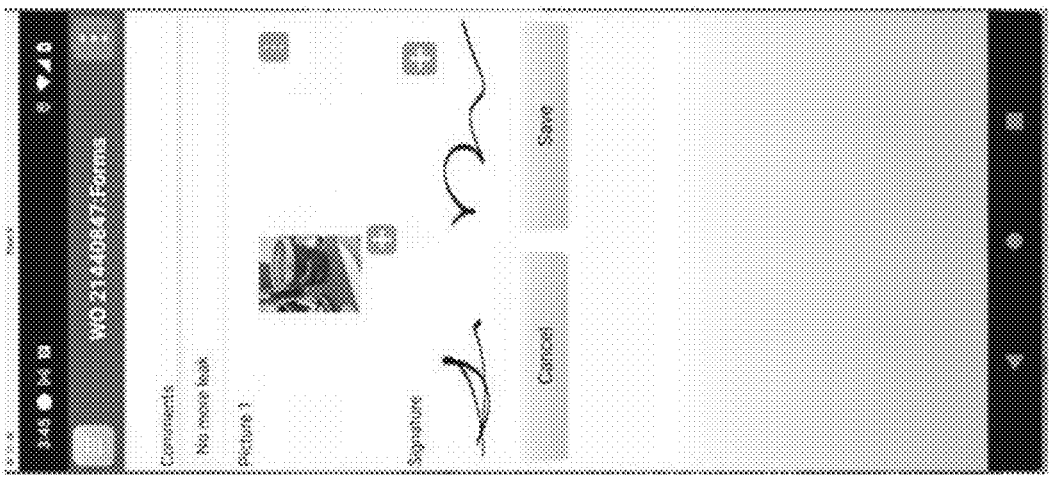
FIG. 11 Completion Form Selected from Worker Main Menu (worker comment text input description, completion photo and customer signature)

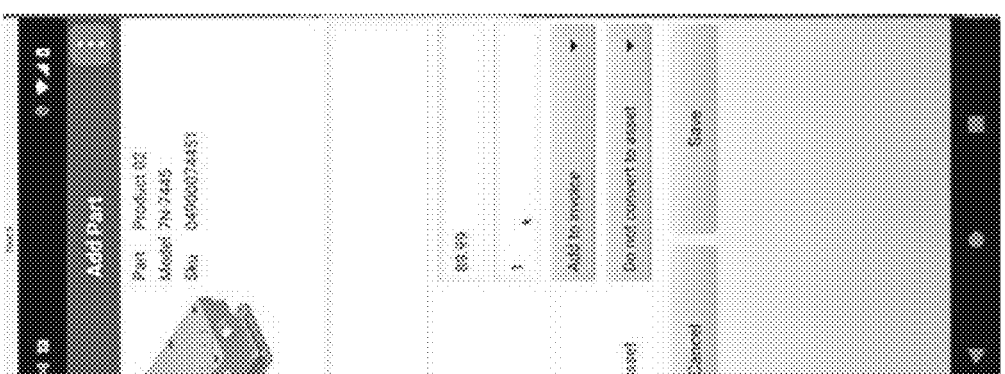
FIG. 12B Part Details after Selecting Part from ADD PARTS Sub-Menu
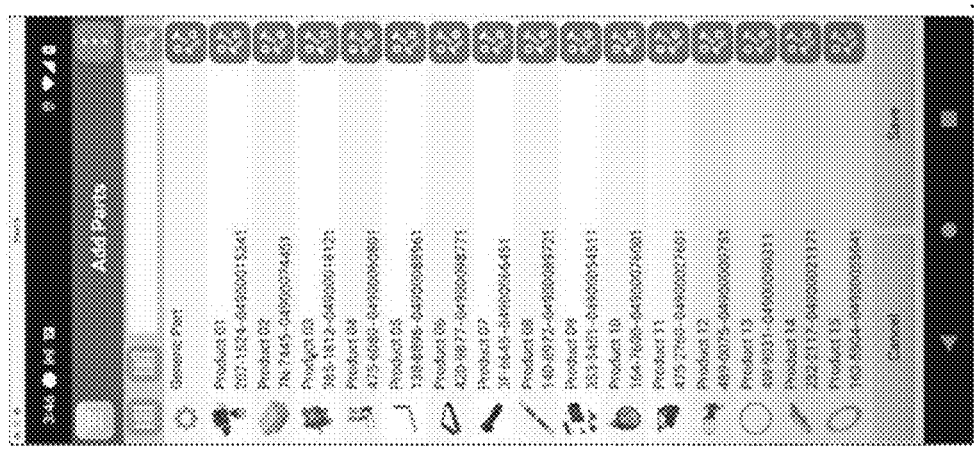
Fig. 12A Add Parts Sub-Menu from Parts and Services Selection

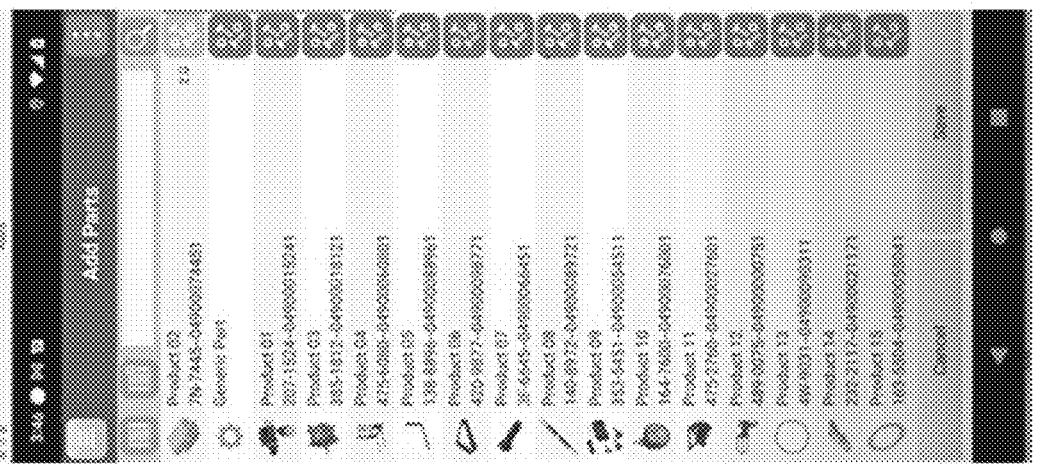
FIG. 12C Add Parts Sub-Menu After Selection of Part (light gray (green) indicating selected Part; dark gray (red) indicating non-selected part)

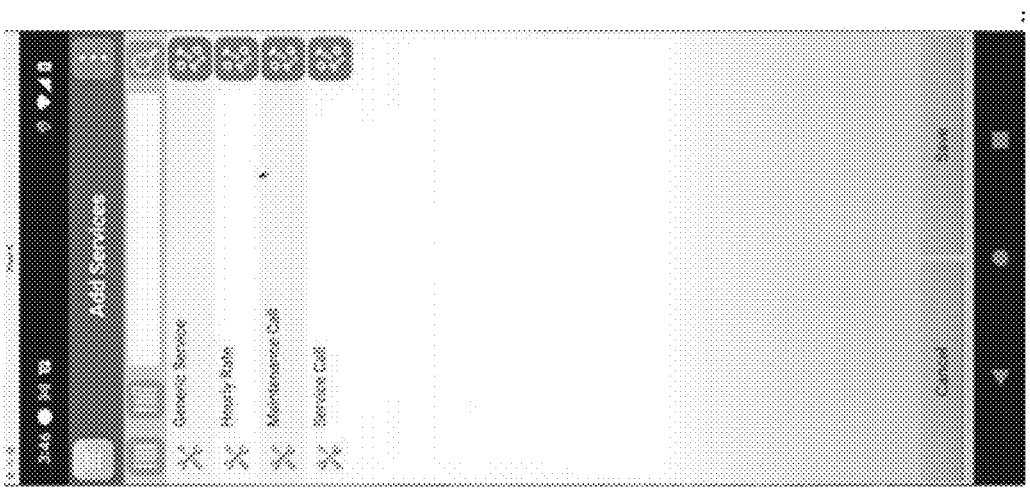
FIG. 14 ADD SERVICES Sub-Menu
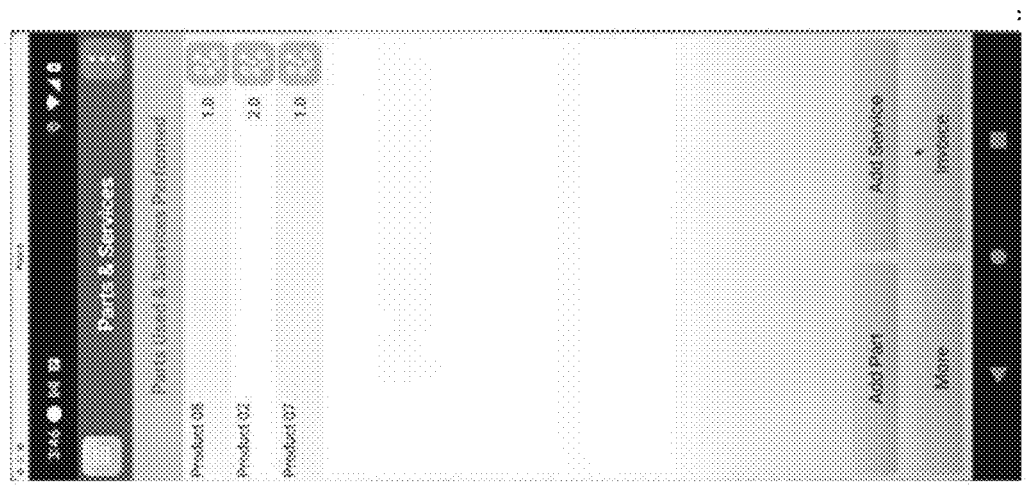
FIG. 13 List of Parts Added by Worker

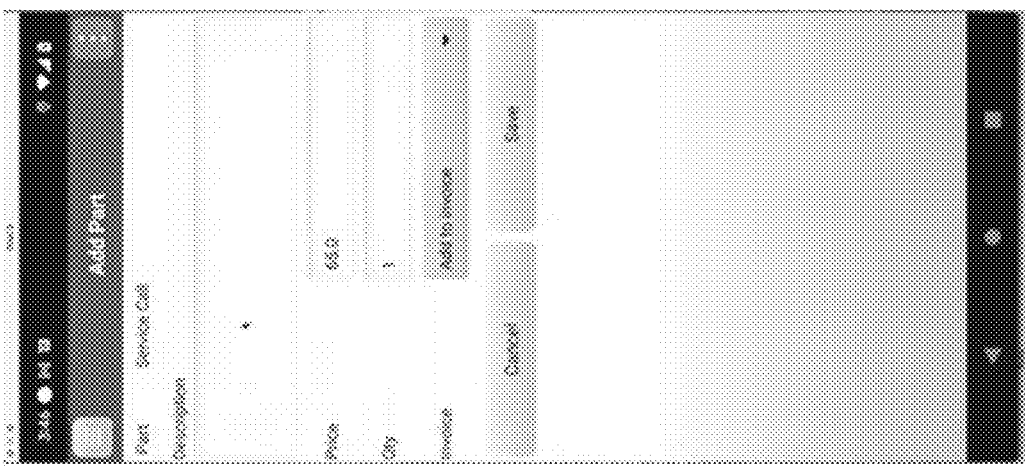
FIG. 15 Service Call Selected in ADD SERVICES Sub-Menu (textual input)

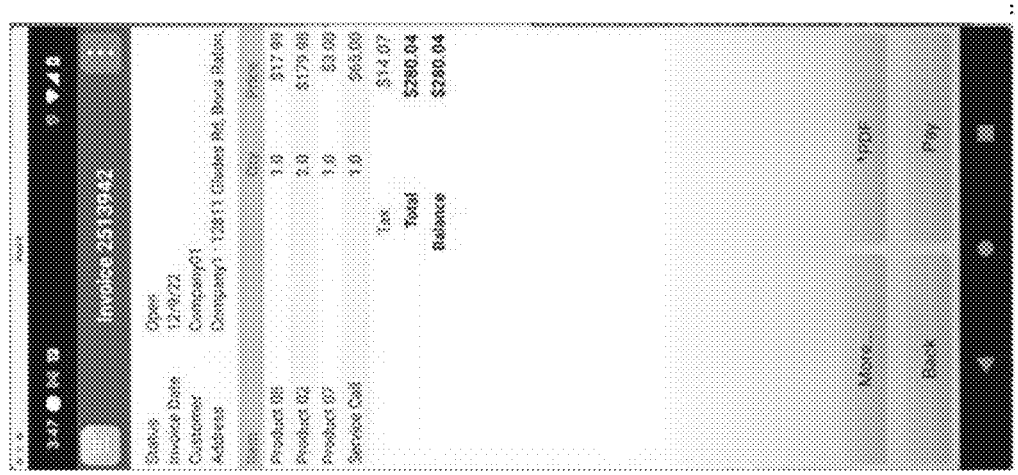
FIG. 17 Invoice Selected showing parts and services on proposed invoice
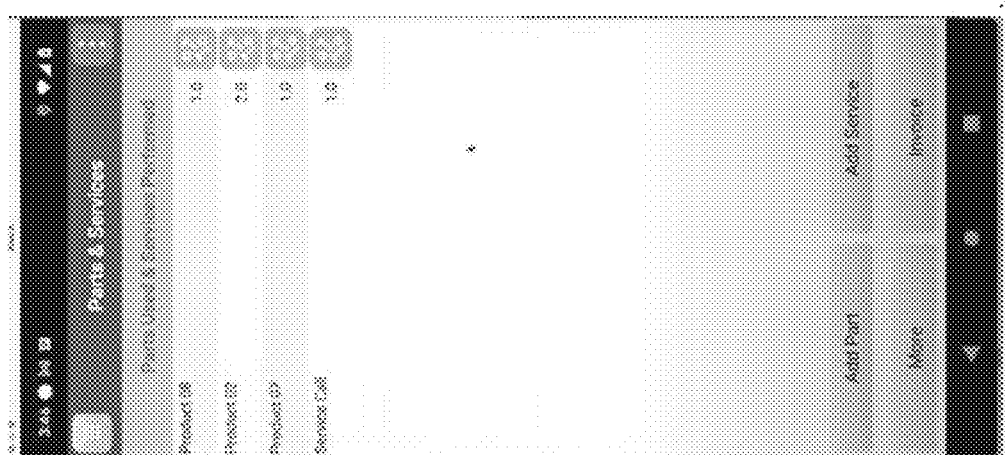
FIG. 16 Parts and Services Screen compiled parts and services from ADD PARTS/SERVICES Sub-Menu

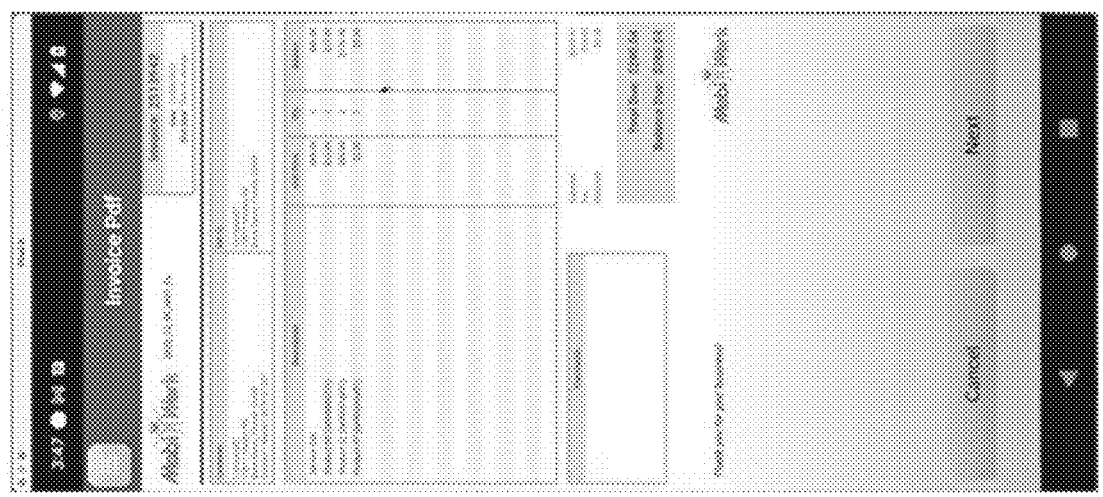
FIG. 18 PDF Selected showing parts and services, fees and costs on PDF formatted invoice

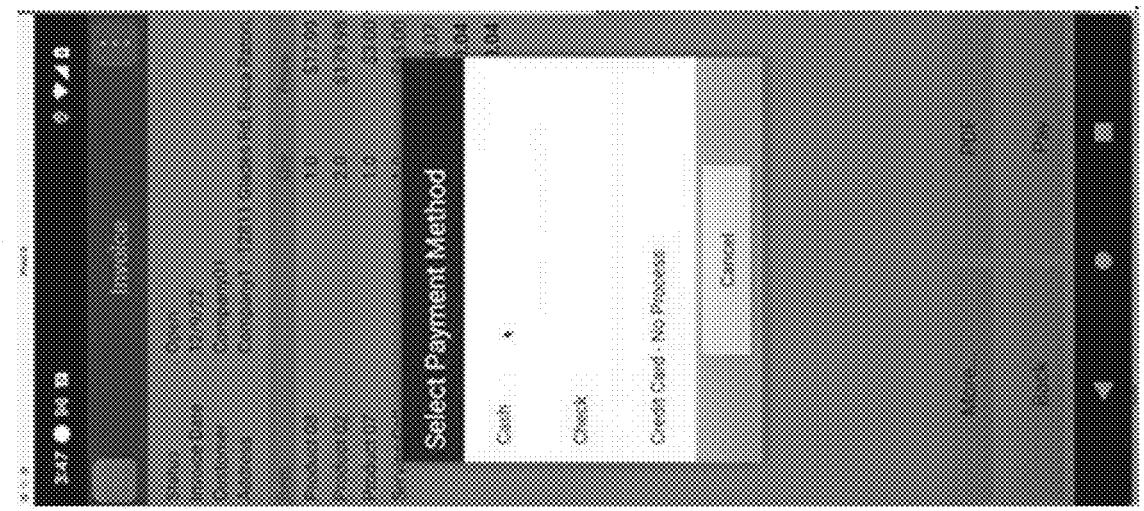
FIG. 20 Selected PAY: Types of Payment options
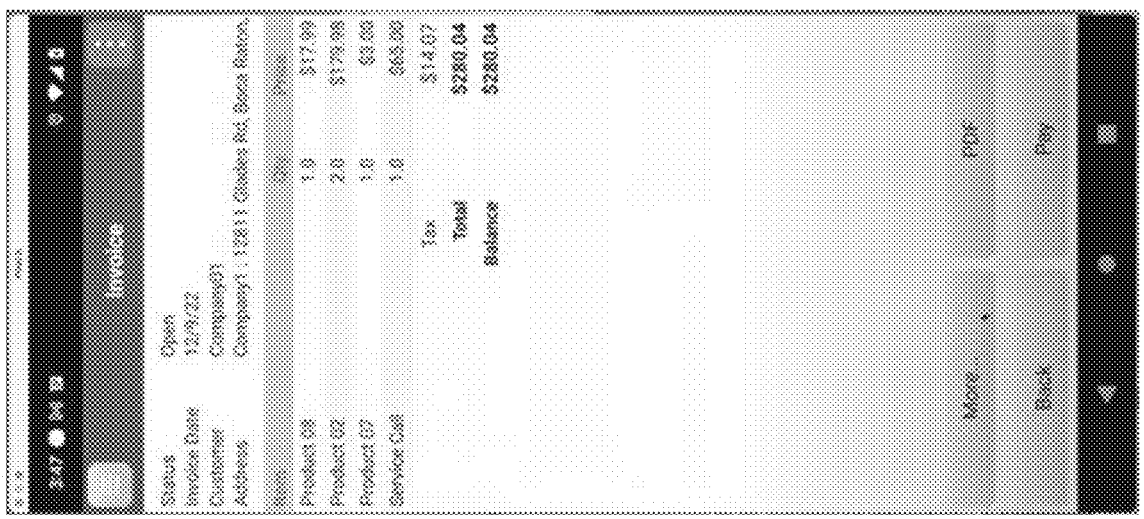
FIG. 19 Selected Proposed Invoice (select of invoice)

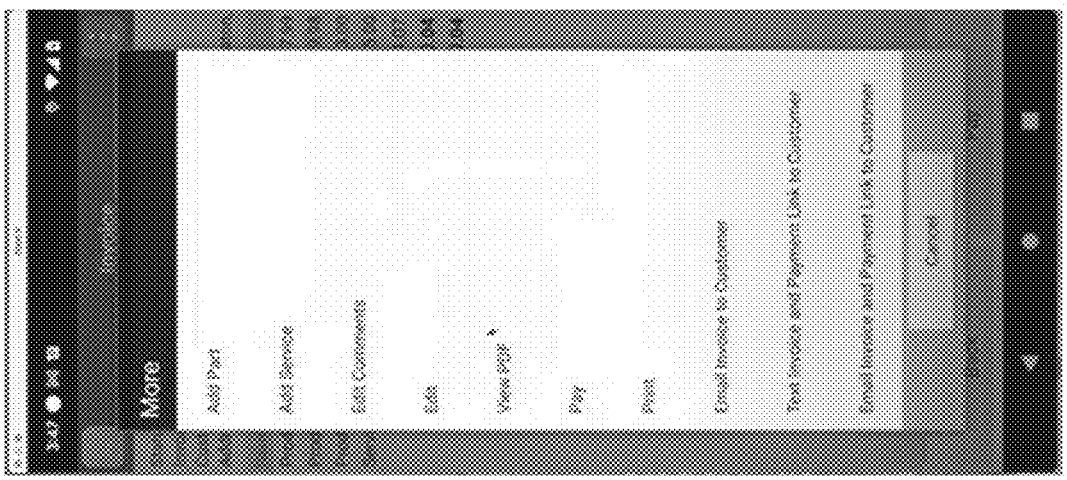
FIG. 21 Selected MORE option, Additional Menu Options ("Parts and Services" sub-menu structure)

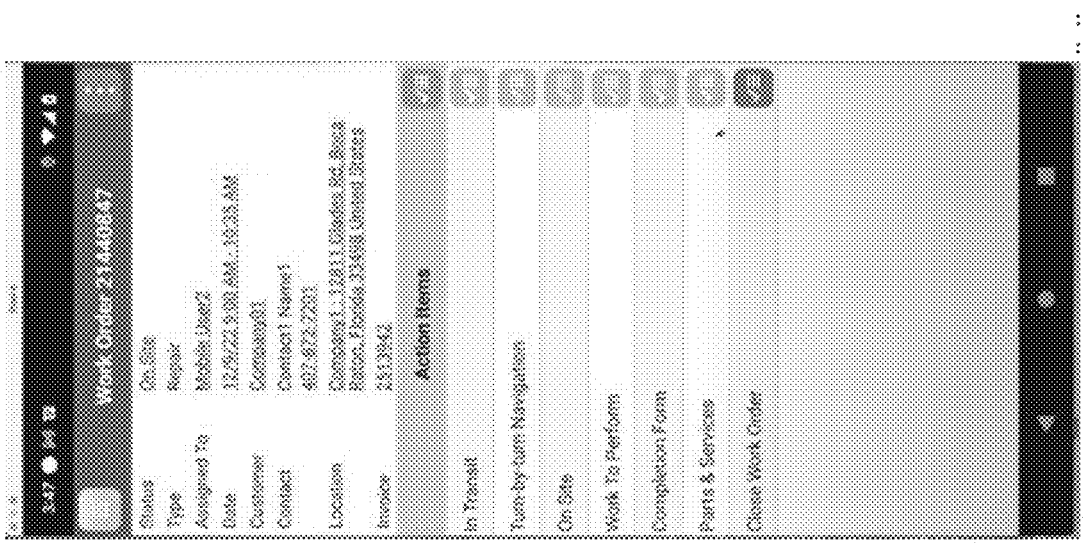
FIG. 22 Worker Main Menu: Close Work Order task

FIG. 23 After Selection of Close Work Order, Worker's Work Order list: (#2 next, others dispatched, closed/completed)

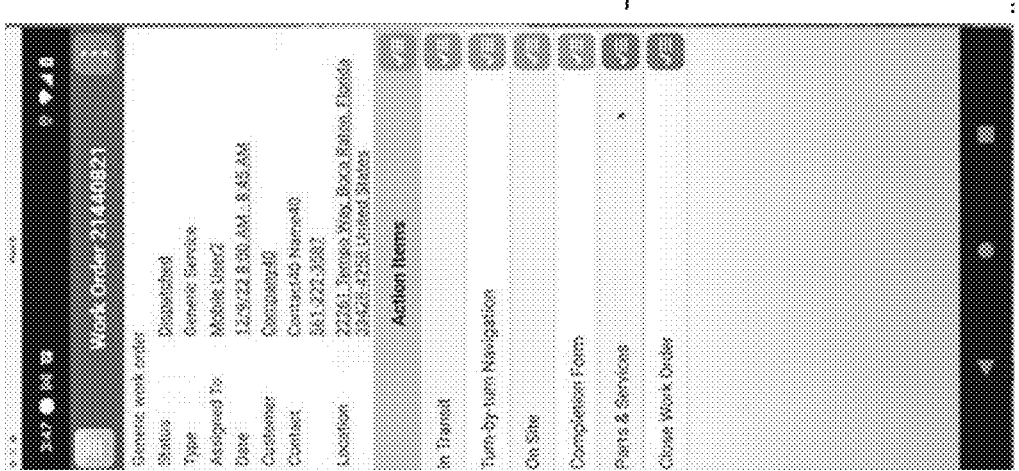
FIG. 24 Worker Main Menu Generic Service, Status: Dispatched

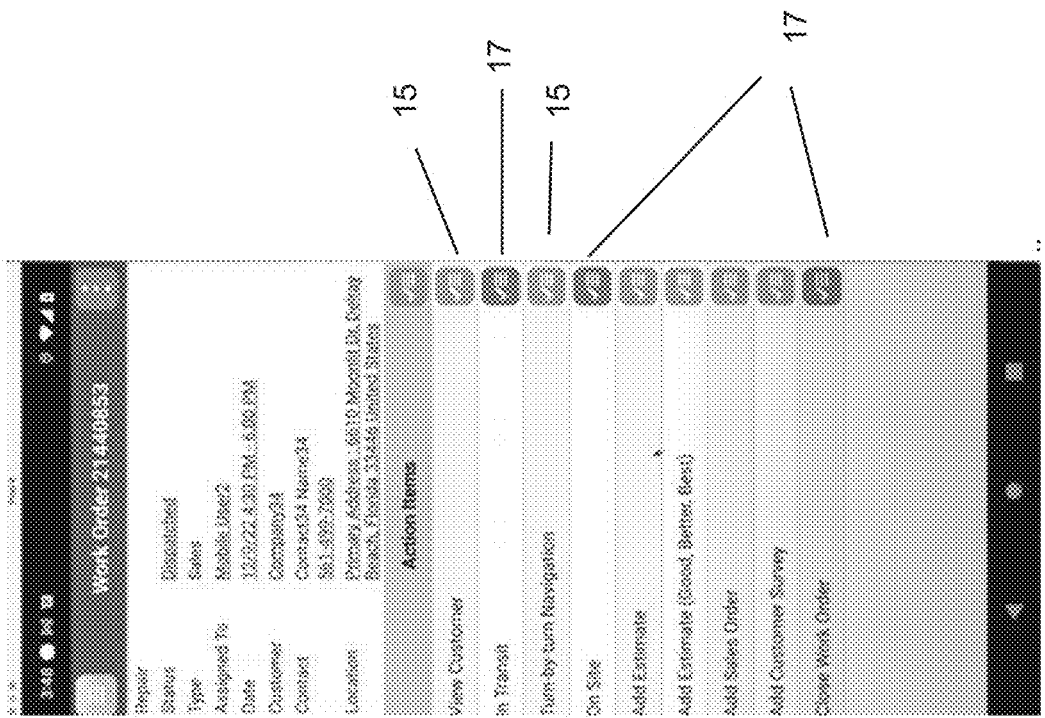

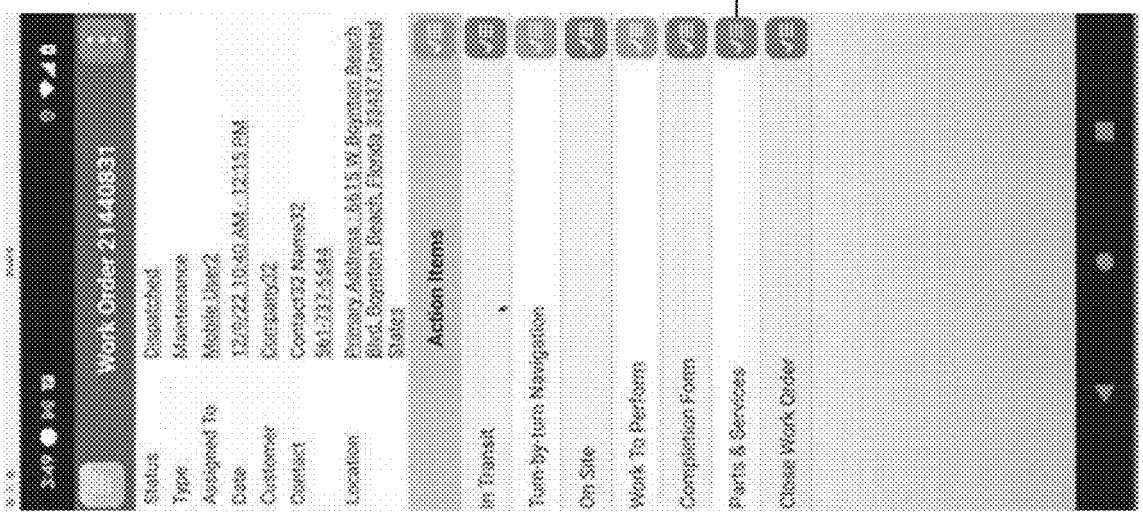
FIG. 26 Worker Main Menu, Type: Maintenance

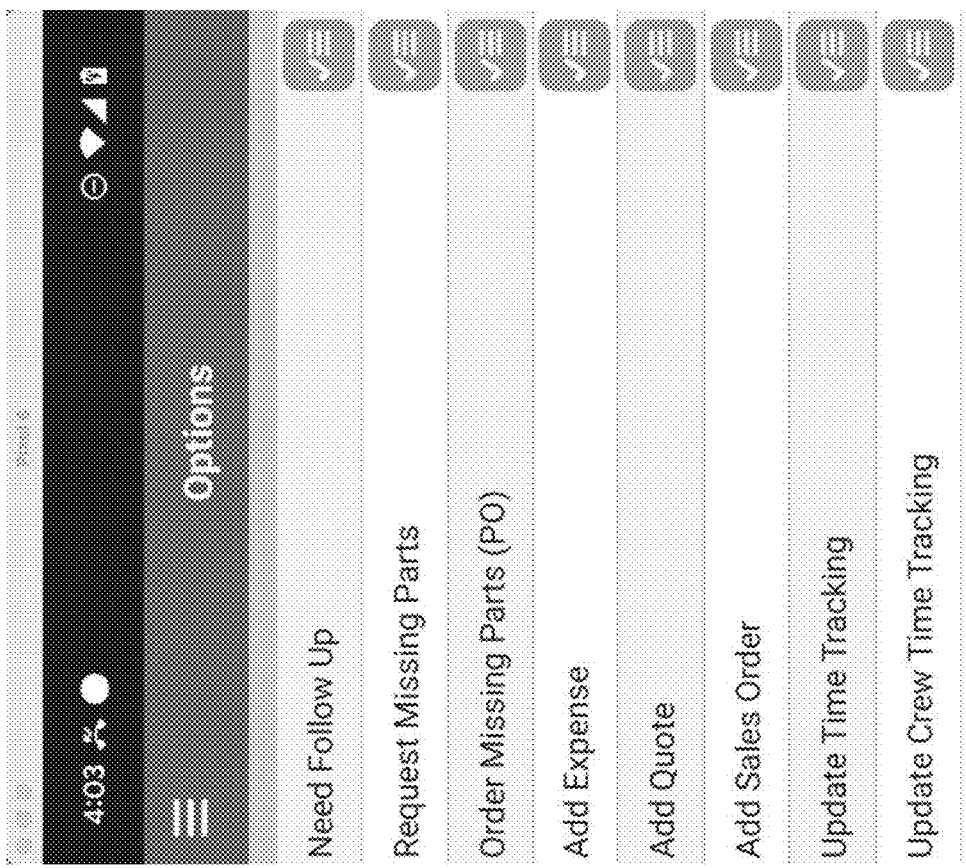
FIG. 27 Action Items Selected and Options Displayed

FIG. 28A TDS Backend Work Order '634 Completed Sub-Dashboard (summary)

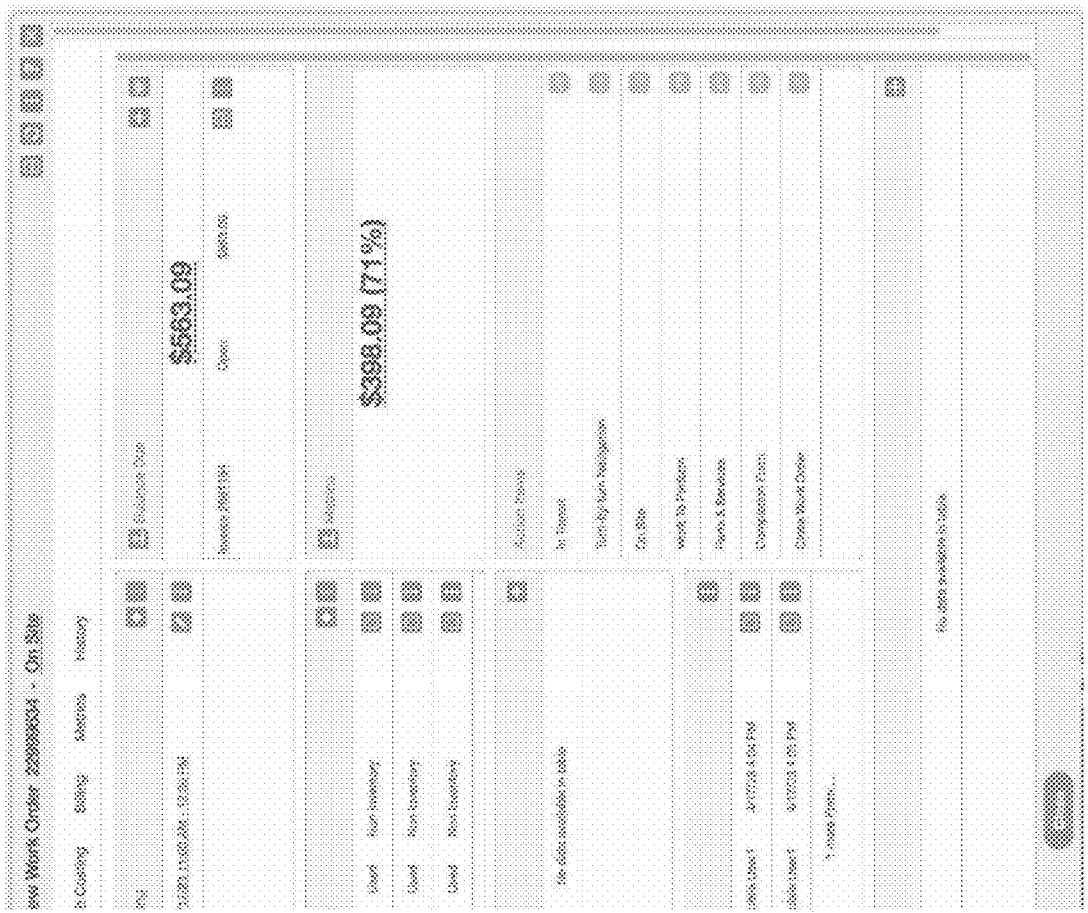
FIG. 28B  TDS Backend Work Order '634 Completed Sub-Dashboard (summary)

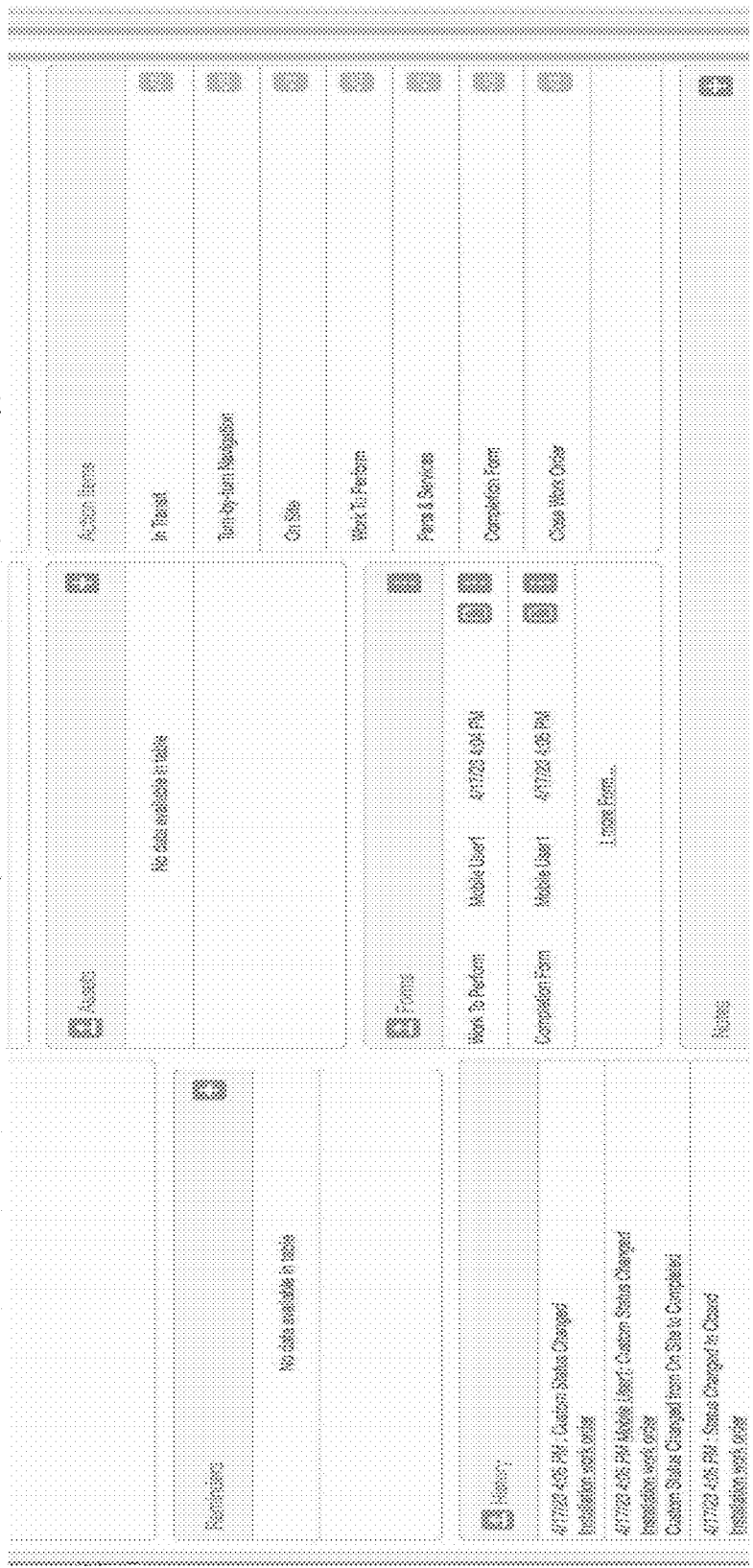
FIG. 28C    TDS Backend Work Order '634 Completed Sub-Dashboard (summary)

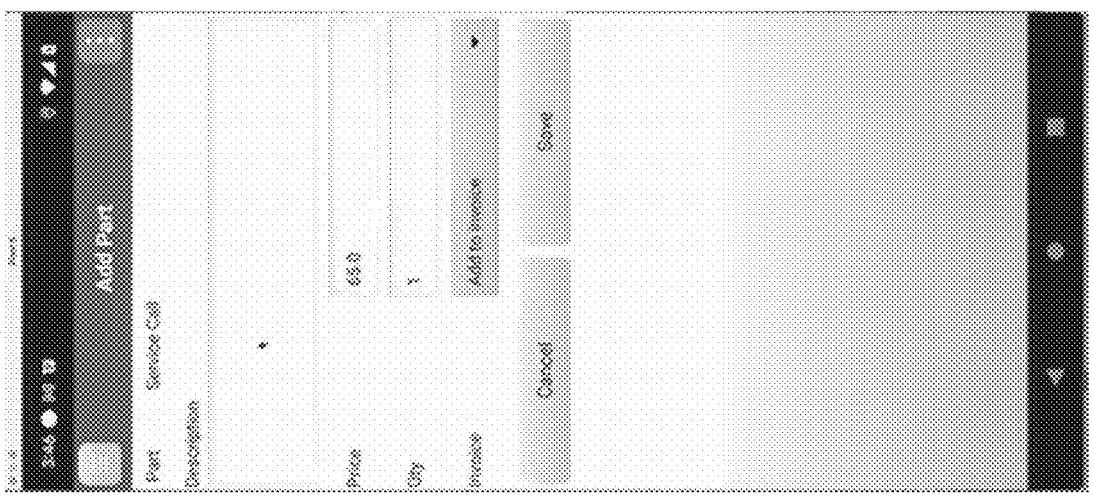
FIG. 29 Selected MORE option, Additional Menu Options, permitting the worker to enter or input transit expenses

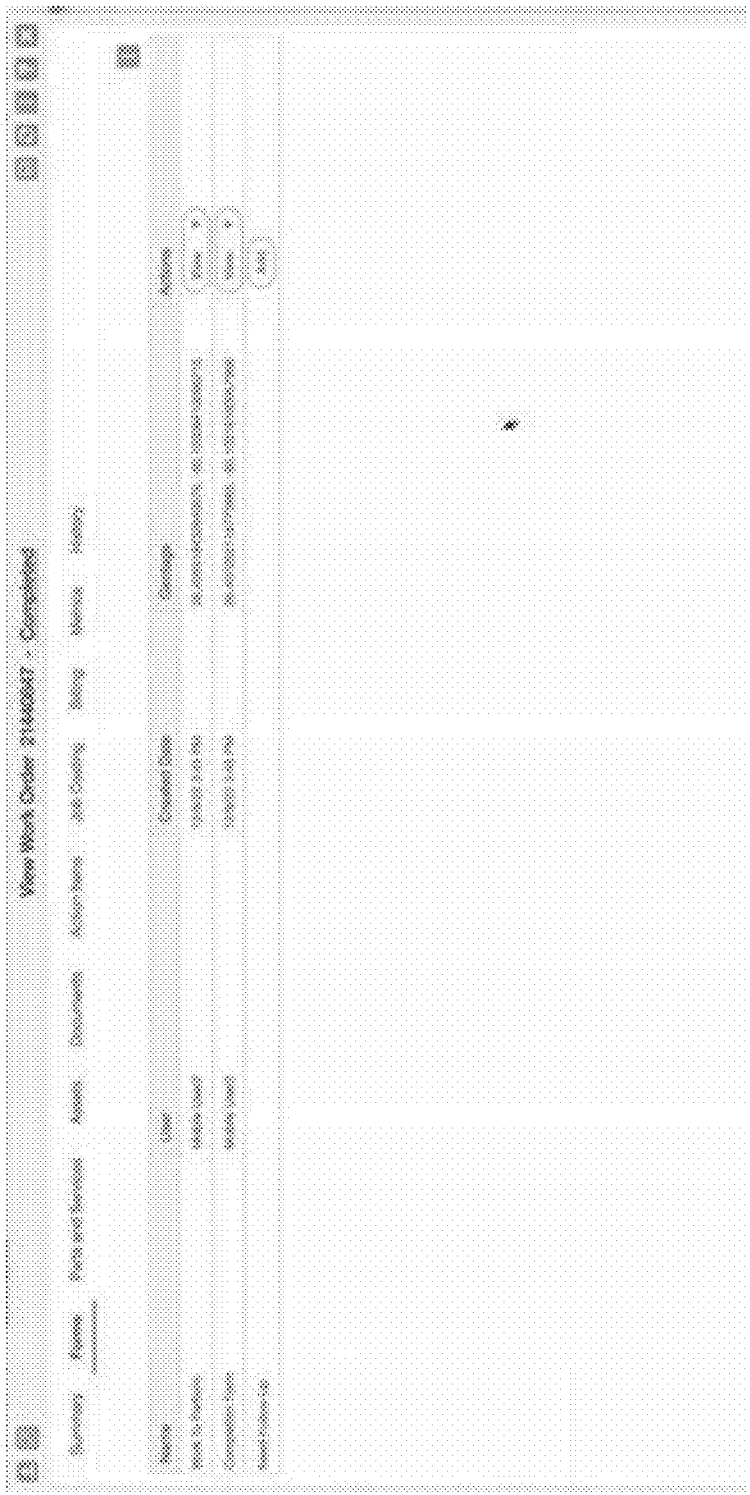
FIG. 30 FORMs Selected from TDS Backend Work Order '647 Completed (Forms Sub-Sub-Dashboard for Job/Project)

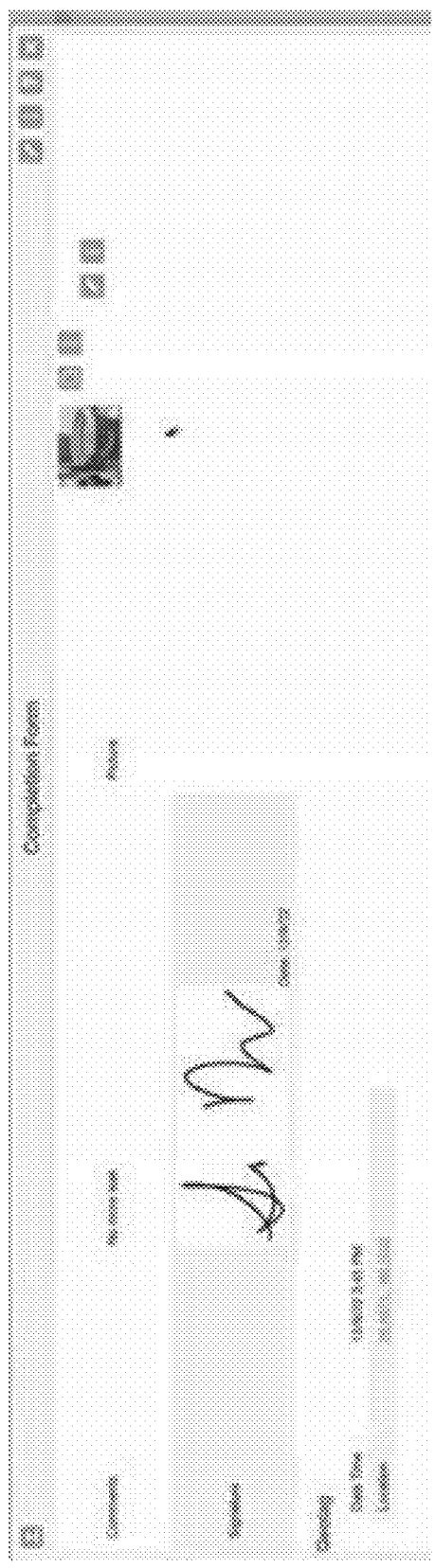
FIG. 31A VIEW Selected for "Work to Perform" row from Forms Sub-Sub-Dashboard for Job/Project (shows thumb image, worker and customer signatures, geolocation and task: date/time tag)
FIG. 31B Photo IMAGE Selected for Job/Project from Forms Sub-Sub-Dashboard

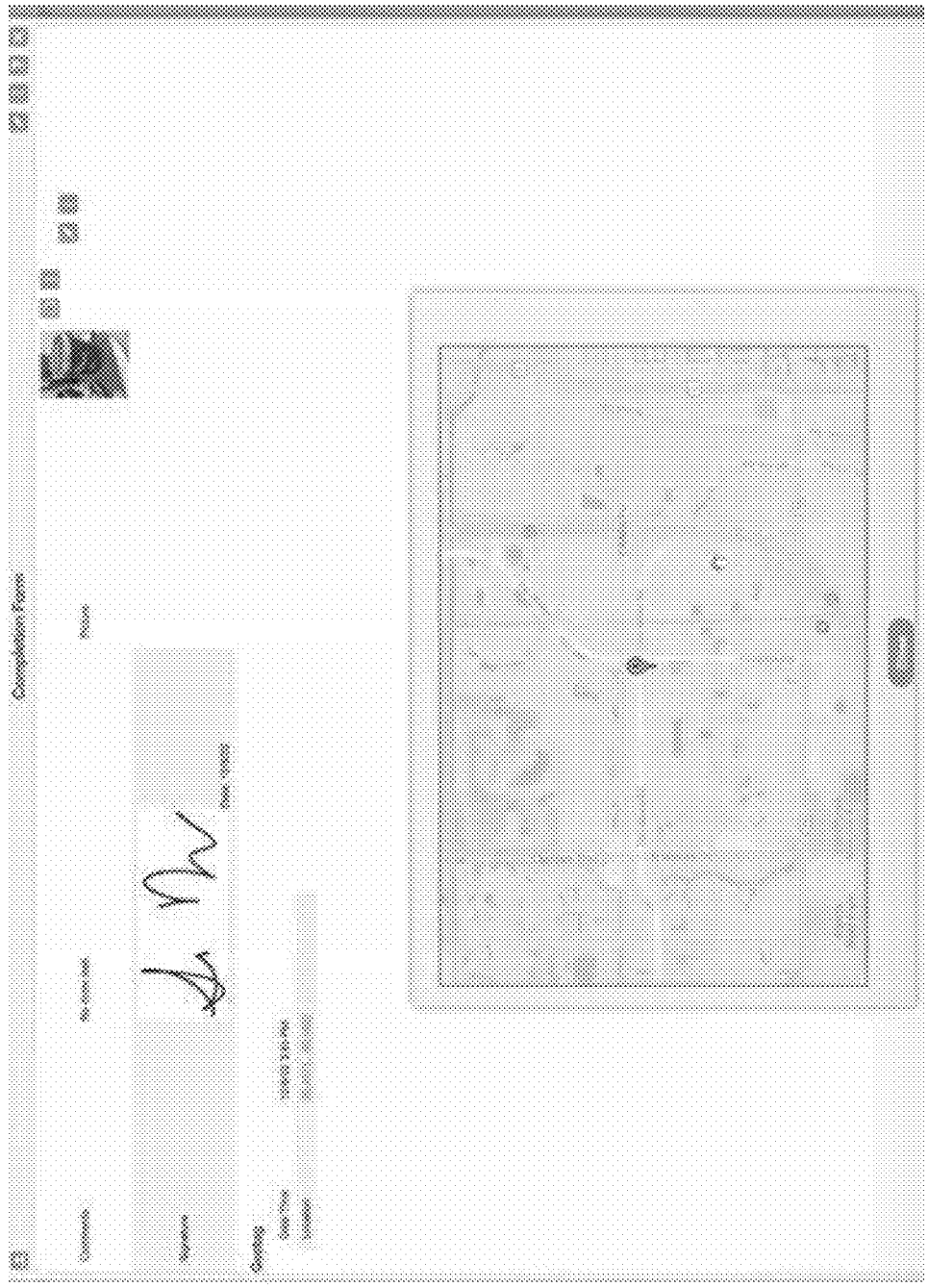
FIG. 31C LOCATION Selected from Forms Sub-Sub-Dashboard for Job/Project (shows geolocation of Performed Task and both signatures)

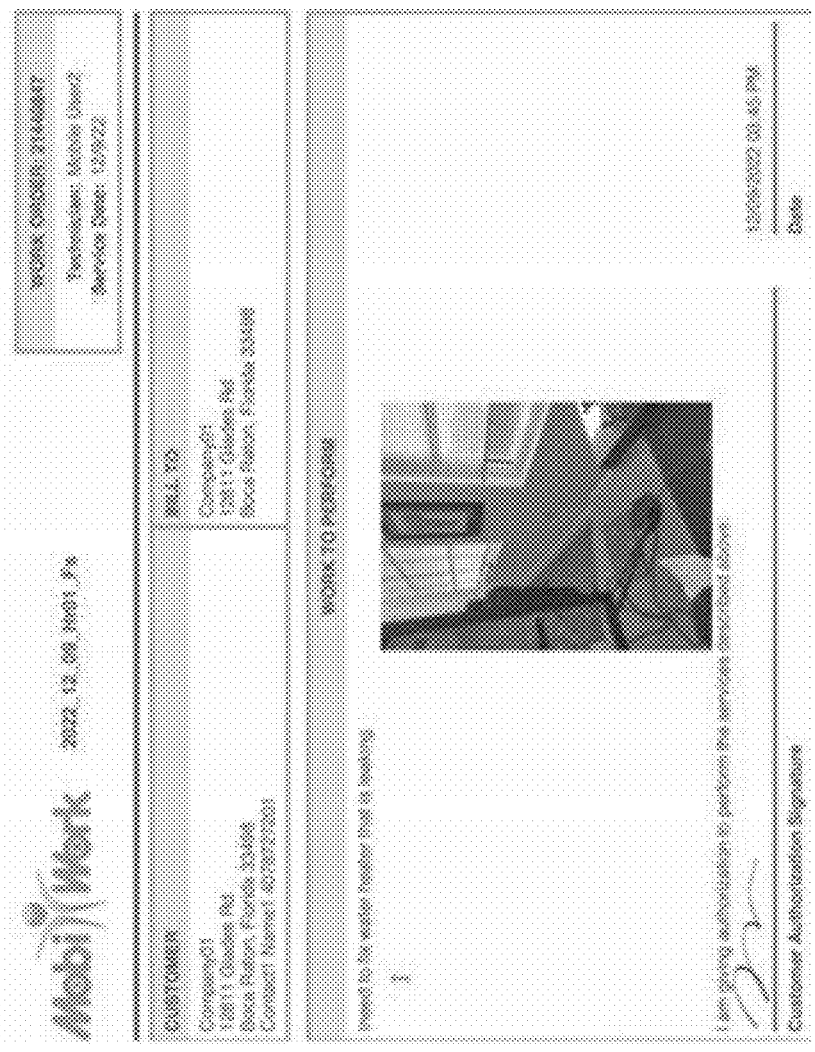
FIG. 32A Job or Project Report (customer data, location, Work to Perform text, photo, customer signature)

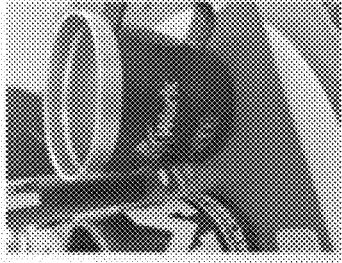
FIG. 32B Job or Project Report (parts used, service description, customer data, location, completed task image, completed task textual description, and both signatures)

FIG. 33 Job Costing Sub-Menu Selected for Work Order '634 (completed Job or Project)

FIG. 34 Metrics Sub-Menu Selected for Work Order '634

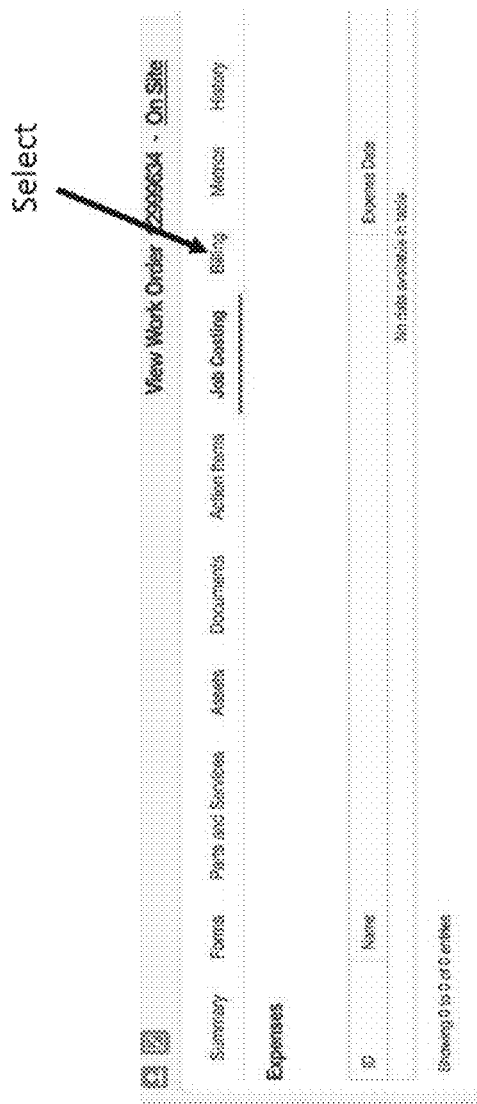
FIG. 35 Billing Sub-Menu Selected for Work Order '647

FIG. 36A Open Invoice Selected (Inv. '154) Action from Transit Data Structure (TDS) Backend Dashboard

FIG. 36B   Open Invoice Selected (Inv. '154) Action from Transit Data Structure (TDS) Backend Dashboard

FIG. 37 Action List from Open Invoice '942 (edit, delete, etc.)

FIG. 38 Work Orders Selected from Transit Data Structure (TDS) Backend Dashboard (Actions, Work Orders and Sub-menu Access)

FIG. 39 Work Orders Settings (Selected) from Transit Data Structure (TDS) Backend Dashboard (Various Actions)

Work Orders Settings

General

| Setting | Value |
|---|---|
| Work Order Number Type | MobiWork ID |
| Contractors can Create Work Order | No |
| Show only Location Contacts | No |
| Work Order Contact Required | No |
| Display Custom Status On Add Work Order | No |
| Track Products by Serial Number | No |
| Default Customer Type | Residential |
| Default Work Order Expected Duration | 1 hour |
| Device: "Add Work Order" Panel | Work Order Title and Location |
| Unassignable Users | None |
| Checkout Payment Option Type | No |
| Manage Inventory for Invoice | No |
| Work Order/Invoice Inventory Type | Warehouse and User Inventory |
| Load Inventory Scan Type | Load Inventory By Scanning |
| Hide Forms on Device Work Order Screen | Show None |
| Do Not Show Closed Work Order on Device | No |
| Print Invoice after Checkout | No |
| Show Invoice PDF after Checkout | No |
| Capture Invoice Signature after Checkout | No |
| Send Invoice Email after Checkout | No |
| Name Singular | Work Order |
| Name Plural | Work Orders |
| Hide Work Order Status if Custom Status is present | Yes |
| Show Customer Special Note | Yes |
| Show PO Number | No |

FIG. 40 Work Order Types Sub-Menu (Selected) from Work Orders Settings (root: TDS Backend dashboard)

Custom Fields

MobiForm Settings

| Name | Add Work Order Wizard Settings | Display Type | Required |
|---|---|---|---|
| Work To Perform | Do not capture | MobiForms Tab | No |
| Completion Form | Do not capture | MobiForms Tab | No |
| Need Follow Up | Do not capture | MobiForms Tab | No |

Work Order Types

| Name | API Name | Description |
|---|---|---|
| Service | Simple | Generic service work order type: simple use cases with no workflow, the core action items are all available and they can all be executed in any order. |
| Simple | Simple1 | Simple work order type with either a quote or carts and services / invoice |
| Maintenance | Maintenance | Maintenance Service |
| Installation | Installation | Installation Service |
| Repair | Repair | Repair Service |
| Inspection | Inspection | Inspection Service |
| Sales | Sales | Work order used when a sales order or estimate needs to be provided |

FIG. 41 ACTION ITEMS List, including Optional Action Items — Sub-Sub-Menu for Work Order Type (Required: in transit, on site, work to perform, complete form, parts and service, close work order; Optional: need follow up, request missing parts, etc.)

| Actions Items | Type | API Name | Actions |
|---|---|---|---|
| Basic | | | |
| In Transit | Check-In | InTransit | |
| Turn-by-turn Navigation | Navigation | TurnbyturnNavigation | |
| On Site | Check-In | OnSite | |
| Work To Perform | Work Order Form | WorkToPerform | |
| Options | Action Item Group | Options | |
| Options – Need Follow Up | Work Order Form | NeedFollowUp | |
| Options – Request Missing Parts | Missing Parts | RequestMissingParts | |
| Options – Order Missing Parts (PO) | Create Purchase Order | CloseMissingPartsPO | |
| Options – Add Expense | Add Expense | AddExpense | |
| Options – Add Quote | Add Quote | AddQuote | |
| Options – Add Sales Order | Create Sales Order | AddSalesOrder | |
| Options – Update Time Tracking | Time Tracking | UpdateTimeTracking | |
| Options – Update Crew Time Tracking | Crew Time Tracking | UpdateCrewTimeTracking | |
| Parts & Services | Parts And Services | PartsServices | |
| Completion Form | Work Order Form | CompletionForm | |
| Close Work Order | Close Work Order | CloseWorkOrder | |

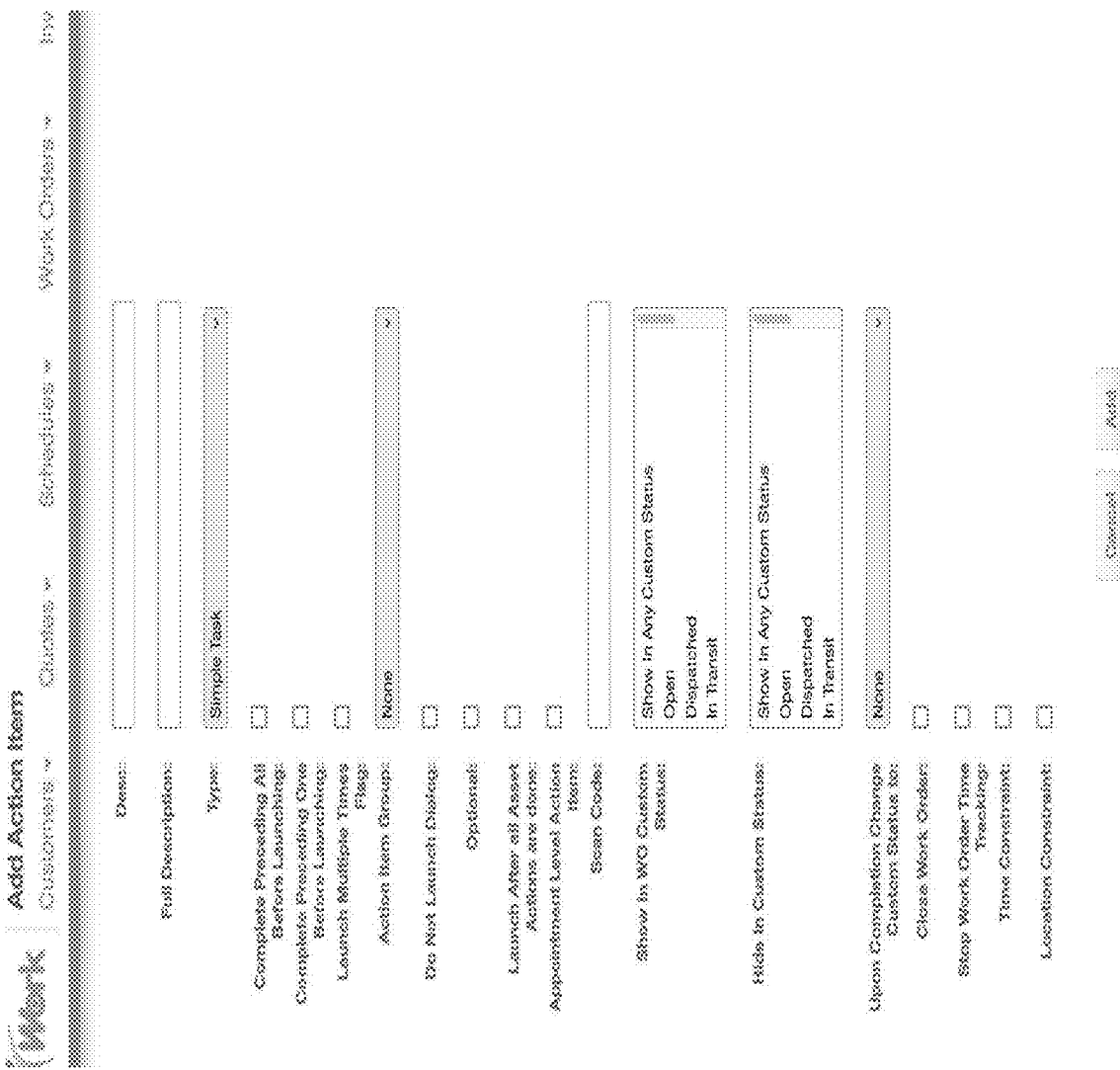
FIG. 42 ADD ACTION ITEM (Selected) Sub-Sub-Menu from Work Order Types Sub-Menu

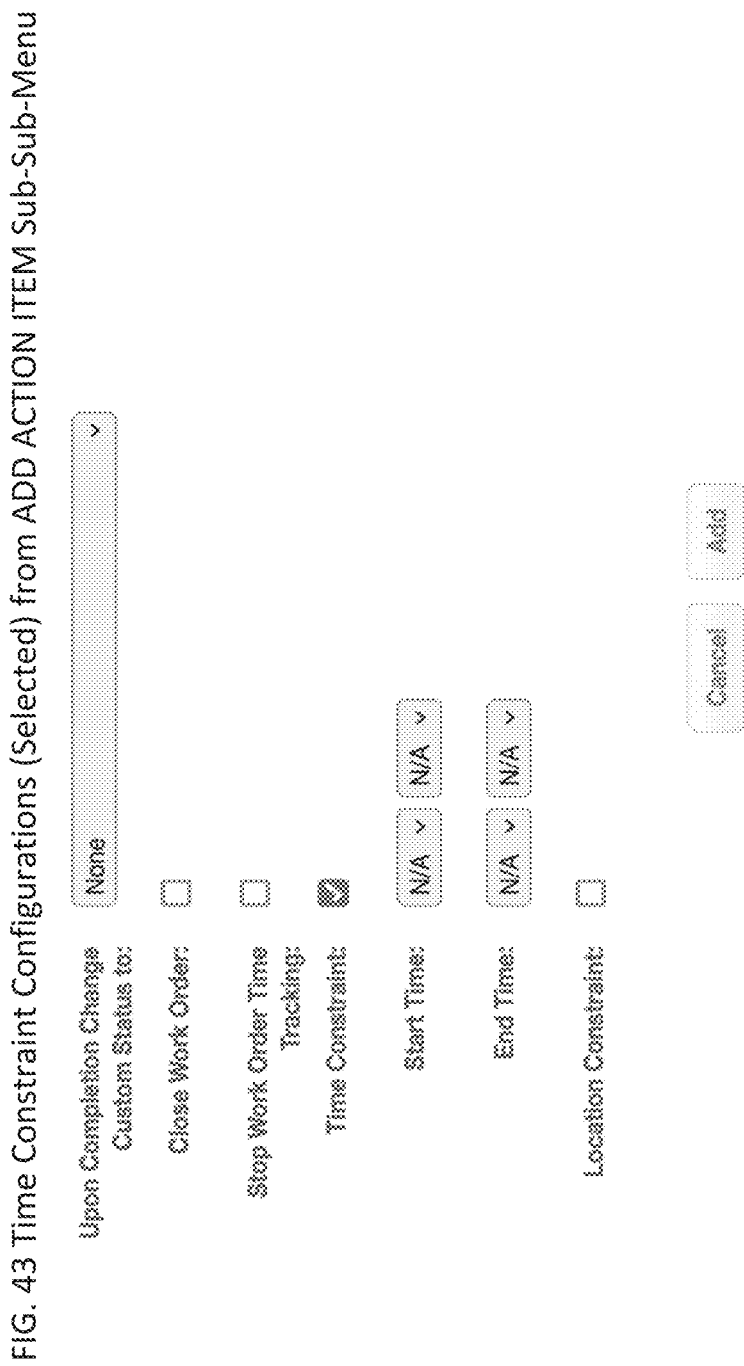
FIG. 43 Time Constraint Configurations (Selected) from ADD ACTION ITEM Sub-Sub-Menu

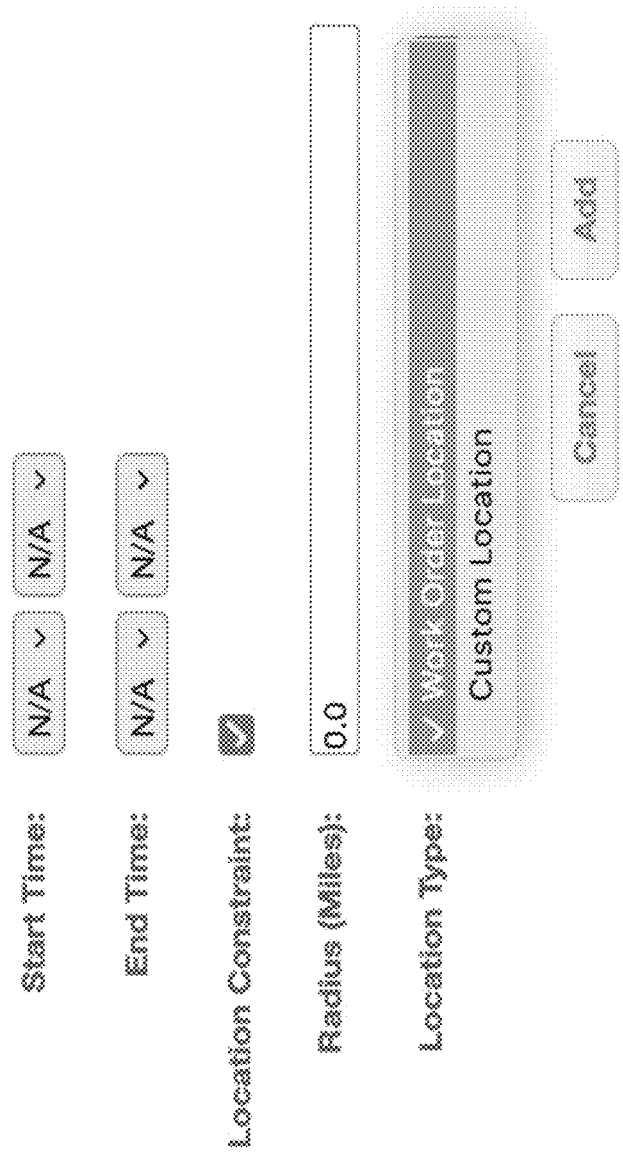
Fig. 44 Location Constraint Configurations (Selected) from ADD ACTION ITEM Sub-Sub-Menu

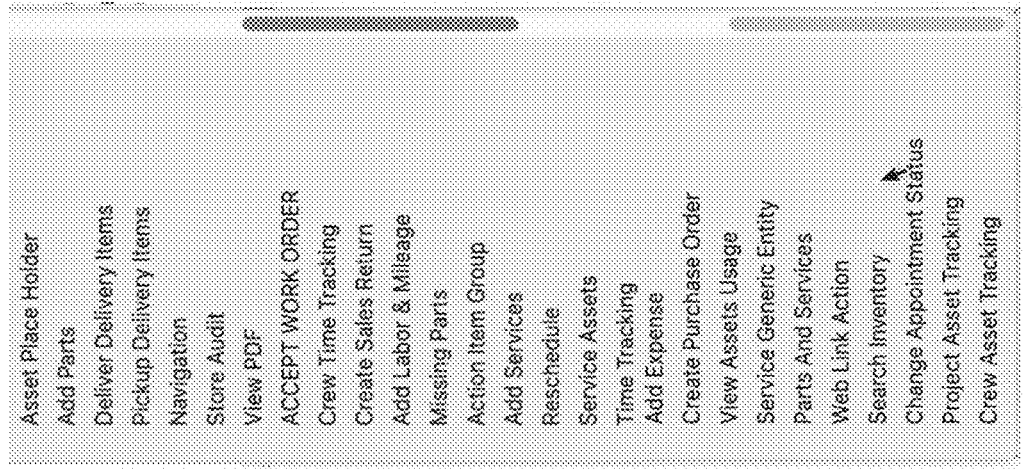

FIG. 45B edit npa TYPE (Selected) Drop Down List from ADD ACTION ITEM Sub-Sub-Menu Asset Place Holder
Add Parts
Deliver Delivery Items
Pickup Delivery Items
Navigation
Store Audit
View PDF
ACCEPT WORK ORDER
Crew Time Tracking
Create Sales Return
Add Labor & Mileage
Missing Parts
Action Item Group
Add Services
Reschedule
Service Assets
Time Tracking
Add Expense
Create Purchase Order
View Assets Usage
Service Generic Entity
Parts And Services
Web Link Action
Search Inventory
Change Appointment Status
Project Asset Tracking
Crew Asset Tracking

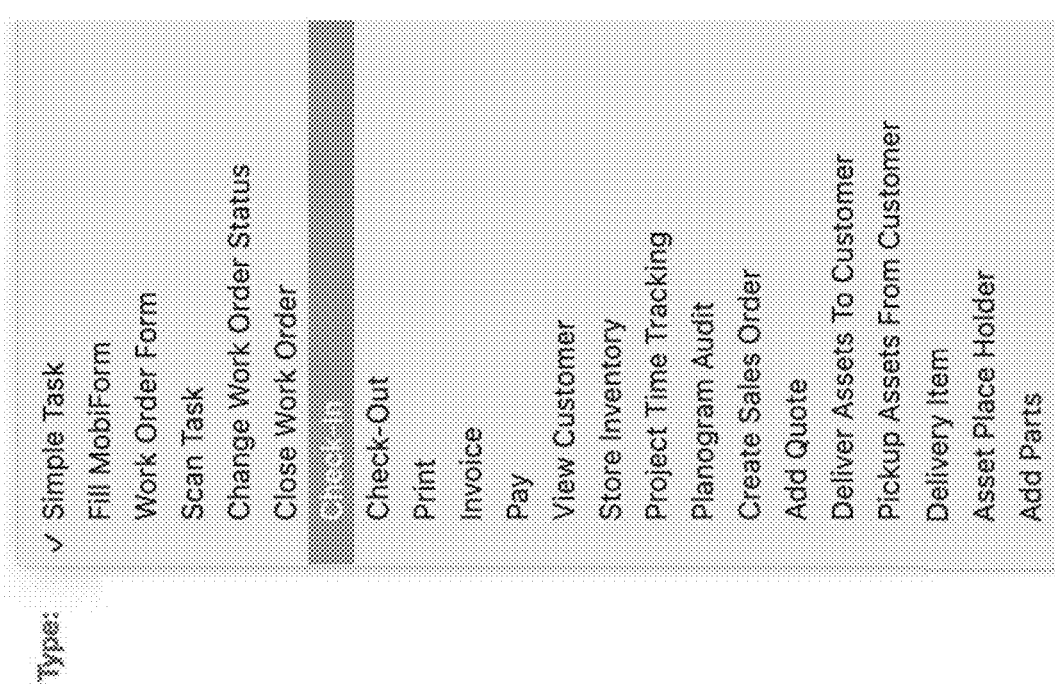

FIG. 45A edit npa TYPE (Selected) Drop Down List from ADD ACTION ITEM Sub-Sub-Menu Type:
✓ Simple Task
Fill MobiForm
Work Order Form
Scan Task
Change Work Order Status
Close Work Order
Check-In
Check-Out
Print
Invoice
Pay
View Customer
Store Inventory
Project Time Tracking
Planogram Audit
Create Sales Order
Add Quote
Deliver Assets To Customer
Pickup Assets From Customer
Delivery Item
Asset Place Holder
Add Parts

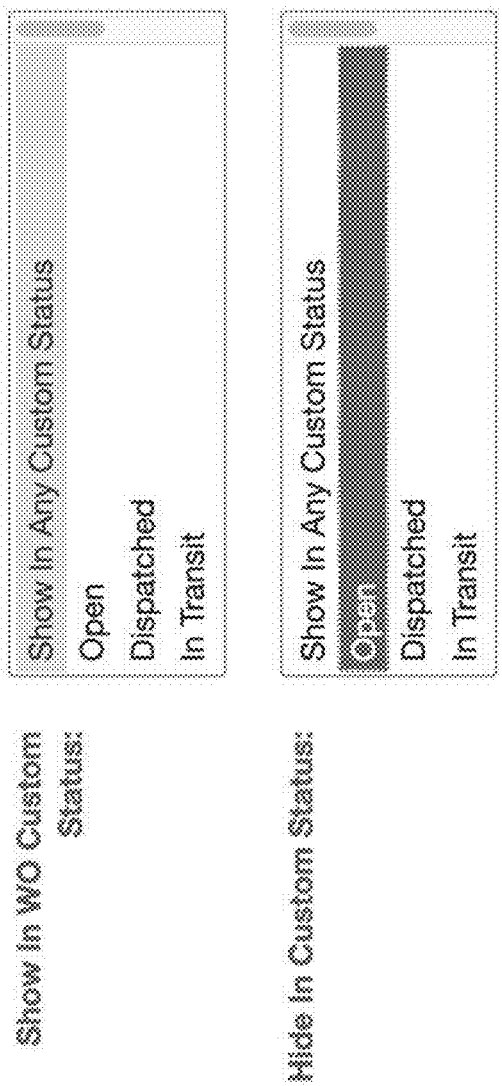
FIG. 46 SHOW WORK ORDER STATUS (Selected) Options and HIDE FEATURE (both from ADD ACTION ITEM Sub-Sub-Menu

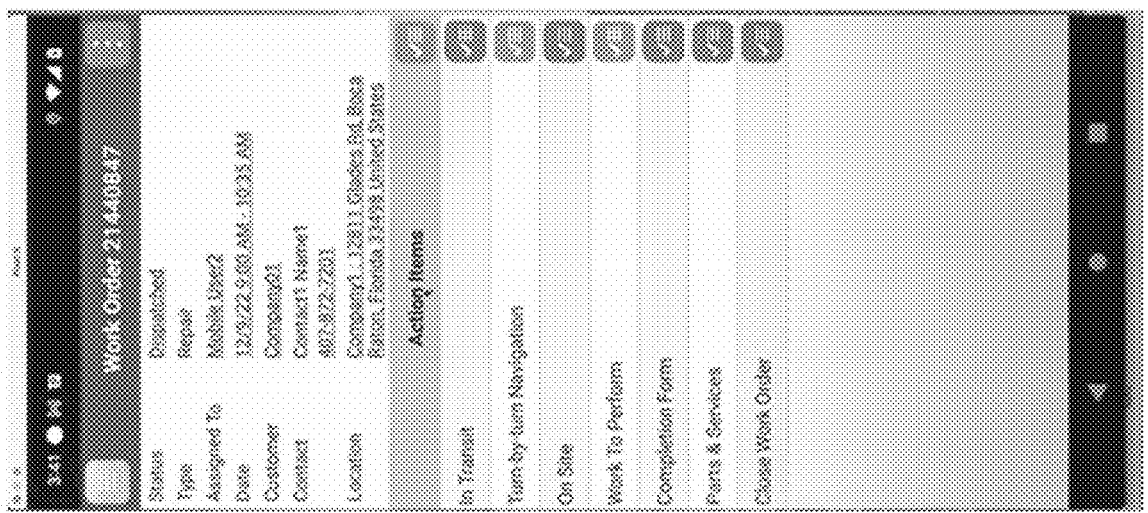

MOBILE WORKFORCE WORKFLOW AUTOMATION DATA STRUCTURE

The present invention relates to an improved mobile work force ("MF") workflow automation data structure (ADS) gathering and processing data in connection with a number of MF mobile workers respectively assigned to provide goods and/or services to corresponding customers at remote locations. The MF workflow automation data structure (ADS) is an improvement in computer-based systems directing workers via downloaded hierarchical menus, capturing on site and in MF workflow automation data from the mobile worker's computer or phone device, monitoring worker progress, instructing and otherwise interacting with a diverse group of mobile workers at corresponding diverse geographical locations, all under the control and guidance of either a cloud-based or a sever-based computing system. The term "mobile worker" includes salespersons in a mobile setting.

BACKGROUND OF THE INVENTION

Companies that either employ or contract with mobile workers to deliver goods and/or services to remotely distributed customer locations oftentimes are burdened with multiple levels of managers present in the company home office who verbally communicate or use text messaging (herein "texts") to communicate back and forth with workers at the customer locations. It is difficult for these companies to (a) track the location of mobile workers to and from the designated customer locations; (b) enable these workers at these designated locations to perform all the needed job or project tasks while at the designated location; (c) capture data establishing the problems or issues at the designated location; (d) have the customer confirm such initial problem-based document; (e) instruct the mobile worker what steps are needed to solve the customer's problem; (f) capture job/project completion documentation; (g) have the customer confirm such completion documentation; and, (h) process onsite invoicing and potential invoice payment by the customer.

Although tracking mobile employees or contractors is known, the prior art does not disclose a comprehensive data structure for systems directing, monitoring, instructing, and otherwise interacting with a diverse group of mobile workers. The following patents disclose tracking mobile workers: U.S. Pat. No. 9,740,999 Real-Time Customer Access to Geographical Location and Arrival Time of Service Provider; U.S. Pat. No. 9,123,005 Method and System to Define Implement and Enforce Workflow of a Mobile Workforce; and 9,740,999 Real Time Customer Access to Location, Arrival and on-Site Time Data, the contents of which are incorporated herein by reference thereto.

SUMMARY OF THE INVENTION

The invention provides a system and method for a MF workflow automation data structure (ADS) for directing, monitoring, instructing, and otherwise interacting with a diverse group of mobile workers working at corresponding diverse remote customer locations that overcomes the hereinafore-mentioned disadvantages of the heretofore-known devices and methods of this general type and that effectively provides such interaction, guidance and data collection facilities.

With the foregoing and other objects in view, there is provided, in accordance with the invention, a cloud-based computing system or one or more computers (i.e., servers) which can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes the provision of several mobile applications (or a series of communicatively coupled mobile applications) provided via a server (cloud-based or web-based) to a plurality of mobile workers, some of whom are in transit to a customer location, others are onsite at their respective customer destinations, and a third group who are in transit to either other customer locations or the worker's home base which are communicatively coupled in order to provide operational data sets to and from the workflow ADS system. The ADS systems and methods described herein are configured to monitor workers and create controlled environments for said workers by generating venue-specific and worker-specific instructions, manuals, and sequential operational data commensurate with onsite customer conditions. The system is further configured to track and monitor worker activities in order to gather pre-task data, confirm such pre-task data with the onsite customer, engage the worker to complete the repair, service, collection and transport, or close the sales call with a high level of customer satisfaction. The workflow ADS backend office system continually communicates with the worker's cell phone, tablet or computing device providing forms, processing data captured by the worker, and generating further forms, reports and invoices commensurate with the data captured by the worker, generally onsite, but also, to a limited extent, when the worker is in transit to and from the worker's dispatching of home office.

The present invention involves a method for configuring and operating a MF workflow automation data structure (ADS) for a vendor servicing a plurality of customers, typically with a plurality of mobile workers. For example, the vendor may provide repair services (including installation of parts), a maintenance service, and a new installation service with new appliances or materials (herein "parts"). In addition, the ADS system can be configured for sales calls by mobile workers. In the sales configuration, the salesperson would have a list of parts, appliances, home or office furnishings, or machines (generally categorically referred to herein as "parts"), and the sales person would make a sales presentation to the prospective customer (also categorically referred to herein as a "customer") and, to complete the sale, the ADS system can be configured to capture the sale, produce electronic communications to the incipient customer related to the proposed goods, and fully support the purchase of goods and parts via the ADS system. The workflow ADS system, as a data structure, provides the mobile worker with vendor-configurable software tools and displays, via the worker's cell phone, tablet or mobile computing device (herein the "mobile device") to adequately fulfill the customer's request at the designated customer destination. Hence, there are many workers servicing one or more customers at geographically dispersed destinations.

The ADS system involves a cloud-based or web-based server coupled to a data store (DS). The data store is typically uniquely configured on a per-vendor basis, using a (i) a MF vendor-user personal profile (UPP) and (ii) a customer UPP. The ADS supports multiple vendors in a siloed, data secure manner such that the data stores of one MF-enabled vendor will not be shared with another MF-enabled vendor. Each worker has a mobile device. The mobile device is a cell phone (including a smart phone), a tablet or a computing device. A communications network communicatively couples the worker's mobile device to the server and the MF-enabled vendor's back office. Each mobile device has a camera, a geolocation module generating geolocation data based upon the location of the mobile device, and an interactive mobile device display screen with perceptual inputs including at least a textual input and a tactile input. A perceptual input is an input that can be perceived and actuated by the user/worker. A textual input may include a pop-up keyboard. A tactile input may be a slide or a touch sensitive button or icon.

The MF workflow ADS is initially configured with several datasets which are downloaded as needed to the mobile device. These datasets are stored in an ADS data store or computer memory (potentially a database memory) per vendor. As earlier explained, each MF-enabled vendor can only access its own data store and the UPP data stores of its customers' UPPs. Although the explanation below discusses operations and systems in connection with relevant customer, the ADS operates by providing downloadable datasets to multiple mobile workers servicing multiple customers at diverse customer destinations for a MF-enabled vendor, all supported by the vendor's secured data store.

One of the several advantages of the present invention includes an interactive worker main menu display on the worker's mobile device. The display is, in one embodiment, a horizontally bifurcated user interface (UI) display with first and second UI segments. Effectively, the ADS downloads pre-programmed datasets to the worker's device, the worked inputs data into his or her device, the device then uploads the created dataset to the ADS server and data store, processes the upload, and then downloads additional, supplemental datasets which enable ultimately completion of the task (the job or project) at the customer's destination. The first UI segment on the mobile device displays static (substantially non-changeable) displayable datasets which nominally include: (a) a customer dataset unique to the relevant customer being serviced including customer name, destination address and contact data, and (b) a customer-related job or project type (collectively referred to as a "Type," as in a type of job or a type of project). Of course, there are several Types of jobs and projects enabled by the ADS. The job/project Type is initially preselected by the vendor's system operator or administrator (Sys Admin) dependent upon the customer's request for goods or services.

The first UI segment has a changeable displayable worker current-status indicator dataset based upon a real-time (RT) geolocation dataset captured by the server from the worker's mobile device. In this manner, for the plurality of workers assigned and in the field, this means that the server tracks the geolocation of all assigned and scheduled workers.

Another advantageous aspect of the present invention uses a second UI segment on the device. The second UI segment has a plurality of worker interactive displayable datasets nominally including (i) at least three (3) required worker action items (R-actions) (there are multiple R-actions and R-action datasets which are different for different tasks, jobs, projects and Types). All R-actions are preprogrammed such that the R-actions can only be sequentially actuatably selectable by the assigned worker (the R-actions must be executed and fulfilled in a sequential manner, first R-action 1 then R-action 2, then R-action 3). The second User Interface data set also includes (ii) at least one optional worker action item (O-action) (again, there are multiple preprogrammed O-actions, which are different for different tasks, jobs, projects and Types). Each O-action is actuatably selectable as needed by the assigned worker.

The invention advantageously includes the nominal three R-actions which are required to be fulfilled for the Type of task, job, or project assigned to the worker. A small list of R-actions include: a first R-action representing an "in transit to destination" task event by the assigned worker; a second R-action related to a worker fulfillment task event specific for the assigned Type, and a third R-action representing either a completion action or a close action task event by the assigned worker. The optional O-action is optionally selectable by the assigned worker as one or possibly several supplemental fulfillment tasks or events. All associated with the task/job/project Type for the customer.

A number or plurality of interactive sub-menu datasets preferably includes at least one of: (m) a work to perform (WP) sub-menu dataset including a WP textual input sub-segment, WP photo capture input, a WP photo image display sub-segment, and a WP tactile signature input sub-segment; (n) one of several goods-related (GR) sub-menu datasets (preprogrammed and selected by the Sys Admin during the initialization phase from a group of GR sub-menu datasets including (i) a parts-installed sub-menu dataset displaying a selectable list of potential parts to be installed, (ii) a parts-to-order sub-menu dataset displaying a selectable list of potential parts-to-order, and (iii) a goods-available for sale sub-menu dataset displaying a selectable list of potential goods for sale. Another nominal interactive sub-menu dataset is (o) a services to perform (SP) sub-menu dataset including at least a SP textual input sub-segment or a SP sub-menu dataset displaying a selectable list of potential services to be provided and the installed by the worker. As indicated earlier, all of these interactive sub-menu datasets, when pre-selected by the Sys Admin to initialize the ADS, are either one by one or all related to the task/job/project Type. Oftentimes, these interactive sub-menu datasets are hierarchically below the three nominal R-actions (or all R-actions related to the Type of task/job/project) and/or are hierarchically below the task-related O-action.

One of the several advantages of the present invention includes a completion/close action (CC) interactive sub-menu dataset to enable the worker to complete the task/job/project with a completion action. Alternatively, the close action task event is similar to, but can be distinguished from the completion task action or event as explained hereinbelow. The CC sub-menu dataset nominally includes: a CC textual input sub-segment (enabling the worker to enter alpha-numeric data, which is ultimately uploaded to the ADS server and data store), a CC photo capture input (enabling the worker to photograph the completed task/job/project), a CC photo image display sub-segment (permitting the worker and the customer to see the image or images of the completed job), and a CC tactile signature input sub-segment. The tactile signature input enables the worker and/or the customer to electronically sign-off on the completed job or task.

A further advantage of the present invention includes a time constraint dataset and a location constraint data set which are both unique to the then relevant customer being serviced. The time constraint is based upon a respective temporal customer ("Time") dataset imposed by the relevant customer as one destinational limit (limiting the timeframe wherein the worker can attend to the job or project). The location constraint based upon a compulsory destination access or egress limitation ("LOC") dataset based upon another destinational limit imposed by the relevant customer. For example, the Time constraint may limit worker attendance at the customer's destination to the hours of 9 AM-5PM, M-F. The LOC constraint may limit worker access to a gated community, or an elevator in and apartment to certain days or timeframes, all based upon the related customer's destination.

Once the data store is initially configured by (a) the Sys Admin and then (b) by customer-unique data (for example the Type of task/job/project) all stored as datasets in the data store, the ADS server, interactively in conjunction with the assigned worker's (AW) mobile device, operates the ADS and the device in the following manner. The ADS system generates a MF-enabled vendor back office multi-worker time-blocked schedule display for all assigned workers associated with scheduled jobs or projects. This multi-worker time-blocked schedule display is effectively an MF-enabled vendor dashboard showing, for example, the days of the week M-F (horizontal calendar display), and typical worker time blocks 8 AM to 6 PM (vertically presented on a day to day basis). Each assigned or scheduled worker is displayed in a cell in the time-blocked schedule display matrix. The assigned worker cell nominally displays assigned worker data (e.g., name, or ID) and customer data (name and destination or name and Task at destination) within the time-blocked schedule. The time-blocked schedule conforms to the Time dataset for the relevant customer. In other words, if the Time constraint is 9 AM-11 AM, the worker assigned to the customer appears within that Time constraint timeframe.

The assigned worker, upon leaving for the customer destination or location, actuates the first R-action "in transit to destination" task event. As a result of the server and data store being communicatively coupled to the assigned worker's mobile device, the server accepts the in MF automation dataset from the device. The worker actuates the first R-action by a touch or swipe action in the interactive display on the device (that is, in the second UI segment).

Additionally, the server monitors and accepts, in substantially real-time (RT), an updated or then-current RT geolocation data from the assigned worker's (AW) mobile device. An embodiment of the present invention may include the server responding to the AW's device by changing the color-coding of the first R-action "in transit" interactive display. In this manner, although the worker swipes or touch-activates the in transit R-action, it is the system that checks the geo-location of the device prior to proving a dataset to the AW device that the worker is, in fact, in transit to the customer's destination or location.

In addition, on the MF-enabled vendor's dashboard, the service in effectively RT, color-codes the assigned worker's cell in the time-blocked schedule display with a first color-code upon the AW's actuation of the first R-action showing the in transit task event. If server confirmation is required, the dashboard changes the AW time-block when the server confirms the geolocation in transit event. Further, the server, via a downloadable dataset, changes the worker's changeable displayable worker current-status indicator dataset on the mobile device (in the first segment of the device's UI) to indicate an "in transit" event based upon the updated then-current RT geolocation MF automation dataset transmitted to the AW mobile device. Also, the AW's first R-action UI display (in the second UI segment) changes its color-coding based upon the updated RT geolocation data. The server (and data store) sends a first R-action UI displayable dataset indicating "in transit" to AW's device.

Moving forward to the second R-action, the server (and data store) accepts an assigned worker (AW) actuation of the second R-action which represents an incipient worker related fulfillment of a task event relevant to the on-hand task/job/project. Several steps then occur: (q) on the vendor's dashboard, another or further color-coding is presented in and on the assigned worker (AW) cell in the time-blocked schedule display. This is a second color-code based upon the AW actuation of the second R-action tactile perceptual interactive display. Next, (r) the server downloads at least one or the other or all of the WP (work to perform) sub-menu dataset(s), the GR sub-menu dataset(s) (goods/parts to be used) and the SP sub-menu dataset(s) (services to perform). These datasets are downloaded to the AW mobile device. Additionally, (s) the server accepts and stores, in the data store, a corresponding second R-action data input, by the assigned worker (AW) into his or her mobile device. This corresponding second R-action data input results in the server's generation and downloading of one or the other or all of: supplemental WP sub-menu (sWP) dataset(s), supplemental GR sub-menu (sGR) dataset(s) and supplemental SP sub-menu (sSP) dataset(s). The sever then (t) changes the color-coding on the AW mobile device in connection with the downloaded second R-action UI displayable dataset or datasets based upon the AW actuation of the second R-tactile input (an AW action).

The server and coupled data store accepts an AW's optional selection of one or more O-action(s) and, in that event, downloads one or the other or all of the WP sub-menu dataset(s), the GR sub-menu dataset(s) and the SP sub-menu dataset(s) to the AW mobile device. The result, from the AW side, is the server accepting uploaded datasets, based upon AW inputs, corresponding to O-action data input data by the assigned worker as sWP dataset, sGR dataset and sSP dataset. Advantageously, these sWP, sGR and sSP datasets may provide data to the server and the data store either in the R-action mode or the O-action mode or both, dependent upon preprogramming or initialization by the Sys Admin. The server, using these uploaded datasets, generates invoice data (representing an invoice for the customer being serviced) based upon the sWP, sGR, and sSP datasets.

The server then accepts an AW actuation of the third R-action representing either a completion action task event or a close action task event. It should be noted that invoice generation can be after this third R-action acceptance. The server, in conjunction with the data store. (v) again color-codes the AW cell in the time-blocked schedule display dashboard with a third color-code upon the AW actuation of the third R-action. The server then (w) downloads the CC sub-menu dataset(s) (nominally one but potentially more datasets) to the AW mobile device. The server, responsive to the device's uploaded data, (x) accepts and stores, in the data store, corresponding third R-action data input (tactile and/or textual inputs), by the AW into the AW mobile device.

These datasets are one or the other or all of: supplemental CC textual input (sCC-text), supplemental CC photo input (sCC-photo) (showing a completed job/project), and supplemental CC tactile signature input (sCC-sig). The further server result being (y) a change of the color-coding on the AW mobile device with a third R-action UI displayable dataset based upon the storage of the sCC-text, sCC-photo, and sCC-sig datasets.

The final nominal action by the server is a download of the invoice data (preferably in a vendor-standard form, with the variable dataset data integrated therewith) to the AW mobile device. The invoice, per the server's programming, bases the invoice on the sCC-text, sCC-photo, and sCC-sig.

An embodiment of the present invention may include job or project types for a repair job, a generic service job, a sales presentation project, a maintenance service job, and a service call job. Further refinements may include initially configuring and storing datasets enabling color-coding, with a first color display (for example RED), indicia on the AW device showing all R-actions in RED as part of the worker's interactive displayable dataset or datasets. This first color (RED) representing a non-completed R-action. The downloaded datasets may have color-coding data using a second color display indicia (GRAY) for all O-actions in the worker interactive displayable dataset(s). The second color GRAY representing the optionally selectable worker action. In this manner, after initially configuring the ADS data store as noted herein, the server changes the color-coding to a third color (GREEN) for all R-actions in the AW interactive displayable dataset(s) after completion of the particular R-action. The server downloads the third color R-action worker interactive displayable dataset to the AW mobile device.

Another embodiment of the present invention includes the use of a further R-action in addition to the three R-actions with corresponding datasets for WP (work to perform) sub-menus, GR sub-menus and SP sub-menus (these menus being downloadable datasets). The further R-action, like all other R-action datasets, is only sequentially actuatable after the second R-action is completed and reported to the server. The further R-action is related to the worker fulfillment task/job/project or Type. The further R-action is another further worker interactive displayable dataset in the plurality of worker interactive displayable datasets in the second UI segment. The result being that the further R-action is sequentially and hierarchically below the second R-action and access to the further R-action dataset is blocked until completion of the second R-action dataset.

A further embodiment of the present invention includes perceptual inputs as tactile alphanumeric input(s) and/or a touch-activated inputs on the mobile device. Additionally, but not necessarily, prior to the server downloading the invoice data, the relevant dataset may require a sCC-sig or signature by the AW (nominally) and/or the customer (preferably but not necessarily) for the third R-action. The server must accept and store the sCC-sig prior to downloading the invoice data. In this configuration, the sCC-sig represents an electronic signature capture on the AW mobile device as indicia of completion of the relevant Type action, that is the job/project assigned to the mobile worker. Another enhancement of the invention has a WP sub-menu dataset which includes an optional WP photo capture. The photo capture should be prior to the second R-action data input by the assigned worker into the AW mobile device. The second R-action is the work to perform (WP) R-action.

A further advantage of the present invention includes a requirement to obtain the sCC-photo as a required secondary input by AW actuation of the third R-action (the completion/close action). The server must accept and store the sCC-photo dataset prior to downloading the invoice data. In this case, sCC-photo is indicia of completion of the relevant Type action. In another embodiment, the Time constraint dataset is exclusionary timeframe data for the relevant customer. The server, in generating the time-blocked schedule display or dashboard, excludes the display of the assigned worker cell within the exclusionary timeframe. Another embodiment of the invention treats the LOC dataset as one of a permissive destinational limit wherein the relevant customer permits the mobile worker to service the customer at the relevant customer destination. In a different configuration, the LOC dataset is an exclusionary destinational limit wherein the relevant customer prohibits mobile worker service at the relevant customer destination. In this embodiment, the server either: (j) converts the permissive destinational limit into a LOC exclusionary timeframe and in generating the time-blocked schedule display, excludes the display of the AW cell within the LOC exclusionary timeframe, or (k) converts the exclusionary destinational limit into the LOC exclusionary timeframe and the server, in generating the time-blocked schedule display, excludes or prohibits the display of the AW cell within the LOC exclusionary timeframe.

Another refinement of the invention in connection with the first R-action (the "in transit" task event) has an initial configuration, in the "in transit worker interactive displayable dataset," that the AW can select a navigation or navi route display map, The route display map is a map sub-menu hierarchically below the first R-action actuation and is actuatable by the assigned worker. An additional embodiment uses a NULL dataset or datasets in the situation wherein the relevant customer does not elect customer time constraints or location constraints or preference data. In that case, the time constraint is a NULL dataset and/or the location constraint is a NULL dataset.

Another configuration of the ADS system has, in the initial configuration of the data store, a third R-action which only represents the completion (Comp) action task event and a fourth R-action which only represents the close action (Close) task event. These are preprogrammed datasets developed by the Sys Admin. In this configuration, the CC interactive sub-menu dataset includes a Comp sub-menu dataset and a Close sub-menu dataset. The CC textual input sub-segment, the CC photo capture input, the CC photo image display sub-segment, and the CC tactile signature input sub-segments are respectively a Comp textual input sub-segment, a Comp photo capture input, a Comp photo image display sub-segment, and a Comp tactile signature input sub-segment. The sCC-text, the sCC-photo, and the sCC-sig are respectively supplemental Comp textual inputs (sComp-text), supplemental Comp photo inputs (sComp-photo), and supplemental Comp tactile signature inputs (sComp-sig). The server, when accepting the AW actuation of the third R-action includes accepting and storing the sComp-text, the sComp-photo, and the sComp-sig. The downloading of invoice data to the AW device is then based upon one or another or all of the sComp-text, sComp-photo, and sComp-sig. Further, the initial configuration of the data store includes a payment portal sub-menu dataset, After initially configuring the data store, the server accepts AW's actuation of the fourth R-action and: (l) downloads the payment portal sub-menu dataset to the device, (m) accepts and stores corresponding fourth R-action data input by the AW as supplemental payment data, and (y) changes the color-coding on the mobile device with a fourth R-action UI displayable dataset based upon the storage of the payment data. Thereafter, the server generates paid invoice dataset data based upon the payment data and downloads the same to the mobile device.

A further embodiment of the present invention includes, as part of the initial configuration of the data store, a function wherein the third R-action represents the completion (Comp) action task event and the initial configuration of the data store includes a fourth R-action as the close action (Close) task event. The CC interactive sub-menu dataset includes a Comp sub-menu dataset and a Close sub-menu dataset. The CC textual input sub-segment, the CC photo capture input, the CC photo image display sub-segment, and the CC tactile signature input sub-segment are respectively labeled or represent a Comp textual input sub-segment, a Comp photo capture input, a Comp photo image display sub-segment, and a Comp tactile signature input sub-segment. The sCC-text, the sCC-photo, and the sCC-sig data is respectively supplemental Comp textual input (sComp-text), supplemental Comp photo input (sComp-photo), and supplemental Comp tactile signature input (sComp-sig). The server (1) accepts AW actuation of the third R-action and accepts and stores sComp-text, sComp-photo, and sComp-sig data. (2) The server downloads the invoice data to the AW device based upon one or more of the sComp-text, sComp-photo, and sComp-sig. The initial configuration of the data store includes a payment portal sub-menu dataset. In operation, the server accepts AW actuation of the fourth R-action; (3) downloads the payment portal sub-menu dataset to the AW mobile device, (4) accepts and stores corresponding fourth R-action data input by the AW into the device as supplemental payment data, and (4) changes the color-coding on the AW mobile device with a fourth R-action UI displayable dataset based upon the storage of the payment data. The ultimate result being generation of paid invoice data based upon the payment data by the server, which paid invoice data is downloaded to the device as a dataset.

Another embodiment includes at least three O-actions being optionally selectable by the assigned worker, AW, as supplement fulfillment task events for the relevant job/project Type as per the relevant customer's initial service request. In this embodiment, three O-actions seem to be optimal for most workers. These O-actions include a WP (work to perform) sub-menu dataset, one or more GR (goods related to the task/job/project) sub-menu datasets, and the SP (services to perform) sub-menu dataset. Once the ADS is configured in the data store by the Sys Admin, the server accepts the AW's optional selection of O-actions and downloads the then-requested WP, GR and SP sub-menu datasets to the mobile device. Upon further AW actions guided by these menus, the server accepts and stores resulting data as sWP datasets, sGR datasets and sSP datasets.

In some embodiments, the AW does not respond to the sub-menu directions, and the resultant "no action" is considered to be a NULL dataset resulting from the earlier downloaded sWP, sGR and sSP datasets. The server stores associated NULL indicators for the job/project Type.

In a further enhancement, the earlier described nominal, three O-action ADS system is configured, including the NULL data capture. In a multiple customer configuration, involving multiple AW workers, the server, for the plurality of customers, generates the MF-enabled vendor's back office multi-worker time-blocked schedule display to display all assigned workers associated the plurality of customers having scheduled jobs or projects. The server accepts and stores, in the data store for the MF-enabled vendor and for the plurality of customers, sWP datasets, sGR datasets and sSP datasets. The server then organizes the sWP datasets, sGR datasets and sSP datasets by Type of job or project. Using statistical tools, the server converts one or more of the three O-actions into R-actions for a respective Type of job or project when the sWP datasets, sGR datasets and sSP datasets by respective Type exceeds a predetermined statistical threshold.

For example, assume that a service call if associated with the faulty door on a microwave oven and the door has the following parts: a left and right hinge arms unique to the oven's model, a spring used in all ovens sold over a two year period, and four sets of nuts and bolts that are widely used in the service industry which industry includes all large appliances sold by the oven manufacturer (conventional ovens, refrigerators, dishwashers, etc.) Further assume that the initial ADS had all these parts in an optional GR menu data set. The ADS system by compiling data for about 50 service calls to fix these microwave ovens could (a) create a R-action in response to the task/project Type "broken microwave door" requiring (i) left and right door hinges; (ii) compel or recommend that all AWs carry both the door spring and a reasonable supply of nuts and bolts on the AW's service repair truck or vehicle. Statistical tools can be used on the ADS data sets to (i) convert O-actions to R-actions and (ii) identify that some parts must the ordered or pre-ordered (the door hinges) either during the initial service call or prior to the final service call to fix the oven door; and (iii) compel or recommend a reasonable supply or inventory on the AW's truck for commonly used parts or goods. Sometimes these parts or goods are considered consumable goods such as plumber's tape, glue, etc.

Although the invention is illustrated and described herein as embodied in a system and methods for directing, monitoring, instructing, and otherwise interacting with a diverse group of mobile workers, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

In the description of the embodiments of the present invention, unless otherwise specified, terms such as "first", "second", "third" and so on are only used for descriptive purposes, and cannot be construed as indicating or implying relative importance. In the description of the embodiments of the present invention, it should also be noted that, unless otherwise clearly defined and limited, terms such as "installed", "coupled", "connected" should be broadly interpreted, for example, it may be fixedly connected, or may be detachably connected, or integrally connected; it may be electrically connected; it may be directly connected, or may be indirectly connected via an intermediate medium, channel, apparatus or device. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 diagrammatically illustrates an exemplar of the MF Workflow Worker Assigned Job/Project/Task Menu showing job/project assignments 1 through 6.

FIG. 2 diagrammatically illustrates an exemplar of the MF workflow automation data Structure (ADS) Backend dashboard showing worker schedules (blurred data in this figure is not essential to understand the invention).

FIG. 3 diagrammatically illustrates an exemplar of the Worker Main Menu for Repair (Dispatched).

FIG. 4 diagrammatically illustrates an exemplar of the Worker Main Menu for Repair (In Transit).

FIG. 5A diagrammatically illustrates an exemplar of the ADS Backend Dashboard (In Sync) showing light blue (LBl): in transit; green (Gr): job done; yellow (Ye): on site; and dark blue (DBl): scheduled to be done. In black and white, the color differentiation is medium light gray (light blue, LBl): in transit; medium dark gray (green Gr): job done: light gray (yellow Ye): on site; and dark gray (dark blue DBl): scheduled to be done (the blurred data in this figure is not essential to understand the invention).

FIG. 5B diagrammatically illustrates an exemplar of the ADS Backend Dashboard (In Sync) showing the popup display with real-time specific worker, time and ACTION ITEM currently in process (the blurred data in this figure is not essential).

FIG. 6 diagrammatically illustrates an exemplar of the ADS Backend Sub-Menu for worker time tracking (the blurred data in this figure is not essential).

FIG. 7 diagrammatically illustrates an exemplar of the Worker Selected Data from ADS Backend Worker Tracking Sub-Menu (check mark is "in transit", Transit Clock ON) (the blurred data in this figure is not essential).

FIG. 8A diagrammatically illustrates an exemplar of the Worker Main Menu Navigation ("Navi") selected.

FIG. 8B diagrammatically illustrates an exemplar of the Navigation Selected and Navi Displayed (the blurred data in this figure is not essential).

FIG. 9A diagrammatically illustrates an exemplar of the Worker Main Menu ON Site to be selected.

FIG. 9B diagrammatically illustrates an exemplar of the Worker Main Menu ON SITE Selected.

FIG. 10A diagrammatically illustrates an exemplar of the Work to Perform Sub-Menu (Worker input text).

FIG. 10B diagrammatically illustrates an exemplar of the Work to Perform Sub-Menu (photo).

FIG. 10C diagrammatically illustrates an exemplar of the Work to Perform Sub-Menu (signed).

FIG. 11 diagrammatically illustrates an exemplar of the Completion Form Selected from Worker Main Menu with worker comment text description, completion photo and customer signature.

FIG. 12A diagrammatically illustrates an exemplar of the Add Parts Sub-Menu from Parts and Services Selection.

FIG. 12B diagrammatically illustrates an exemplar of the Part Details after Selecting Part from ADD PARTS Sub-Menu.

FIG. 12C diagrammatically illustrates an exemplar of the Add Parts Sub-Menu After Selection of Part (Green (light gray) indicating selected part, and Red (dark gray) indicating non-selected part).

FIG. 13 diagrammatically illustrates an exemplar of the List of parts added by Worker (the blurred data in this figure is not essential).

FIG. 14 diagrammatically illustrates an exemplar of the ADD SERVICES Sub-Menu (the blurred data in this figure is not essential).

FIG. 15 diagrammatically illustrates an exemplar of the Service Call selected in ADD SERVICES Sub-Menu (textual input).

FIG. 16 diagrammatically illustrates an exemplar of the Parts and Services Screen with compiled parts and services from ADD PARTS/SERVICES Sub-Menu.

FIG. 17 diagrammatically illustrates an exemplar of the Invoice Selected showing parts and services on proposed invoice.

FIG. 18 diagrammatically illustrates an exemplar of the PDF Selected showing parts and services, fees and costs on PDF formatted invoice (the blurred data in this figure is not essential).

FIG. 19 diagrammatically illustrates an exemplar of the Selected Proposed Invoice after selection of Invoice.

FIG. 20 diagrammatically illustrates an exemplar of the Selected PAY showing types of payment options.

FIG. 21 diagrammatically illustrates an exemplar of the Selected MORE option showing additional menu options for worker in "Parts and Services" sub-menu structure.

FIG. 22 diagrammatically illustrates an exemplar of the Worker Main Menu showing remaining Close Work Order task.

Figure 23:
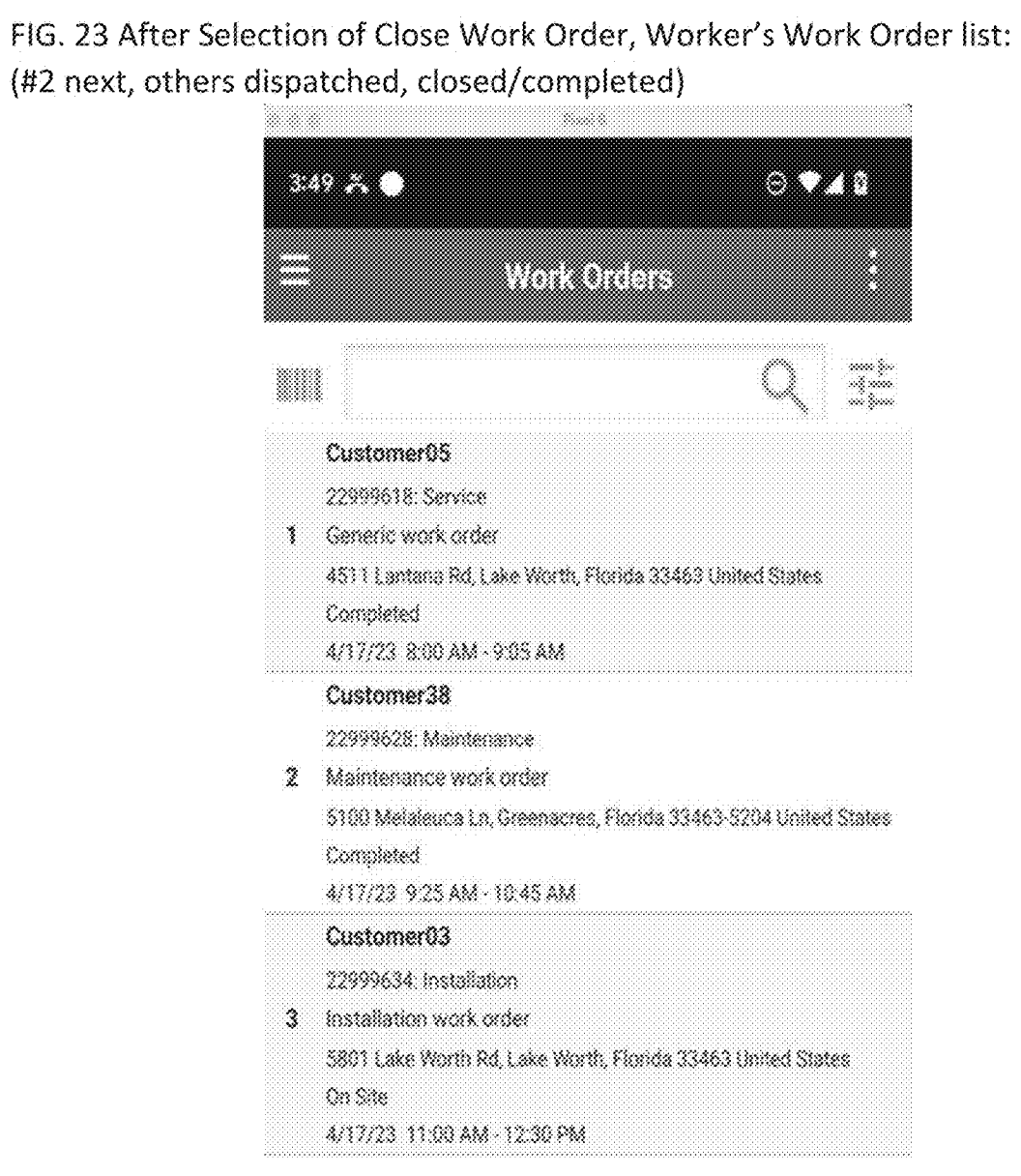

FIG. 23 diagrammatically illustrates an exemplar of the After Selection of Close Work Order, Worker's Work Order list showing dispatched, closed/completed, and other dispatched jobs.

FIG. 24 diagrammatically illustrates an exemplar of the Worker Main Menu Generic Service, Status: Dispatched.

FIG. 25 diagrammatically illustrates an exemplar of the Salesperson Worker Main Menu.

FIG. 26 diagrammatically illustrates an exemplar of the Worker Main Menu, Type: Maintenance.

FIG. 27 diagrammatically illustrates an exemplar of the Action Items Selected and Options displayed.

FIGS. 28A, 28B and 28C diagrammatically illustrate an exemplar of the ADS Backend Work Order '634 Completed Sub-Dashboard (summary) (the blurred data in these figures is not essential).

FIG. 29 diagrammatically illustrates a Selected MORE option for the mobile worker, associated with the Additional Menu Options, permitting the work to enter or input transit expenses by activating "Add Service."

FIG. 30 diagrammatically illustrates an exemplar of the FORMs Selected from ADS Backend Work Order '647 Completed (Forms Sub-Sub-Dashboard for Job/Project) (the blurred data in this figure is not essential).

FIG. 31A diagrammatically illustrates an exemplar of the VIEW Selected for "Work to Perform" row from Forms Sub-Sub-Dashboard for Job/Project (shows thumb image, worker and customer signatures, geolocation and task: date/time tag).

FIG. 31B diagrammatically illustrates an exemplar of the Photo IMAGE Selected for Job/Project from Forms Sub-Sub-Dashboard.

FIG. 31C diagrammatically illustrates an exemplar of the LOCATION Selected from Forms Sub-Sub-Dashboard for Job/Project (shows geolocation of Performed Task and both signatures).

FIG. 32A diagrammatically illustrates an exemplar of the Job or Project Report (page 1, shows customer data, location, Work to Perform text and photo and customer signature).

FIG. 32B diagrammatically illustrates an exemplar of the Job or Project Report (page 2, shows parts used, service description, customer data, location, completed task image, completed task textual description, and both signatures) (the blurred data in this figure is not essential).

FIG. 33 diagrammatically illustrates an exemplar of the Job Costing Sub-Menu Selected for Work Order '634 (completed Job or project) (the blurred data in this figure is not essential).

FIG. 34 diagrammatically illustrates an exemplar of the Metrics Sub-Menu Selected for Work Order '647.

FIG. 35 diagrammatically illustrates an exemplar of the Billing Sub-Menu Selected for Work Order '647 (the blurred data in this figure is not essential).

FIGS. 36A and 36B diagrammatically illustrate an exemplar of the Open Invoice Selected (Inv. '942) Action from MF automation data structure (ADS) Backend dashboard.

FIG. 37 diagrammatically illustrates an exemplar of the Action List from Open Invoice '942 (edit, delete, etc.).

FIG. 38 diagrammatically illustrates an exemplar of the Work Orders Selected from MF automation data structure (ADS) Backend dashboard (shows actions for Work Orders and sub-menu access) (the blurred data in this figure is not essential).

FIG. 39 diagrammatically illustrates an exemplar of the Work Orders Settings (Selected) from MF automation data structure (ADS) Backend dashboard (shows various actions).

FIG. 40 diagrammatically illustrates an exemplar of the Work Order Types Sub-Menu (Selected) from Work Orders Settings (root: ADS Backend dashboard (shows various actions)).

FIG. 41 diagrammatically illustrates an exemplar of the ACTION ITEMS List, including Optional Action Items—Sub-Sub-Menu for Work Order Type (required: in transit, on site, work to perform, complete form, parts and service, close work order; optional: need follow up, etc.).

FIG. 42 diagrammatically illustrates an exemplar of the ADD ACTION ITEM (Selected) Sub-Sub-Menu from Work Order Types Sub-Menu.

FIG. 43 diagrammatically illustrates an exemplar of the Time Constraint Configurations (Selected) from ADD ACTION ITEM Sub-Sub-Menu.

FIG. 44 diagrammatically illustrates an exemplar of the Location Constraint Configurations (Selected) from ADD ACTION ITEM Sub-Sub-Menu.

FIGS. 45A and 45B diagrammatically illustrate an exemplar of the TYPE (Selected) Drop Down List from ADD ACTION ITEM Sub-Sub-Menu.

FIG. 46 diagrammatically illustrates an exemplar of the SHOW WORK ORDER STATUS (Selected) Options and HIDE FEATURE (both from ADD ACTION ITEM Sub-Sub-Menu.

FIG. 47 diagrammatically illustrates an exemplar of the Mobile Worker TYPE REPAIR Main Menu Screen.

DETAILED DESCRIPTION

Figure 48:
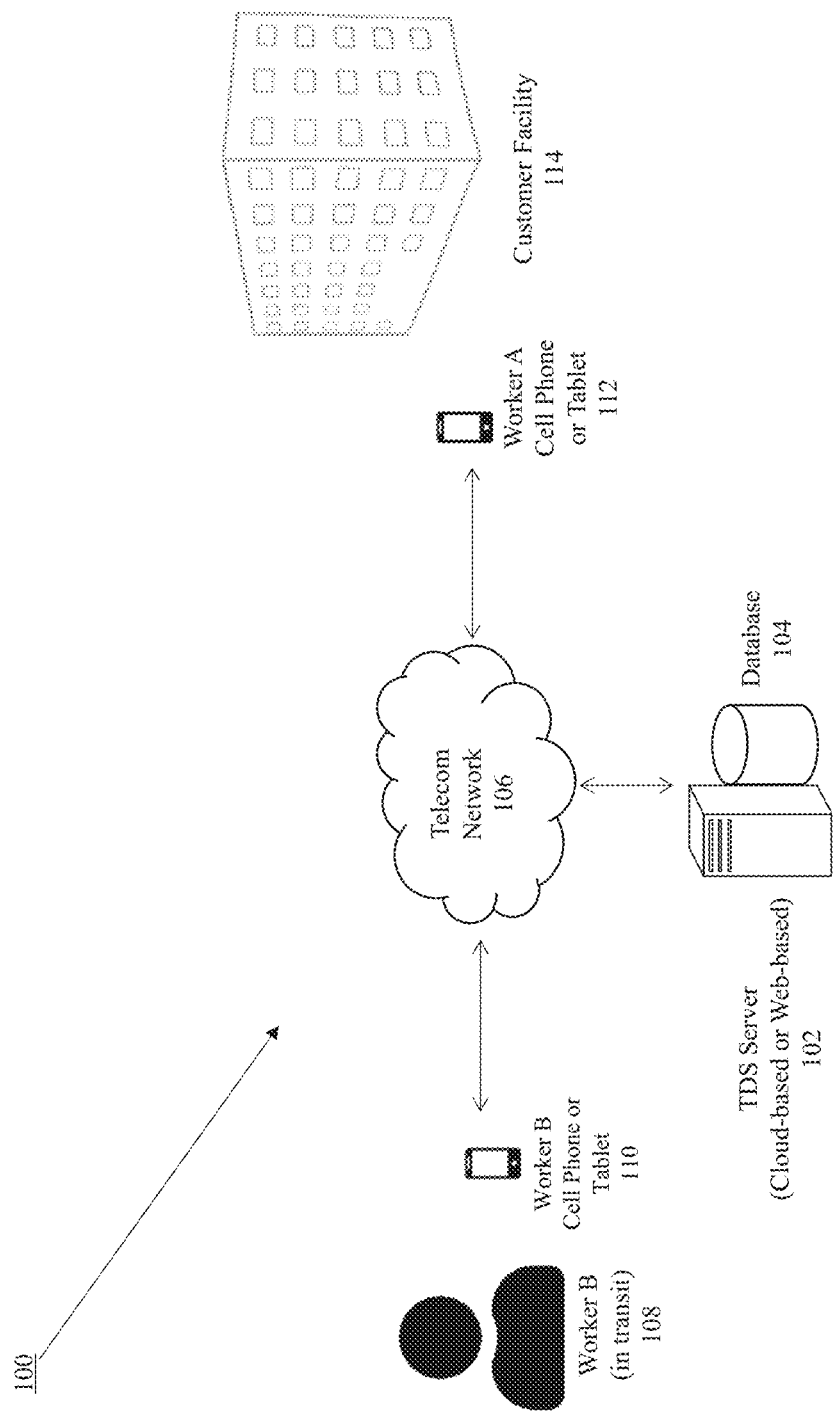
FIG. 48 diagrammatically illustrates the ADS system with communications linkage to mobile workers.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient MF workflow automation data structure (ADS) system for directing, monitoring, instructing, and otherwise interacting with a diverse group of mobile workers operating in the field, that is, at remote customer locations. Embodiments of the invention provide a mobile application (or a series of communicatively coupled mobile applications) provided via a server (cloud-based or server/web-based), an ADS Module for configured for each specific goods and services MF-enabled vendor (each vender V1, V2, V3, etc. having its own customized, configured ADS system), a siloed User Personal Profile (UPP) module for each vendor and associated vendor customer and worker group (the siloed data securely segmenting V1 data from V2 and V2 customer data), a tracking module to generally continuously monitor mobile workers during working hours, and, in an enhanced workflow ADS system, a machine learning module discussed below. These modules are communicatively coupled in order to provide the operational ADS system. In addition, embodiments of the invention provide a method of configuring and operating a MF automation data structure which is an improvement of prior art data structures handling data sets for mobile workers.

The present invention involves a method for configuring and operating a MF workflow automation data structure (ADS) for a MF-enabled vendor servicing a plurality of customers, typically with a plurality of mobile workers. For example, the vendor may provide repair services (including installation of parts), a maintenance service, and a new installation service with new appliances or materials (herein "parts"). In addition, the workflow ADS system can be configured for sales calls by mobile workers. In the sales configuration, the salesperson would have a list of parts, appliances, home or office furnishings, or machines (generally categorically referred to herein as "parts"), and the sales person would make a sales presentation to the prospective customer (also categorically referred to herein as a "customer") and, to complete the sale, the ADS system can be configured to capture the sale, produce electronic communications to the incipient customer related to the proposed goods, and fully support the purchase of goods and parts via the ADS system. The ADS system, as a data structure, provides the mobile worker with vendor-configurable software tools and displays, via the worker's cell phone, tablet or mobile computing device (herein the "mobile device") to adequately fulfill the customer's request at the designated customer destination. Hence, there are many workers servicing one or more customers at geographically dispersed destinations.

The systems and methods described herein are configured to provide several mobile applications (or a series of communicatively coupled mobile applications, sometimes sequentially delivered) provided via a server (cloud-based or web-based) to a plurality of cell phones, tablets, or computing devices carried by mobile workers, some of whom are in transit to a respective customer location, others are at their respective customer destinations, and a third group in transit to either other customer locations or the worker's home base which are communicatively coupled in order to provide the ADS system. The ADS systems and methods described herein are configured to monitor assigned workers (AWs) and create controlled environments for the workers by generating venue-specific and worker-specific instructions, manuals, and sequential operational data commensurate with onsite customer conditions. The system is further configured to track and monitor worker activities in order to gather pre-task data, confirm such pre-task data with the onsite customer, engage the worker to complete the repair, service, collection and transport, or close the sales call with a high level of customer satisfaction. The ADS backend office system continually communicates with the worker's cell phone, tablet or computing device providing forms, processing data captured by the worker, and generating further forms, reports and invoices commensurate with the data captured by the worker, generally onsite, but also, to a limited extent, when the worker is in transit to and from the worker's dispatching of home office.

A general description of the ADS system follows. The ADS system involves a cloud-based or web-based server coupled to a data store. The data store is typically uniquely configured on a per-vendor basis, using a (i) a MF-enabled vendor-user personal profile (UPP) for each MF worker and (ii) a customer UPP. The ADS supports multiple vendors in a siloed, data secure manner such that the data stores of one MF-enabled vendor will not be shared with another vendor. Each worker has a mobile device. The mobile device is a cell phone (including a smart phone), a tablet or a computing device. A communications network communicatively couples the worker's mobile device to the server and the MF-enabled vendor's back office. Each mobile device has a camera, a geolocation module generating geolocation data based upon the location of the mobile device, and an interactive mobile device display screen with perceptual inputs including at least a textual input and a tactile input. A perceptual input is an input that can be perceived and actuated by the user/worker. A textual input may include a pop-up keyboard. A tactile input may be a slide or a touch sensitive button or icon. The perceptual inputs may be tactile alphanumeric input(s) and/or a touch-activated inputs on the mobile device.

The ADS system is a series of menus (for example FIGS. 3, 4, 8A-21) are sometimes sequentially tied together and at other times hierarchically below other selectable and actuatable menus. The menus are downloaded to the assigned worker (AW) phone or computer device and AW interaction with the mobile device creates data, in the form of datasets which is uploaded to the server as a SAAS (software as a service) service to the MF-enabled vendor supplying AWs to service the customer's requests (the job, task or project "Type") (see Table below). The ADS is initially configured with several datasets which are downloaded as needed to the mobile device. These datasets are stored in an ADS data store or computer memory (potentially a database memory) per MF-enabled vendor. As earlier explained, each vendor can only access its own data store and the UPP data stores of its customers' UPPs. Although the explanation below discusses operations and systems in connection with relevant customer, the ADS operates by providing downloadable datasets to multiple mobile workers servicing multiple customers at diverse customer destinations for a vendor, all supported by the vendor's secured data store.

FIG. 1 diagrammatically illustrates an exemplar of the MF Worker Assigned Job/Project/Task Menu showing job/project assignments 1 through 6. The Assigned Worker (AW) may be required to attend to the customer in the numerical sequence presented or, in a different embodiment, the AW may view customer task details and then select the job or task out of order.

FIG. 2, described later, diagrammatically illustrates an exemplar of the ADS Backend dashboard showing worker schedules.

FIG. 3 diagrammatically illustrates an exemplar of the Worker Main Menu for Repair (Dispatched). The invention is best described by the operation of the MF worker screen displays as shown in FIGS. 3, 4, and 7-23.

In FIG. 1, the MF worker or assigned worker (AW) selects the job or task. The priority or sequenced-presented display of the jobs may be altered by the MF-enabled vendor via the back-end main menu (FIG. 2) on an as-needed, as-wanted or priority-based sequential presentation. The back-end main menu (FIG. 2) is explained later.

The present invention includes an interactive worker main menu display FIG. 3 on the worker's mobile device. The display is, in one embodiment, a horizontally bifurcated user interface (UI) display with first and second UI segments, 10, 12. Effectively, the ADS downloads pre-programmed datasets to the worker's device, the worked inputs data into his or her device, the device then uploads the created dataset to the ADS server and data store, processes the upload, and then downloads additional, supplemental datasets which enable ultimately completion of the task (the job or project) at the customer's destination. The first UI segment 10 on the AW mobile device displays static (substantially non-changeable) displayable datasets which nominally include: (a) a customer dataset ("CUSTOMER," FIG. 3) unique to the relevant customer being serviced including customer name, destination address and contact data, and (b) a customer-related job or project type (collectively referred to as a "Type," as in a type of job or a type of project, see FIG. 3). Of course, there are several Types of jobs and projects enabled by the ADS. The job/project Type is initially pre-selected by the MF-enabled vendor's system operator or administrator (Sys Admin) dependent upon the customer's request for goods or services.

An embodiment of the present invention includes job or project types for a repair job, a generic service job, a sales presentation project, a maintenance service job, and a service call job. Further refinements may include initially configuring and storing datasets enabling color-coding, with a first color display (for example RED, DARK GRAY), indicia 13 on the AW device showing all R-actions in RED as part of the worker's interactive displayable dataset or datasets. This first color (RED) representing a non-completed R-action. The downloaded datasets may have color-coding data using a second color display indicia 15 (GRAY or MID-GRAY) for all O or Optional actions (O-actions) in the worker interactive displayable dataset(s). The second color MID-GRAY 15 representing the optionally selectable worker action. In this manner, after initially configuring the ADS data store as noted herein, the server changes the color-coding to a third color 17 (GREEN, LIGHT GRAY) for all R-actions in the AW interactive displayable dataset(s) after completion of the particular R-action. The server downloads the third color R-action worker interactive displayable dataset to the AW mobile device. For example, in FIG. 3 "in transit" is a required R-action, and color-coded indicia 13 dark gray, but when the AW is on the way to the customer, the color indicia changes from dark gray indicia 13, FIG. 3, to light gray, indicia 17, in FIG. 4 when the AW phone detects mobility towards the target customer.

The first UI segment 10 has a changeable displayable worker current-status indicator dataset ("STATUS", FIG. 3) based upon a real-time (RT) geolocation dataset captured by the server from the worker's mobile device. In this manner, for the plurality of workers assigned (AWs) and, in the field, this means that the server tracks the geolocation of all assigned and scheduled workers.

The main menu also has a second UI segment 12 on the device. The second UI segment has a plurality of worker interactive displayable datasets nominally including (i) at least three (3) required worker action items (R-actions) (there are multiple R-actions and R-action datasets which are different for different tasks, jobs, projects and Types) (indicia 13, dark gray or red). See FIG. 3, "in transit", "on site", "Completion Form", "parts and services", "close work order"). Three R-actions are considered to be the nominal set of required actions. For example, R-action (RED or DARK GRAY) "Completion Form" and "close work order" can be combined into one R-action for certain project/jobs for a Type of task. All R-actions are preprogrammed such that the R-actions can only be sequentially actuatably selectable by the assigned worker (the R-actions must be executed and fulfilled in a sequential manner, first R-action 1 then R-action 2, then R-action 3). The second User Interface data set 12 also includes (ii) at least one optional worker action item (O-action) (again, there are multiple preprogrammed O-actions, which are different for different tasks, jobs, projects and Types), indicia 13, mid-gray. Each O-action is actuatably selectable as needed by the assigned worker.

The invention advantageously includes the nominal three R-actions which are required to be fulfilled for the Type of task, job, or project assigned to the worker. A small list of R-actions include: a first R-action representing an "in transit to destination" task event by the assigned worker; a second R-action related to a worker fulfillment task event specific for the assigned Type, and a third R-action representing either a completion action or a close action task event by the assigned worker. The optional O-action 15 is optionally selectable by the assigned worker as one or possibly several supplemental fulfillment tasks or events. All these actions are associated with the task/job/project Type for the customer.

In the illustrated example of the invention in FIG. 3 (Worker Main Menu), the mobile worker is presented with a worker main menu screen. The main menu lists the following fields and data elements:

| Main Menu Table |
| --- |
| STATUS: dispatched |
| TYPE: repair |
| ASSIGNED TO: Mobil user2 . . . Mobile worker 2 |
| DATE - TIME |
| CUSTOMER: Company 01 |
| CONTACT (CUSTOMER): name, phone |
| LOCATION: Company one: address |

The ACTION ITEMS (R-Action, indicia 13) are, in general, selectable actions to be taken by the mobile worker in the sequence as presented. See FIG. 3, Worker Main Menu for Repair (Dispatched) and FIG. 4, Worker Main Menu for Repair (In Transit, marked in GREEN. Light gray, indicia 17, shown in very light gray in the Figure). The ACTION ITEMS associated with the RED (dark gray 13), check-marked icon, are REQUIRED and these action items must be completed before the worker selects the CLOSE WORK ORDER action item. The ACTION ITEMS noted in the GRAY (mid gray, indicia 15) check-marked icons are optional. ACTIVE ITEMS or R-actionable include: in transit; turn by turn navigation; on-site; work to perform; completion form; part & services; close work order.

Discussion of ACTION ITEMS. One of the key concepts of the present invention is the step-by-step sequentially REQUIRED (RED, 13) action items (R-actions) and the interspersed sequential OPTIONAL (MID GRAY, 15) action items (O-actions). The action items are initially configured by the system administrator or system operator (herein "Sys Admin") during an initialization phase. The ACTION ITEMS are effectively based upon job "type". The system administrator, prior to utilization of the mobile worker data structure, has identified ACTION ITEMS and the sequence of steps needed for each "type" activity.

Selecting the "in transit" ACTION ITEM changes color of the "in transit" action icon from RED 13 to GREEN 17 (FIG. 3 transitioning to FIG. 4), RED 13 being a required action, GREEN 17 being an action item "in process," and MID GRAY 15 being an optional action item. In black and white, RED is dark, dark gray 13, MID GRAY 15 is medium dark gray and GREEN 17 is light gray. Once the "in transit" selection is made by the mobile worker, the MF automation data Structure (ADS) system typically reacts by either one or the other of sending an email or a text to the customer that the mobile worker is in transit and moving towards customer's location, that is, the task destination. In addition, the ADS system may provide an estimated time of arrival. Some of the following patents discuss customer communications and time of arrival systems: U.S. Pat. Nos. 9,740,999; 8,971,853; 9,123,005; 8,977,236; and 9,818,074. The customers are notified via email or text or alternatively a pre-recorded voice call is made to the customer. The prerecorded voice call would be populated with the mobile worker data (possibly the name of the mobile worker) and the pre-recorded "in transit" message, and possibly the real-time inserted time-of-arrival. Also, the customer may also be provided with a link whereby the customer can see, in real-time, the location of the mobile worker.

FIG. 2 shows the ADS Backend vendor menu for the ADS System. FIG. 2 shows the MF automation data structure (ADS) Backend dashboard with worker schedules MF or Mobile Worker Users 1-6. The backend of the ADS system is synchronized with the real time data (a) supplied by the mobile worker cell phone and (b) obtained directly from the worker's cell phone (such as the geolocation of the cell phone and hence the worker). See FIG. 5B ADS Backend Dashboard (In Sync) showing light blue (LB): in transit; green (GR): job done, yellow (Y): on site, dark blue (DB): scheduled to be done. Referring to the backend of the ADS system, when the mobile worker has activated the "in transit" action, the backend of the system changes the status color of that task associated with the mobile worker on the Sys Admin dashboard or main menu screen. On the backend dashboard screen, the LIGHT BLUE LB color-coded job, project or task indicators indicate a worker "in transit."

When the system administrator clicks on that activity box, a pop-up mini-screen appears (see FIG. 5A) showing more task/job/project data such as job number, customer name, customer location, mobile worker name or identifier, the status of the mobile worker "in transit", the TYPE of work designated for that worker at that customer location, and potentially the expected time of worker arrival at the destination.

On the dashboard of the ADS system, GREEN GR color-coded boxes indicate jobs/tasks/projects are awaiting some action by the larger mobile worker group, that jobs which currently are assigned to one or more mobile workers but are not yet subject to any action by the mobile worker group. YELLOW Y color-coded boxes indicate that the mobile worker is on-site. DARK BLUE DB boxes indicate job/task/project scheduled and assigned to a single mobile worker or a group of mobile workers, but to be acted upon. LIGHT BLUE LB indicated worker in in transit. DARK BLUE DB identifies jobs/tasks/projects yet to be attended to or, not yet completed. The latter status DB items have been assigned to a mobile worker. As used herein, the term "mobile worker" also includes the concept that a group of workers may be assigned and dispatched to the customer's location. An assigned worker AW may be several workers assigned to a task at a customer destination. The worker may be a salesperson.

The workflow ADS system automatically does time and geolocation tracking of all mobile workers who have activated the first ACTION ITEM on the worker's main menu (FIG. 2, R-action, indicia 13 "in transit", selected and then when the AW phone indicates transport to the destination, the indica changes to 17 (light gray) indicating in transit. The backend then changes color from GR GREEN to LB in transit. This data collection in FIG. 5B, pop-up window, (start time, initial geolocation, and clock ON for transit time) is important to the system administrator and the company either employing the mobile worker or paying the mobile worker as an independent contractor. In some limited situations, the customer will be billed for in transit time. However, in other situations, the in transit time is NOT billed to the customer but the in transit time should be accounted for by the Sys Admin and the ADS system. Either the company operating the ADS system pays its employees for in transit time to the destination or, in the case of an independent contractor, the contractor submits a bill to the company operating the ADS and the contractor's bill includes time factor charge for in transit work time.

From a purely economic standpoint, the customer always pays for in transit time to destination and transit time from destination whether the customer knows he or she is being billed on the invoice or whether the invoice price of goods and/or services incorporates in transit time. One of the several important concepts in the present invention is that the company operating the ADS system can accurately capture both in transit time and onsite time and account for all mobile worker expenses and goods associated with the task/project. Real-time tracking is important for the data collection, for worker salary (or contractor payments), profit margins, ROI metrics and the pricing of goods and services provided to the customer.

The ADS can be configured as a dynamic pricing system to account for in transit time to and transit time from a customer's location. This dynamic pricing system would (a) initially obtain information from a customer seeking services at a designated location, such as TYPE of repair/service and the destination location, (b) estimate the parts and equipment needed for the task/job again based upon the TYPE, (c) account for the "in transit to" and possibly the "in transit from" time for an assigned worker (or one of several workers form a mobile worker group), and the (d) generate a proposed invoice for the TYPE of job/project requested by the customer. In this dynamic system, the customer-facing interactive computer display screen (or the customer's cell phone screen) would have a short list of TYPEs of tasks/jobs for repair/service. As a simple example, a plumbing repair company may have customer-facing online TYPE menus permitting the customer to select: broken kitchen sink pipe, broken washing machine pipe, water heater not working, water heater leaking, refrigerator leaking water, small leak in kitchen, other (representing non-listed tasks/jobs), etc. Once the ADS system obtains task/job data and necessary customer data (name, address, phone, email, etc.), the system dynamically in real-time generates a "fee estimate" for the service based upon: typical time in transit (average time for the TYPE and for the customer's neighborhood), time from destination, and some rough estimate of replacement parts or consumables typically used in plumbing jobs of that TYPE (consumables being plumber's tape, patches, glue, etc.). The customer-facing ADS interactive input screen then presents the fee estimate to the customer which can be ACCEPTED or REJECTED or modified by the customer. Once accepted and assigned or selected by the worker, the job/task is posted on the ADS system dashboard and the event moves forward. This dynamic system may utilize the machine learning or AI module of FIG. 49.

A high level view of the dashboard operation follows. Once the ADS data store is initially configured by (a) the Sys Admin (the vendor's CIO) and then (b) by customer-unique data (for example the Type of task/job/project) and the data is all stored as datasets in the data store, the ADS server, interactively in conjunction with the assigned worker's (AW) mobile device, operates the ADS and the device in the following manner. The ADS system generates a MF-enabled vendor back office multi-worker time-blocked schedule display (FIG. 2) for all assigned workers associated with scheduled jobs or projects. See GR blocks at time 8:00 AM column. AWs are mobile users 1-6. This multi-worker time-blocked schedule display is effectively a vendor dashboard showing, for example, the days of the week M-F (horizontal calendar display), and typical worker time blocks 8 AM to 6 PM (vertically presented on a day to day basis). Each assigned or scheduled worker task is displayed in a cell GR in 8 Am column in the time-blocked schedule display matrix. The assigned worker job cell nominally displays assigned worker data (e.g., name, or ID) and customer data (name and destination or name and Task at destination) within the time-blocked schedule. The time-blocked schedule conforms to the Time dataset for the relevant customer. In other words, if the Time constraint is 9 AM-11 AM, the worker assigned to the customer appears within that Time constraint timeframe.

The assigned worker AW, upon leaving for the customer destination or location, actuates the first R-action "in transit to destination" task event (FIG. 3). As a result of the server and data store being communicatively coupled to the assigned worker's mobile device, the server accepts the MF automation dataset from the AW device. The worker actuates the first R-action indicia 13 by a touch or swipe action in the interactive display on the AW device (that is, in the second UI segment 12). In FIG. 3, the first R-action is "in transit."

The ADS server monitors and accepts, in substantially real-time (RT), an updated or then-current RT geolocation data from the assigned worker's (AW) mobile device. An embodiment of the present invention may include the server responding to the AW's device by changing the color-coding of the first R-action "in transit" interactive display on the mobile device. In this manner, although the worker swipes or touch-activates the in transit R-action, it is the system that checks the geo-location of the device prior to proving a dataset to the AW device that the worker is, in fact, in transit to the customer's destination or location.

In addition, on the MF-enabled vendor's dashboard, the server, in an effectively substantial RT mode, color-codes the assigned worker's cell in the time-blocked schedule display dashboard with a first color-code GR upon the AW's actuation of the first R-action showing the in transit task event. If server confirmation is required, the dashboard changes the AW time-block when the server confirms the geolocation in transit event to LB, light blue. Further, the server, via a downloadable dataset, changes the worker's changeable displayable worker current-status indicator dataset on the mobile device (in the first segment 10 of the device's UI) to indicate an "in transit" event based upon the updated then-current RT geolocation MF automation dataset transmitted to the AW mobile device. Also, the AW's first R-action UI display (in the second UI segment 12) changes its color-coding based upon the updated RT geolocation data from RED 13 in FIG. 3 to LIGHT GREY 17 in FIG. 4. The server (and data store) sends a first R-action UI displayable dataset indicating "in transit" to AW's device and the AW device changes color codes from 13 to 17.

Returning to the illustrated example, FIG. 5A Dashboard (In Sync), the ADS dashboard backend system indicates when the mobile worker is on-site (YELLOW Y coded). This on-site data is a critical data capture for both revenue determination by the system administrator as well as compensation of the mobile worker or contractor. FIG. 5B shows the Dashboard after the user has selected a particular worker in a certain time block (see hand on designated worker's activity box in time block 11 AM).

The Sys Admin can obtain real-time data on any task/job/project displayed on the main dashboard by selecting the color-coded box. The dashboard box itself displays nominal data about the task/job. As an example, the popup box displays: work order number, customer name, address, and the particular worker conditions: On Site, Installation. Name of mobile worker, and installation work order. Once the popup box is selected by the system operator, additional task/job information is displayed in a pop-up window. See FIG. 5B. The Sys Admin at the initialization phase can expand the size of the popup data window and the displayed data in the popup box. The Sys Admin dashboard is typically a work week sized display and hence the amount of data in each job/task/project box initially displayed on the dashboard has limited data. In one embodiment, the column on the left lists the mobile worker and the assigned tasks are set forth in the adjacent row, delimited by time of day.

A display screen active region triggers a selectable sub-menu from the interactive display screen or dashboard. The backend system also displays project/job time data because the system tracks time for each mobile worker and the submenu popup window is continually updated in real-time. By selecting one specific job/task box display from FIG. 5A, MF automation data structure ADS Backend dashboard showing worker schedules, the dashboard, (for example, Mobile Worker1 at time 11 AM) for a particular job/task, a popup mini display shows, in real-time, the worker (or worker id), the customer, the assigned task, and other critical data, such as time-of-arrival on site.

Alternatively, from the dashboard, FIG. 5A, Dashboard in Sync, the Sys Admin can select an icon on the upper right side of the dashboard which causes the system to generate a list of workers currently active (see FIG. 6, ADS Backend Sub-Menu for worker time tracking) in that preprogrammed time period (week or month, as pre-programmed by the Sys Admin; or for some large number of workers, the daily "on call" worker list). This worker sub-menu in FIG. 6 is a collection of the currently active mobile workers in the worker group. The worker's names and id codes are displayed in the left-side column. The Sys Admin, by selecting the right-side icon in the displayed worker row, causes a display of additional real-time data. See FIG. 7, Worker Selected Data from ADS Backend Worker Tracking Sub-Menu (check mark notes "in transit", Transit Clock ON, for determining time-of-arrival for the mobile worker at the customer's destination, blurred data is not important). For example, in this sub-menu level screen, the data includes: job/task, customer, destination (customer's designated destination), the current time, the current "status of worker" (that is: in transit, on site, interacting with "completed form/task" or any other pre-programmed ACTION ITEM), and other programmed data. In the illustrated example, the ADS backend menu screen shows that the mobile worker is in transit, customer's location, and details of the currently active task (ACTION ITEM) subject to fulfillment by the mobile worker.

Returning to the mobile worker in the field with his or her smart phone, AW's selection and actuation of the R-action "in transit" results in an upload dataset from the mobile device to the server and the upload includes the geolocation of the mobile device. The server confirms the AW "in transit" selection with the geolocation data and then changes the color coding on the AW device. The server, via a downloadable dataset, also changes the worker's changeable displayable worker current-status indicator dataset ("STA- TUS" FIG. 3) on the mobile device (in the first segment of the device's UI) to indicate an "in transit" event based upon the updated then-current RT geolocation MF automation dataset transmitted to the AW mobile device. Also, the AW's first R-action UI display (in the second UI segment) changes its color-coding based upon the updated RT geolocation data. The server (and data store) sends a first R-action UI displayable dataset indicating "in transit" to AW's device.

A refinement of the invention in connection with the first R-action (the "in transit" task event) the AW can select a sub-menu navigation or navi route display map (see FIG. 8A selection turn by turn). The route display map is a map sub-menu hierarchically below the first R-action actuation and is actuatable by the assigned worker.

Returning to the mobile worker in the field with his or her smart phone (FIG. 8A, Worker Main Menu Navigation selected), the action items shown in MID GRAY 15 indicate to the mobile worker that such action item is optional. In the illustrated operational example, the worker has activated the IN TRANSIT icon 17 (see FIG. 4, Worker Main Menu for Repair (In Transit)) and the NAVIGATION ACTION ITEM is displayed in LIGHT GREY 17 whereas the IN TRANSIT ITEM is illustrated in GREEN confirming that the worker is in transit to the designated destination. For example, in connection with the navigation selection (FIG. 8B, Navigation Selected and Navi Displayed), by clicking on that navigation selection, a route map is presented to the mobile worker to assist the worker in his or her efforts to travel to the customer's location. The route data on the map includes: preferred routes, alternate routes, traffic indicators, high traffic indicators in RED dark gray, and other commonly provided information such as estimated transit time for arrival, and one or two or more routes identified by the mapping system. The navigation system also indicates fuel efficient routes and no toll routes. Once NAVI or NAVIGATION ITEM is selected, the system alters the color of the right-side icon GREEN 17, indicating completion of that element of the TASK.

Returning to the mobile worker's smart phone primary display menu (FIG. 3, Worker Main Menu for Repair (Dispatched)), all of the REQUIRED ACTION ITEMS are indicated with a RED color-coded icon (DARK GRAY 13 in the black and white ("b-w") drawings). The MF automation data structure or ADS prohibits or blocks a worker's effort to bypass REQUIRED ACTION ITEMS until all the earlier designated ACTION ITEMS have been completed per the preprogrammed task-specific protocol. This sequence-required programming is established at system initialization.

When the mobile worker is at the customer's location, the mobile worker selects the ON-SITE action button. This is an R-action event. The "in transit" selection could be the first R-action or, alternatively, the first R-action could be the "on site" selection. See FIG. 9A, 9B, Worker Main Menu ON SITE Selected. The ON-SITE ACTION ITEM changes color from RED 13 (required) to GREEN 17 (in progress or, in some instances, GREEN 17 is only indicated when the ACTION ITEM is completed). At this on-site moment, the system starts a different time tracking, resets the backend display available to the system administrator (see FIG. 5A, ADS Backend Dashboard (In Sync)), and resets an on-site time clock to monitor on-site time and saves that on-site data for later processing. Also, the time of arrival data point is captured in the data structure in addition to the worker's cell phone geolocation.

The ADS system cross checks the customer's location data with the worker's cell phone geolocation data and, if there is an error, initiates a MANAGER FLAG to spur the on-call administrator to investigate this potential error. The ADS system has preprogrammed territorial regions such that the worker's cell phone geolocation need only be within the programmed territorial region of the customer's location. The ON SITE TIME data, LOCATION MATCH and LOCATION ERROR, if any, is logged into the ADS system as a permanent data capture. At this moment, the ADS system can be configured to generate an email or a text message to the customer providing real-time information to the customer that the mobile worker is at the customer's location. Also, the system can be programmed to send simultaneous, multiple emails/texts to several designated customers and customer representatives (such as managers of the customer seeking the service or goods at the customer's location).

The dynamic interaction of the backend ADS system and the worker's cell phone is configured such that the ON SITE ACTION ITEM will not be turned GREEN 17 from RED 13 (required) if the work's geolocation, as generated by his or her cell phone, matches the customer's location. The ADS system monitors the ON SITE worker selection and then, after confirming the cell phone location is within the territorial region of the customer's location, alters the ACTION ITEM color-code from RED to GREEN, indicating a locational match.

High Level Main Menu and Sub Menus. A number or plurality of interactive sub-menu datasets preferably includes at least one of: (1) a work to perform (WP) sub-menu dataset including a WP textual input sub-segment, WP photo capture input, a WP photo image display sub-segment, and a WP tactile signature input sub-segment; (2) one of several goods-related (GR) sub-menu datasets. These data sets are preprogrammed and selected by the Sys Admin during the initialization phase from a group of GR sub-menu datasets including (i) a parts-installed sub-menu dataset displaying a selectable list of potential parts to be installed, (ii) a parts-to-order sub-menu dataset displaying a selectable list of potential parts-to-order, and (iii) a goods-available for sale sub-menu dataset displaying a selectable list of potential goods for sale. Another nominal interactive sub-menu dataset is (3) a services to perform (SP) sub-menu dataset including at least a SP textual input sub-segment or a SP sub-menu dataset displaying a selectable list of potential services to be provided and the installed by the worker. As indicated earlier, all of these interactive sub-menu datasets, when pre-selected by the Sys Admin to initialize the ADS, are either one by one or are all related to the task/job/project Type. Oftentimes, these interactive sub-menu datasets are hierarchically either triggered or accessed below the three nominal R-actions (or all R-actions related to the Type of task/job/project) and/or are hierarchically selectable or presentable below the task-related O-action.

Moving forward to what may be classified as the second R-action, typically a "work to be performed" or WP R-action mid gray 15, the server (and data store) accepts an assigned worker (AW) actuation of the second R-action which represents an incipient worker related fulfillment of a task event relevant to the on-hand task/job/project. Several steps then occur: (1) on the MF-enabled vendor's dashboard, another or further color-coding is presented in and on the assigned worker (AW) cell in the time-blocked schedule display. This is a second color-code based upon the AW actuation of the second R-action tactile perceptual interactive display. Next, (2) the server downloads at least one or the other or all of the WP (work to perform) sub-menu dataset(s), the GR sub-menu dataset(s) (goods/parts to be used) and the SP sub-menu dataset(s) (services to perform). These datasets are downloaded to the AW mobile device. Additionally, (3) the server accepts and stores, in the data store, a corresponding second R-action data input, by the assigned worker (AW) interacting with his or her AW mobile device. This corresponding second R-action data input results in the server's generation and downloading of one or the other or all of: supplemental WP sub-menu (sWP) dataset(s), supplemental GR sub-menu (sGR) dataset(s) and supplemental SP sub-menu (sSP) dataset(s). The sever then (4) changes the color-coding on the AW mobile device in connection with the downloaded second R-action UI displayable dataset or datasets based upon the AW actuation of the second R-tactile input (an AW action).

Another embodiment of the present invention includes the use of a further R-action in addition to the three R-actions with corresponding datasets for WP (work to perform) sub-menus, GR sub-menus and SP sub-menus (these menus being downloadable datasets). The further R-action, like all other R-action datasets, is only sequentially actuatable after the second R-action is completed and reported to the server. The further R-action is related to the worker fulfillment task/job/project or Type. The further R-action is another further worker interactive displayable dataset in the plurality of worker interactive displayable datasets in the second UI segment 12. The result being that the further R-action is sequentially and hierarchically below the second R-action and access to the further R-action dataset is blocked until completion of the second R-action dataset.

In the illustrated embodiment in FIG. 9B, Worker Main Menu ON SITE Selected, the main worker main menu display shows an optional selection color code 15, WORK TO PERFORM.

The illustrated embodiment in FIG. 10A, Work to Perform Sub-Menu (Worker input text), shows that the worker is then permitted, via a sub-interactive menu display, to enter or type in a description of the job to perform at the designated location. In an enhanced ADS system, while the worker is inputting the initial textual description of the project, the worker's phone is interactively communicating with the ADS system and, upon worker data input into the DESCRIPTION data capture bar on the WORK TO PERFORM menu, the ADS system provides a drop down menu list of items matching the input DESCRIPTION data. Voice to text function may be used on the AW phone. See "need to fix water heater" in the illustrated example FIG. 10B.

Once the WORK TO PERFORM task data is entered, the worker may take a picture of item or items at the customer's location which need service or replacement. See photo FIG. 10B, Work to Perform Sub-Menu (photo). The worker uses the phone's camera function. Once the WORK TO PERFORM has been logged into the phone (this data also being transmitted in real-time to the ADS system), the worker may be requested to sign the WORK TO PERFORM interactive display screen. See FIG. 10C, Work to Perform Sub-Menu (signed).

Best practices require the worker on site to enter the TASK TO PERFORM, take one or more pictures of the item-to-be repaired and/or the environment of the item-to-be repaired. The AW signature by the mobile worker then confirms the needed repairs or replacements. Hence, the signature is a best practice tool. Once photos are obtained, a thumbnail image of the photo is displayed on the mobile worker's phone. It is important to note that the system operator or system administrator during the initial configuration of the mobile worker data structure may have multiple WORK TO PERFORM interactive screens, layered as sub and sub-sub menus beneath the primary WORK TO PERFORM interactive display screen. Stated otherwise, once the worker initially inputs data in DESCRIPTION, the ADS system may have one or more sub-menu WORK TO PERFORM interactive display screens providing more detailed and robust instructions to the worker based upon the initially input DESCRIPTION. These follow-on or sub-menu WORK TO PERFORM interactive screens may require different photos and views of the on-site repair or service commensurate with the task at hand.

The ADS system is designed as a multimedia data capture system with photographs, signatures and, in some instances, electronic payment functions. FIG. 10C Shows customer signature capture. FIG. 10B, Work to Perform Sub-Menu (photo), shows that once the photo is taken, the worker's cell phone transmits the image to the ADS backend system and, upon upload to the ADS database structure, the ADS system informs the worker's cell phone of the IMAGE CAPTURE or SAVED. In this manner, the ADS system works in real-time to keep the on-call manager or ADS administrator fully informed of the situation. This real-time interaction with the ADS Sys Admin or manager on call is critical when the project to job is not ordinary or common. In other words, the condition of the customer's equipment or facility may not be common and may need an uncertain amount of work, parts, etc. to bring the customer's equipment or facility into a fully operational status. A real-time description of the situation with photos and, possibly, short videos, may be highly beneficial to the customer.

The ADS system can be dynamically linked, via communication channels, to the worker's cell phone, tablet or computing device, the ADS backend system (typically a cloud-based system, but may be configured as a website supported and powered by server) at the worker's staging office and to a secondary office which is the customer's customer. For example, gas and oil well heads are oftentimes extremely remote and not near any manned building. There are service and repair companies (the worker's staging office) that provide mobile workers to repair, monitor and maintain these remote gas and oil well heads. These service and repair companies are hired by the well or gas head managers who, in turn, report to well or gas head owners. The owners pay the managers who, in turn, pay service and repair companies based upon work needed at the oil or gas well head. Sometimes these are time plus materials contracts. The service and repair company operates the ADS system. When workers visit these wellhead facilities to monitor conditions, they record onsite operating data, and provide needed repair and otherwise service the well head machinery. This data is logged into the ADS system. Upon the worker's onsite arrival, the ADS customer's head manager's office is notified via email, text or other agreed-to data communication link and agreed-to data transfer. In addition, the customer's customer (that is, the well or gas head owners) may also receive real-time onsite data, and data about needed repair and service of the well head machinery. The secondary data transmission to the customer's customer most likely will be a truncated or abbreviated version of the primary ADS-to-customer system communications. The ADS system can be dynamically programmed for simple onsite repair and service calls or multiple level reporting systems delivering repair, monitor and maintain onsite equipment, systems and components.

Returning to the main worker menu, the on-site action item is colored GREEN 17 (FIG. 9B, Worker Main Menu ON SITE Selected), and upon entry by the mobile worker of the WORK TO PERFORM data obtained from the customer's location, the WORK TO PERFORM action item then color-coded GREEN.

Optional Menus in General. In addition to the required R-actions, the AW device has optional or O-action selectable displays indicia 15 on the AW main menu screen display. The server and the data store accepts an AW's optional selection of one or more O-action(s) and, in that event, downloads one or the other or all of the WP sub-menu dataset(s), the GR sub-menu dataset(s) and the SP sub-menu dataset(s) to the AW mobile device. The result, from the AW side, is the server accepting uploaded datasets, based upon AW inputs, corresponding to O-action data input data by the assigned worker as sWP dataset, sGR dataset and sSP dataset. Advantageously, these sWP, sGR and sSP datasets may provide data to the server and the data store either in the R-action mode or the O-action mode or both, dependent upon preprogramming or initialization by the Sys Admin. The server, using these uploaded datasets, generates invoice data (representing an invoice for the customer being serviced) based upon the sWP, sGR, and sSP datasets.

An embodiment includes at least three O-actions being optionally selectable by the assigned worker, AW, as supplement fulfillment task events for the relevant job/project Type as per the relevant customer's initial service request. In this embodiment, three O-actions seem to be optimal for most workers. These O-actions include a WP (work to perform) sub-menu dataset, one or more GR (goods related to the task/job/project) sub-menu datasets, and the SP (services to perform) sub-menu dataset. Once the ADS is configured in the data store by the Sys Admin, the server accepts the AW's optional selection of O-actions and downloads the then-requested WP, GR and SP sub-menu datasets to the mobile device. Upon further AW actions guided by these menus, the server accepts and stores resulting data as sWP datasets, sGR datasets and sSP datasets.

In some embodiments, the AW does not respond to the sub-menu directions, and the resultant "no action" is considered to be a NULL dataset resulting from the earlier downloaded sWP, sGR and sSP datasets. The Sys Admin can configure the ADS system to have the mobile device report back to the ADS server the NULL dataset. The server stores associated NULL indicators for the job/project Type. Alternatively, the AW may have a actuatable selection on the sub-menu indicating a NULL event for the WP sub-menu or the GR submenu or the SP sub-menu. An additional embodiment uses a NULL dataset or datasets in the situation wherein the relevant customer does not elect customer time constraints or location constraints or preference data (discussed later herein). In that case, the time constraint is a NULL dataset and/or the location constraint is a NULL dataset.

FIG. 10A diagrammatically illustrates an exemplar of the Work to Perform Sub-Menu (Worker input text). In FIG. 10B the AW has types in the description of the job to be do=ne and has taken a pre-repair photo of the item to be repaired. FIG. 10B diagrammatically illustrates an exemplar of the Work to Perform Sub-Menu (photo). FIG. 10C diagrammatically illustrates an exemplar of the Work to Perform Sub-Menu wherein the AW has signed the completion display.

Complete and Close at a High Level. See generally FIG. 11. When the job is complete, the mobile worker selects COMPETION FORM. One embodiment of the present invention includes a consolidated R-action (third R-action) completion/close action (CC) interactive sub-menu dataset to enable the worker to complete the task/job/project with a completion action. Alternatively, the close action task event is similar to, but can be distinguished from the completion task action or event as explained hereinbelow. The CC sub-menu dataset nominally includes: a CC textual input sub-segment (enabling the worker to enter alpha-numeric data, which is ultimately uploaded to the ADS server and data store), a CC photo capture input (enabling the worker to photograph the completed task/job/project), a CC photo image display sub-segment (permitting the worker and the customer to see the image or images of the completed job), and a CC tactile signature input sub-segment. The tactile signature input enables the worker and/or the customer to electronically sign-off on the completed job or task.

Additionally, the server accepts an AW actuation of the third R-action representing either a completion or "complete" action task event or a "close" action task event. In some embodiments, the "complete" and the "close" actions can be combined. In other embodiments, the "complete" R-action and related sub-menus are separate from the "close" R-action. It should be noted that the invoice generation display can be presented after this third, combo Complete/Close R-action acceptance. The server, in conjunction with the data store: (1) again color-codes the AW cell in the time-blocked schedule display dashboard with a third color-code YELLOW Y upon the AW actuation of the third R-action. The server then (2) downloads the CC sub-menu dataset(s) (nominally one but potentially more datasets) to the AW mobile device. The server, responsive to the device's uploaded data, (3) accepts and stores, in the data store, corresponding third R-action data input (tactile and/or textual inputs), by the AW into the AW mobile device. These datasets are one or the other of all of: supplemental CC textual input (sCC-text), supplemental CC photo input (sCC-photo) (showing a completed job/project), and supplemental CC tactile signature input (sCC-sig). The further server result being (4) a change of the color-coding on the AW mobile device with a third R-action UI displayable dataset based upon the storage of the sCC-text, sCC-photo, and sCC-sig datasets.

Invoice. In one embodiment, a final nominal action by the server is a download of the invoice data (preferably in a vendor-standard form, with the variable dataset data integrated therewith) to the AW mobile device. The invoice, per the server's programming, bases the invoice on the sCC-text, sCC-photo, and sCC-sig. Additionally, but not necessarily, prior to the server downloading the invoice data, the relevant dataset may require a sCC-sig or signature by the AW (nominally) and/or the customer (preferably but not necessarily) for the third R-action. The server must accept and store the sCC-sig prior to downloading the invoice data. In this configuration, the sCC-sig represents an electronic signature capture on the AW mobile device as indicia of completion of the relevant Type action, that is the job/project assigned to the mobile worker. Another enhancement of the invention has a WP sub-menu dataset which includes an optional WP photo capture. The photo capture should be prior to the second R-action data input by the assigned worker into the AW mobile device. The second R-action is the work to perform (WP) R-action.

A further advantage of the present invention includes a requirement to obtain the sCC-photo as a required secondary input by AW actuation of the third R-action (the completion/close action). The server must accept and store the sCC-photo dataset prior to downloading the invoice data. In this case, sCC-photo is indicia of completion of the relevant Type action.

Another configuration of the COMPLETE mode in the ADS system has, in the initial configuration of the data store, a third R-action which only represents the completion (Comp) action task event and a fourth R-action which only represents the close action (Close) task event. These are preprogrammed datasets developed by the Sys Admin. In this configuration, the CC interactive sub-menu dataset includes a Comp sub-menu dataset and a Close sub-menu dataset. The CC textual input sub-segment, the CC photo capture input, the CC photo image display sub-segment, and the CC tactile signature input sub-segments are respectively a Comp textual input sub-segment, a Comp photo capture input, a Comp photo image display sub-segment, and a Comp tactile signature input sub-segment. The sCC-text, the sCC-photo, and the sCC-sig are respectively supplemental Comp textual inputs (sComp-text), supplemental Comp photo inputs (sComp-photo), and supplemental Comp tactile signature inputs (sComp-sig). The server, when accepting the AW actuation of the third R-action includes accepting and storing the sComp-text, the sComp-photo, and the sComp-sig. The downloading of invoice data to the AW device is then based upon one or another or all of the sComp-text, sComp-photo, and sComp-sig. Further, the initial configuration of the data store includes a payment portal sub-menu dataset, After initially configuring the data store, the server accepts AW's actuation of the fourth R-action and: (1) downloads the payment portal sub-menu dataset to the device, (2) accepts and stores corresponding fourth R-action data input by the AW as supplemental payment data, and (3) changes the color-coding on the mobile device with a fourth R-action UI displayable dataset based upon the storage of the payment data. Thereafter, the server generates paid invoice dataset data based upon the payment data and downloads the same to the mobile device.

A further embodiment of the present invention includes, as part of the initial configuration of the data store, a function wherein the third R-action represents the completion (Comp) action task event and the initial configuration of the data store includes a fourth R-action as the close action (Close) task event. The CC interactive sub-menu dataset includes a Comp sub-menu dataset and a Close sub-menu dataset. The CC textual input sub-segment, the CC photo capture input, the CC photo image display sub-segment, and the CC tactile signature input sub-segment are respectively labeled or represent a Comp textual input sub-segment, a Comp photo capture input, a Comp photo image display sub-segment, and a Comp tactile signature input sub-segment. The sCC-text, the sCC-photo, and the sCC-sig data is respectively supplemental Comp textual input (sComp-text), supplemental Comp photo input (sComp-photo), and supplemental Comp tactile signature input (sComp-sig). The server (1) accepts AW actuation of the third R-action and accepts and stores sComp-text, sComp-photo, and sComp-sig data. (2) The server downloads the invoice data to the AW device based upon one or more of the sComp-text, sComp-photo, and sComp-sig. The initial configuration of the data store includes a payment portal sub-menu dataset. In operation, the server accepts AW actuation of the fourth R-action; (3) downloads the payment portal sub-menu dataset to the AW mobile device, (4) accepts and stores corresponding fourth R-action data input by the AW into the device as supplemental payment data, and (5) changes the color-coding on the AW mobile device with a fourth R-action UI displayable dataset based upon the storage of the payment data. The ultimate result being generation of paid invoice data based upon the payment data by the server, which paid invoice data is downloaded to the device as a dataset.

Returning to the illustrated embodiment, FIG. 11, when the job is complete, the mobile worker selects COMPETION FORM (FIG. 3, RED 13, R-Action) and is typically required to input his or her comments regarding completion of the task. See FIG. 11, Completion Form Selected from Worker Main Menu with worker comment text description, completion photo and customer signature. Best practices will have the worker also input and capture a picture of the completed task (FIG. 11), sign the mobile device (FIG. 11, left signature block) and obtain a signature of the onsite customer (FIG. 11, right signature block). See FIG. 10C, image and AW signature. Capturing a signature of the customer (FIG. 11, right signature block) with the interactive display screen describing what work was done (data input via cell phone keyboard by the worker) and one or more photos of the completed task, with the onsite customer's signature provides an indication that the job was done and the customer's consent that the job was completed and done to the customer's satisfaction. The ADS system has captured TASK data, worker location data, and the assent of the customer to the quality of the work.

Of course, if the customer believes that additional information or work should be done by a follow-up visit by the mobile worker, photographs of the yet-to-be completed job are taken and logged into the ADS data capture system. Additionally, customer comments for follow-up work are added by the worker in the COMMENT field. In an enhanced ADS system, the worked may record a short video (limited to a pre-set time, such as 15 seconds) of the customer complaint or appreciation of the completed task. The voice data is then logged into the ADS system with the COMPLETED FORM data. In should be noted that the ADS Sys Admin most likely will re-name the COMPLETED FORM header on the worker's main screen (FIG. 9A) to some job appropriate header name.

Also, when the customer enters his or her signature on the mobile worker's phone (FIG. 11), the customer or the mobile worker can select an ACCEPT button. Of course, the mobile worker should request that the customer activate the ACCEPT button a second time confirming that the task was successfully completed or, if needed, and additional follow-up visit is needed by the mobile worker, the customer could decline to select the ACCEPT confirmation button icon.

Returning once again to a mobile worker sub-main menu screen underlying the COMPLETION FORM (see COMPLETION FORM action item in FIG. 3, Worker Main Menu for Repair (Dispatched)), the worker in many situations will be required to complete a sub-menu PARTS AND SERVICES interactive display screen per FIGS. 12A, 12B, and 12C.

As explained earlier, during the initial set up of the ADS data structure, the system administrator has the option of adding this "parts and services" action item. These are, in general optional or O-action tasks. That PARTS AND SERVICES ACTION ITEM may be mandatory RED 13 or may be optional MID GRAY 15 icon colors on the worker's main interactive display screen.

At the initialization phase, the system administrator would load a parts list into the ADS database. This parts list is shown to the mobile worker upon action selection. See FIG. 12A, ADD PARTS Sub-Menu from Parts and Services Selection (blurred and small type elements are not significant to the invention). In the illustrated embodiment, the PARTS AND SERVICES is a submenu beneath the COMPLETION FORM, however PARTS AND SERVICES may be on the main worker menu as per the Sys Admin's initial system programming. This parts list may include small images of the part, a brief description of the part, the part number (SKU). A search bar in FIG. 12A, ADD PARTS Menu, enables the mobile worker to search by the part by name. Upon selection of a particular part, a larger image of the part shown to the mobile worker as well as the product name, model number, and SKU data. See FIG. 12B, enhanced parts sub-menu interactive display screen.

FIG. 12B shows a Part Details after Selecting Part menu, beneath the ADD PARTS Sub-Menu. If there is a written description of the part, this is provided in that interactive display FIG. 12B. For example, installation instructions may be helpful to the mobile worker when he or she is onsite. Also, the worker may be provided with the part manufacturer's URL or Internet domain. In this manner, the worker has access to installation informal repair information for the items subject to repair. The URL would be provided in the DESCRIPTION area. Once the worker selects the part and visually confirms that he or she used the part, the price of the part is auto-filled into the worker's cell phone. The mobile worker inputs quantity or number of identical parts used in fulfillment of the task. The mobile worker has an option to add the price of the part to the invoice or to "convert to asset" the part used in the service call. At initialization, the system operator can indicate whether the install operation adds an asset to the customer's equipment. This newly added part made be a small item (like a hose) when a larger item (like a dishwasher) is being installed. Convert to asset means that the part has been used but not charged to the customer. When the part is selected by the worker, the color icon changes from RED 13 (part not selected indicator) to GREEN 17 (part used in task). In FIG. 12C, Add Parts Sub-Menu After Selection of Part (Green/light grey 17 indicating selected part). The items NOT selected are shown with RED/Dark Gray 13 indicia to alert the worker that he or she may wish to review the pars lists to keep the correct inventory count in the worker's truck inventory. The final list of parts is displayed to the worker. See FIG. 13, List of parts added by Worker.

At this juncture, the worker is presented with the ADD SERVICES menu screen (see FIG. 14, ADD SERVICES Sub-Menu) which has preprogrammed selections for "generic" service, for "hourly" rate services, for "maintenance call" and "service call" services. The system can be programmed by the system administrator who can add many differently described services to the displayed list and the SERVICES interactive display screen can be configured similar to the sub-menu ADD PARTS screens (FIG. 15, Service Call selected in ADD SERVICES Sub-Menu (textual input)) beneath the higher menu level PARTS AND SERVICES. In the illustrated embodiment of FIG. 14, ADD SERVICES, the interactive display menu permits the worker to type in data to describe the service provided. Alternatively, the worker has option of searching for the service he/she has provided at the designated location in a manner similar to the ADD PARTS submenu. By entering the first few words describing the service, the ADS backend may suggestion completion and a more robust or detailed description of the service provided. In another embodiment, the ADD PARTS screens beneath the PARTS AND SERVICE action item may be omitted and the system may be programmed to display a PARTS USED action item on the main worker menu screen separate and apart from a SERVICE PROVIDED action item on that main menu screen.

An enhancement of the ADS system would use some artificial intelligence (AI) to decode the worker's input into the ADD SERVICES (FIG. 14, ADD SERVICES, or FIG. 15, Service Call selected in ADD SERVICES Sub-Menu (textual input)) text data interactive region. The AI enhancement may use chatGPT™ to decode the worker-input data and generate what may be a description of the services provided. In such an environment, the worker would either ACCEPT the services description or EDIT the description as needed.

It should be noted that the ADS system may be preprogrammed to auto-add parts to certain service calls. Also, as a further enhancement, the preprogrammed parts may be listed on the invoice but not be billed to the client on the invoice. This option is available if the customer has earlier paid a yearly or monthly "repair and service" contract whereby all service and repair is covered by the contract. However, worker data entry on these types of contracts is highly valuable in order to determine if the prepaid fee for the contract matches the actual repair and replacement warranty provided by the contract.

In order to fully capture worker data in connection with onsite service, repair, or sales call data, it is critical that the mobile worker enters certain required information in real-time and complete the proper electronic forms. It is well known that collection of data at the end of the day by mobile workers results in a reasonable loss of data about each customer visit. Even well established efforts to collect this data immediately after the mobile worker leaves the customer location results in a loss of relevant data. Real-time capture of travel to destination, onsite arrival, onsite task time, services provided and parts used by the worker (a) greatly enhances management oversight of mobile worker and (b) provides a realistic view of the cost of providing that service to the customer. By requiring that the mobile worker enter this information at TASK TIME, greatly reduces the probability that the mobile worker will not accurately enter the information at a later time when he or she leaves the designated location.

Returning to the illustrated example, as shown in FIG. 16, Parts and Services Screen with Compiled Parts and Services from ADD PARTS/SERVICES Sub-Menu (FIG. 14), at this point in time, the mobile worker is presented with selections at the bottom of the PARTS AND SERVICES interactive screen display, permitting the worker to select "add part", "add service", "more", and "invoice". The MORE step permits mobile worker to go to another preprogrammed menu screen.

The invoice creation onsite function (see FIG. 17, Invoice Selected Showing Parts and Services on Proposed Invoice) is also in important part of mobile worker's activity. Some system operators require that the mobile worker create an invoice onsite and deliver the invoice to the customer while the worker is at the designated location. Other system operators prefer that the mobile worker prepare the invoice while he or she is onsite, and upload the invoice to the ADS backend system. With regard to the uploaded invoice, the Sys Admin may wish to have other managers or account specialists review the invoice prior to delivery to the customer. Once reviewed by the back office, the invoice is delivered to the customer. This is a preset element (invoice onsite or upload invoice for further review and approval) is established at the ADS initialization phase.

Artificial Intelligence (AI) in General. In a multiple customer configuration, involving multiple AW workers, the server, for the plurality of customers, generates the MF-enabled vendor's back office multi-worker time-blocked schedule display to display all assigned workers associated the plurality of customers having scheduled jobs or projects. The server accepts and stores, in the data store for the vendor and for the plurality of customers, sWP datasets, sGR datasets and sSP datasets. The server then organizes the sWP datasets, sGR datasets and sSP datasets by Type of job or project. Using statistical tools, the server converts one or more of the three O-actions into R-actions for a respective Type of job or project when the sWP datasets, sGR datasets and sSP datasets by respective Type exceeds a predetermined statistical threshold.

For example, assume that a service call if associated with the faulty door on a microwave oven and the door has the following parts: a left and right hinge arms unique to the oven's model, a spring used in all ovens sold over a two year period, and four sets of nuts and bolts that are widely used in the service industry which industry includes all large appliances sold by the oven manufacturer (conventional ovens, refrigerators, dishwashers, etc.) Further assume that the initial ADS had all these parts in an optional GR 15 menu data set. The ADS system by compiling data for about 50 service calls to fix these microwave ovens could (a) create a R-action 13 in response to the task/project Type "broken microwave door" requiring (i) left and right door hinges; (ii) compel or recommend that all AWs carry both the door spring and a reasonable supply of nuts and bolts on the AW's service repair truck or vehicle. Statistical tools can be used on the ADS data sets to (i) convert O-actions 15 to R-actions 17 and (ii) identify that some parts must the ordered or pre-ordered (the door hinges) either during the initial service call or prior to the final service call to fix the oven door; and (iii) compel or recommend a reasonable supply or inventory on the AW's truck for commonly used parts or goods. Sometimes these parts or goods are considered consumable goods such as plumber's tape, glue, etc.

The statistical tools would determine, for example, when multiple GRs, goods related to a certain job-project Type, are used in, for example, 75% of identical Types (the same job/project), yet multiple service calls by AWs are needed due to the lack of GRs or one GR (for example, nuts and bolts) (these multiple service calls identified as need to "Close" the customer service call), the AI system can (1) identify the multiple service calls, (2) identify the "first visit missing GRs" and (3) cross reference "follow-up time for a return service call" with the price, inventory and availability of the missing GR, and (4) finally determine that maintaining an inventory on-truck or at-back-office of the missing GR is more efficient than multiple service calls. Multivariable statistics can be employed by the AI system.

In a further enhancement of the ADS system, the AI routine may employ one or more of the following algorithmic operations.

(a) TASK MATCHING: match the task, as initially indicated by the customer and initially logged into the ADS system, with similar tasks and cross check the proposed/uploaded invoice to the earlier resulting invoices for the same task by the same worker (the resulting invoices then being a "collection" of invoices) or earlier resulting invoices from a larger group of workers (the resulting invoices then being an "aggregation" of invoices) engaging in the same or similar task and the aggregated resulting invoice data.

(b) INVOICE MATCHING: match the proposed invoice with earlier resulting collection of invoices by the same worker or earlier resulting aggregated invoices from a larger group of workers.

(c) ANOMALIES: identify anomalies between proposed invoice and collection/aggregation of invoices.

(d) ERROR EVENTS: trigger a DATA ENTRY ERROR interactive display screen (an INVOICE ERROR alarm) and present the same to the mobile work prior to final invoice generation.

(e) TIME FACTORS: apply a time-based window to the collection/aggregation of invoices prior to the data entry error screen (for example, the collection/aggregation invoice data limited to one or more timeframes such as 30 days, 3 months, 12 months, etc.) thereby reducing the data processing time and ERROR YES/NO response time to the onsite mobile worker (by reducing ADS system response, the worker leaves the customer location faster).

(f) VALUE FACTORS: if anomaly is found and the value of the anomaly is less than x % of the collection/aggregation invoice data (a value anomaly threshold), prohibiting the generation of the invoice error alarm (the "value" being (i) cost or retail value of parts PLUS (ii) worker labor time times hourly wage or hourly value)("value" being either (w) cost of parts to TSD Sys Admin, (x) typical invoice price of parts to the customer, (y) wages or fee paid by TSD Sys Admin to the worker, or (z) typical labor charges for task charged to the customer).

(g) CUSTOMER FACTORS: limit AI algorithmic function (one or more a-f functions) to the specific customer then being serviced by the worker (a per customer process), or limit AI algorithmic functions a-f to ONLY customers who complain about invoice charges (complainants), or exclude customers who complain about invoice charges (non-complainants).

(h) SOCIAL MEDIA FACTORS: prior to applying a social media (SM) factor to the invoice analysis a-g above requires that the AI engine gather and pre-process social media complaints and favorable reviews (two different data collections, favorable/unfavorable data), then generate an INVOICE ERROR alarm when the correlation between unfavorable SM is higher than the correlation between favorable SM for TIME FACTOR analysis, for VALUE FACTOR analysis, and/or for CUSTOMER FACTOR analysis. As an example of SM analysis, if the customer has high unfavorable SM, then the value of the anomaly may be a very low pre-set low percentage, in contrast to a customer with a high favorable SM, wherein the value of the anomaly may be set at, for example, 10% of the collection/aggregation invoice data.

Returning to the illustrated example, as shown in the invoice '942 screen image (FIG. 17, Invoice Selected Showing Parts and Services on Proposed Invoice), the STATUS of the invoice is OPEN (in other words, the invoice has not yet been paid by the customer), and the invoice data includes: invoice date, customer name, and customer address. This invoice data is populated and inserted into a preformatted invoice "form" by the backend office and then generated and sent to the worker phone. The "screen view" of the invoice also shows parts used ("products" 08, 02, 07) and SERVICE CALL charges (representing labor charges for the event). At the bottom of the screen, the worker has user-interactive screen segments for selections: MORE (indicating that the worker can go back to earlier parts and/or service event screens), PDF (an electronic print function for the invoice), BACK (return to previous screen) and PAY (enabling the customer to then pay the invoice).

The mobile worker, upon selection of PDF (see FIG. 18, PDF Selected Showing Parts and Services, Fees and Costs on PDF Formatted Invoice), can show the customer what the formal invoice would look like. When the PDF active button is selected, the invoice is finalized by the entire ADS system. This final invoice is a pre-formatted form filled in by the data structure system as shown.

Returning to the INVOICE '942 screen (FIG. 17, Invoice Selected Showing Parts and Services on Proposed Invoice), the MORE selection permits the mobile worker to: add a part, and a service, edit comments or description, generally edit other text data entry items, view the PDF, engage a payment port on the worker's mobile phone, print the invoice via a Bluetooth or other near field communications link, email final invoice to customer, text the final invoice to the customer, send a payment link to customer, and email or text the final invoice to the customer. See these MORE options in FIG. 21, Selected MORE Option Showing Additional Menu Options for Worker in "Parts and Services" Sub-Menu Structure. The PDF and PAY active screen regions are short cuts to the respective functional interactive screen display.

From the final invoice screen FIG. 18, PDF Selected Showing Parts and Services, the Sys Admin has configured the worker engaging the ADS system to REVERSE or CANCEL the invoice. See CANCEL function in the lower screen portion. An AI system can be employed to check the proposed invoice prior to displaying the same to the AW or the customer. The AI system may check other job/project Types and/or check other O-actions or R-actions to identify GRs which should have been noted by the AW onsite. The AI enabled invoice module can dd to the proposed invoice the missing items. This is particularly true with GRs which are consumable items, such a glue, tape, nuts and bolts, etc. The AI statistical threshold may be set low, for example, at 50%, to trigger this add-on dataset to the invoice downloaded to the AW mobile device.

From FIG. 19, Selected Proposed Invoice after Selection of Invoice, if the mobile worker selects PAY from interactive screen, the system displays on the mobile worker's phone the following: cash, check, credit card. See FIG. 20, Select PAY shows Types of Payment Options.

The mobile worker then selects the proper payment method, and follows customary payment portable processes for obtaining payment by the customer onsite. If the customer has made a payment at the designated location, the system automatically logs in the payment and re-generates an invoice indicating the payment TOTAL and showing a ZERO balance. The worker or the ADS system will then email or text the PAID invoice to the customer.

Upon completion of either the INVOICE action item, or, if payment is needed, after capturing the payment and documenting the payment in the system, the mobile worker selects BACK and the system reverts back to the mobile worker's main screen. See FIG. 22, Worker Main Menu Showing Remaining Close Work Order Task. The completed action items at that time are GREEN 17 coded such as action items: in transit, turn by turn navigation, onsite, work to perform, completion form, and "parts and services." The remaining action item is "close work order". This item is indicated by RED 13 icon. Upon worker's selection of CLOSE WORK ORDER, the system generates the next customer location and job type data.

Accordingly, as shown in the screen image in FIG. 23, After Selection of Close Work Order, Worker's Work Order List, the mobile worker is presented with the next compilation of sequential TASKS for following customer names: company 40, company 01, company 32, company 31, company 35 (including address and current status data). Again, the ADS backend may reorganize these TASKS based upon real-time data processed by the ADS system based upon time on site, transit time to destination and whether the task was assigned to another worker. These open customer jobs are also numerically identified 1, 2, 3, 4, 5. In the illustrated example of FIG. 23, the worker has completed TASK #2, customer Company01 and that task is indicated COMPLETED along with the closing date and time. See GRAYED out element for customer 05 and 38, in the figure. The time onsite is bracketed by start time and end time. Also, the ADS system may be programmed to show time in transit.

When the mobile worker completes the CLOSE WORK ORDER action, the backend of the ADS data structure indicates to the system operator viewing the dashboard the completion of the project or job by a change in color coding from LIGHT BLUE LB to GREEN GR indicating that the mobile worker has completed the task at Company01.

If the work order '821 for Company40 is a GENERIC SERVICE, it is possible that the action items: in transit, turned by turn navigation, onsite, completion form, are all nonrequired GREY icons. See FIG. 23. However, the PARTS AND SERVICE action item is displayed as a RED 13 coded action item as is the CLOSE WORK ORDER action item (RED coded). See FIG. 24, Worker Main Menu Generic Service, Status: Dispatched.

In connection with the illustrated example work or '853, FIG. 25, Sales Person Worker Main Menu, the upper portion of the screen the apple portions of the worker screen shows STATUS: dispatched; TYPE: sales; ASSIGNED TO: mobile user 2; DATE: current date and time frame for appointment (1.5 hours); CUSTOMER: Company34; CONTACT: customer name and phone number; and LOCATION: address.

The following interactive display screen in FIG. 25, Sales Person Worker Main Menu, is configured as a salespersons' mobile worker. Action items which are selected by the salesperson, include: VIEW CUSTOMER, IN TRANSIT, TURN BY TURN NAVIGATION, ONSITE, ADD ESTIMATE, ADD ESTIMATE (GOOD, BETTER, BEST), ADD SALES ORDER, ADD CUSTOMER SURVEY, and CLOSE WORK ORDER. The salesperson is required to execute RED coded items: IN TRANSIT, ONSITE, and CLOSE WORK ORDER. The optional action items are coded mid GREY 15.

Of course, at the initialization phase, the system operator may rename these assigned ACTION ITEMS or activity selections for the salesperson or may the increase the number of ACTION ITEMS or decrease the ITEMS or provide different labels for the ACTION ITEMS which are more relevant to the salesperson's activities in the face-to-face customer interaction session. In the illustrated example for sales work order '853, the only required action items in RED are: in transit, onsite, and close work order.

The mobile worker data structure or ADS can be configured with high levels of security permitting only key managers and the mobile worker to input data. For example, the mobile worker data structure could be utilized in connection with the pickup, transit, and safe delivery of money from retail establishments or ATM machines to the associated bank or configured for interbank transfers. In this type of ADS system, there are multiple levels of security required by the mobile worker before he or she enters information into the system. For example, in connection with an interbank transfer of cash, the bag carrying the money is typically sealed by the branch manager prior to the arrival of the mobile worker who is tasked with conveying the locked money carrying bag to another bank. The bag may have a QR code and/or an RFID markers or responders. Bar codes may also be used.

The system can be configured to require that the worker scan the locked bag and require that the branch manager signed off on the transfer from first branch bank to the mobile transit worker. The QR/RFID/BAR code is photo-captured by the worker via the camera on the configured ADS phone. All steps are required and RED coded. The system is further configured require that the mobile worker take a photograph of himself or herself at the time of pick up and obtain a photograph of the bank manager and a photograph of the locked bag prior to exiting the bank. The system can be configured to require that the transit worker, once he or she places the locked bag in the secure money compartment in the armored truck, scan the QR/RFID/BAR code and another QR/RFID/BAR code on the armored truck, money carrying compartment.

The mobile worker ADS system can be configured to require that the mobile transit worker activate and IN TRANSIT activity selection indicating that the mobile worker has started the armored truck and is moving to the next scheduled destination or receiving bank branch. It is customary that armored trucks have real-time GPS systems embedded in their chassis. The ADS system may capture that IN TRANSIT worker activation and match the geolocation of the phone with the geolocation of the truck at the time of IN TRANSIT selection by the worker. In transit geolocation of the worker's phone and the armored vehicle geolocation (from the GPS transmitter on the chassis) is continually matched by the ADS system.

When the mobile worker arrives at the destination bank, mobile transit worker is required to activate the ONSITE activity selection or ACTION ITEM on his or her cell phone. The reverse steps are required prior to delivery of the money bag to the second branch manager. Photos at delivery are taken. The QR/RFID/BAR codes are scanned and logged into the system. The following steps include scanning QR/RFID/BAR code in the money carrying compartment of armored truck, capturing a picture of the face of the destination bank branch manager, again scanning the QR/RFID/BAR code on the locked moneybag, and having the mobile transit worker sign the ADS delivery, and having the destination branch manager sign the ADS delivery. All these data points are logged into the system and the mobile worker data structure.

In FIG. 26, Worker Main Menu, Type: Maintenance, of the illustrated embodiment, the worker's main menu is a TYPE for a maintenance job or project (Work Order '831). The STATUS of the worker is "dispatched" and he or she is required to engage in the following Action Items: in transit; onsite; completion form; parts and service; and close work order. These Action Items are discussed, in a general manner, above.

As an enhancement to the ADS system, the worker may select the interactive screen display element ACTION ITEMS which, in the illustrated embodiment displays the OPTIONS interactive screen display to the worker. See FIG. 27 Action Items Selected and Options Displayed. The OPTIONS menu selection beneath the worker's main menu screen shows that the preprogrammed options could be: need to follow up, request missing parts, order missing parts (PO) (indicating generation of a purchase order form from the ADS system), add expense, add quote, add sales order, update time tracking, update crew time tracking.

FIG. 29 diagrammatically illustrates a Selected MORE option for the mobile worker, associated with the Additional Menu Options. By activating "Add Service," the worked enables a transit expense input. In this ADS configuration, the system operator may to provide a menu selection permitting the mobile worker to input his or her "in transit" expenses such as gasoline. In this instance, another OPTION selection would have a menu selection "Transport Expenses." The TRANSPORT sub-menu would include: requiring that the mobile worker take a photograph of the vehicle's gas gauge, then take a photograph of the gas pump showing the price per gallon, and after the worker has filled or otherwise delivered gas into the vehicle's gas tank, having the worker take another picture of the gas pump showing the amount of the charge as well as the quantity dispensed by the pump. In this manner, the credit card or cash payment by the mobile worker at the gas station can be confirmed by the backend office system utilizing the data capture of the quantity dispensed and the price per gallon in the captured photograph. The ADS system can also match the credit card charge to this data. Optionally, the ADS can include the transportation expenses on the customer's bill with a high degree of confidence that the charges are accurate.

FIGS. 28A, 28B and 28C, ADS Backend Work Order '634 Completed Sub-Dashboard (Summary), illustrates an example of an ADS backend office "summary" page for that Work Order '634. This ADS backend office summary page shows the STATUS of work order '634 indicated COMPLETED. By selecting the icon next to the relevant data ITEM, the ADS system administrator can view the specific details of the project or job, such as: when the item was completed, the parties, the parts used, mobile worker(s) engaged in that task, and the generated FORMS (these FORMS generated by the ADS system, completed by the worker, then subject to a data capture communication by the ADS system) and signatures both prior to the TASK provided as well as after the TASK completed event. See FIG. 30 FORMs Selected from ADS Backend Work Order '647 Completed (Forms Sub-Sub-Dashboard for Job/Project) (the blurred data is not essential because any form may be used per the Sys Admin CIO). This includes the photographs and the signatures of the worker and the customer. See FIG. 31A, VIEW Selected for "Work to Perform" row from Forms Sub-Sub-Dashboard for Job/Project (shows thumb image, worker and customer signatures, geolocation and task: date/time tag), and see FIG. 31B Photo IMAGE Selected for Job/Project from Forms Sub-Sub-Dashboard.

Additionally, the backend office menu screen captures a map view of the location that the service was provided. See FIG. 31C LOCATION Selected from Forms Sub-Sub-Dashboard for Job/Project (shows geolocation of Performed Task and both signatures). The map view shows the geographic location of where the services provided were provided based upon the worker's geolocation. This is one of the several important features of the present invention. Since the ADS system continually captures the GPS geolocation data from the worker's cell phone and, in conjunction with the ONSITE activity TASK selection, the backend office system captures the precise geolocation of the worker's cell phone while the TASK is being fulfilled by the worker. By monitoring the TASK and the geolocation data with the backend office ADS system at the time the worker selects ONSITE, this avoids the worker providing the service at a destination different than the earlier entered customer destination.

Another interesting feature of the present invention is the electronic generation or production of a project/job/task report document. See FIG. 32A Job or Project Report (page 1, shows customer data, location, Work to Perform text and photo and customer signature). The Job/Project Report shows the work order number, customer name, the to-be-billed data (name, address, and contact data), the to-be-performed work (typically the pre-task photo and the work-to-be-performed textual description entered by the worker) as well as the worker's signature. On the second page of the report, information shows the work that was performed, the completed job image and the signature of the customer. This job completion report can be email to the customer or sent via text message with the report as an attachment. See FIG. 32B Job or Project Report (page 2, shows parts used, service description, customer data, location, completed task image, completed task textual description, and both signatures)

The backend system can also be configured to generate a report for management. See FIG. 33 Job Costing Sub-Menu Selected for Work Order '634 (completed Job or project). The Management Costing Report shows the job costing for each particular work order, such as Work Order '634. The ADS system calculates the data shown in the Costing Report which includes generation of one or more matrices showing profit margin, time in transit, completion time, and invoice issuance dates. See FIG. 34 Metrics Sub-Menu Selected for Work Order '634.

The system operator can also review invoice generation and system cash flow. The completed invoice can be displayed by selecting an icon on the interactive display Cost Report screen. For billing, see FIG. 35 Billing Sub-Menu Selected for Work Order '647 (blurred data not essential). All relevant cost data associated with the job/project/task including: time in transit, time on the job, parts used and invoiced, parts used and not invoiced in the pricing structure, as well as the final invoice price and the price paid by the customer. The Sys Admin can also identify OPEN Invoices form the Cost Report screen. See FIG. 36A and FIG. 36B Open Invoice Selected (Inv. '154) Action from MF automation data Structure (ADS) Backend dashboard. FIG. 36A and FIG. 36B are left and right side views of the backend display. From the OPEN Invoice interactive screen, the ADS system permits the Sys Admin to act on these invoices. See FIG. 37 Action List from Open Invoice '942 (edit, delete, etc.).

A short summary of some of the important points in the inventive ADS system (among many other important aspects of the invention) include: (a) display the things to be done, (b) display the sequence of activities to be done, (c) set up TYPE of job/project to be done (pulldown menu) and (d) populate the ADS system with customer data.

Returning to the ADS backend main menu, the Sys Admin can select the WORK ORDERS tab. See FIG. 38 Work Orders Selected from MF automation data structure (ADS) Backend dashboard (shows actions for Work Orders and sub-menu access). The ADS then presents a drop down list of actions permitting the Sys Admin to: View/Add Orders, establish RULES for the task and other task-specific requirements. Some Work Order Settings are provided in the illustrated embodiment. See FIG. 39 Work Orders Settings which permits the Sys Admin or system operator to add conditions, sequential operational condition (e.g., "show invoice pdf after checkout"), and FIG. 40 Work Orders Settings (Selected) from MF automation data structure (ADS) Backend dashboard (shows various programmable actions, selectable by the system operator either at initialization or on-the-fly as needed, such as work to perform, completion form and need follow-up form). In addition to required ACTION ITEMS (In Transit, Navigation ("Navi"), Work to Perform, Complete Form, Parts and Services, and Close Work Order), the Sys Admin can add Optional Action Items. See FIG. 41 ACTION ITEMS List, including Optional Action Items—Sub-Sub-Menu for Work Order Type (required: in transit, on site, work to perform, complete form, parts and service, close work order; optional: need follow up, etc.). The ADS system has an Add Action Item interactive screen. See FIG. 42 ADD ACTION ITEM (Selected) Sub-Sub-Menu from Work Order Types Sub-Menu.

Time Constraints and Location Constraints at a High Level, see FIG. 43. A further enhancement of the present invention includes a time constraint dataset and a location constraint data set which are both unique to the then relevant customer being serviced. The time constraint is based upon a respective temporal customer ("Time") dataset imposed by the relevant customer as one destinational limit (limiting the timeframe wherein the worker can attend to the job or project). The location constraint based upon a compulsory destination access or egress limitation ("LOC") dataset based upon another destinational limit imposed by the relevant customer. For example, the Time constraint may limit worker attendance at the customer's destination to the hours of 9 AM-5PM, M-F. The LOC constraint may limit worker access to a gated community, or an elevator in and apartment to certain days or timeframes, all based upon the related customer's destination.

In another embodiment, the Time constraint dataset is exclusionary timeframe data for the relevant customer. The server, in generating the time-blocked schedule display or dashboard, excludes the display of the assigned worker cell within the exclusionary timeframe. Another embodiment of the invention treats the LOC dataset as one of a permissive destinational limit wherein the relevant customer permits the mobile worker to service the customer at the relevant customer destination. In a different configuration, the LOC dataset is an exclusionary destinational limit wherein the relevant customer prohibits mobile worker service at the relevant customer destination. In this embodiment, the server either: (1) converts the permissive destinational limit into a LOC exclusionary timeframe and in generating the time-blocked schedule display, excludes the display of the AW cell within the LOC exclusionary timeframe, or (2) converts the exclusionary destinational limit into the LOC exclusionary timeframe and the server, in generating the time-blocked schedule display, excludes or prohibits the display of the AW cell within the LOC exclusionary timeframe.

Returning to the illustrated embodiment and FIG. 43, from the Work Order Settings (FIG. 39) interactive display screen, the system administrator can, for a particular TYPE of task, place TIME CONTRAINTS on the task. See FIG. 43 Time Constraint Configurations (Selected) from ADD ACTION ITEM Sub-Sub-Menu. For example, one type of "time onsite time constraint" for a designated TASK is that the mobile worker is only permitted to engage and fulfill the task at the customer destination during certain hours or certain days of the week. This is an exclusionary time constraint. The time constraint limits may be set such that the work MUST be done on a certain day or days of the week and/or MUST be done between certain times. This is a required time for performance constraint. For example, the delivery and setup of a new bed for a customer must be done on Monday AM (certain date) or Tuesday AM (certain date). The time constraints also can be set at the initialization phase to prohibit the work being at certain days and/or times. For example, the customer may be a multi-story building operated by a condominium association and all work can ONLY be done Monday through Friday, 10:00 AM to 4:30 PM. Hence, for all service calls to that location, the ADS applies the exclusionary time constraint.

Another interesting feature of the present invention is a location constraint based upon a customer location or a job location. See FIG. 44 Location Constraint Configurations (Selected) from ADD ACTION ITEM Sub-Sub-Menu. For example, a location constraint may designate and assign a task to a mobile worker only if the mobile worker is within some geolocation region of the customer, that is within m miles or kilometers of the target destination. Also, the location constraint can be used to remove or block a previously assigned task from one designated mobile worker's task list if the then-current location of the mobile worker is not within the preset geographic area encompassing the destination location. This is a dynamic geolocation constraint on the assigned task.

In order to assist the initialization step, under the TYPE selection, the system operator is presented with a long list of types of tasks. See FIGS. 45A and 45B, TYPE (Selected) Drop Down List from ADD ACTION ITEM Sub-Sub-Menu. There is a long drop-down list or menu which permits the Sys Admin to select one or more TASKs from the list of generic task identifiers.

One of the most important features of the present invention is the sequential presentation of the Action Items: in transit, turn by turn navigation, onsite, work to perform, completion form, parts and services, and close work order. See FIG. 8A, Worker Main Menu.

Another important aspect of the present invention of the several important aspects is the SHOW WORK ORDER exception default and hide the CLOSE WORK ORDER rule. See FIG. 46 SHOW WORK ORDER (WO) STATUS (Selected) Options and HIDE FEATURE (both from ADD ACTION ITEM Sub-Sub-Menu). The SHOW WORK ORDER rule, to be set by the Sys Admin, permits display of the lower menu for the next sequential ACTION ITEM when the previous TASK is complete. For example, for a specific Work Order, the SHOW WORK ORDER rule applied to the action task CLOSE WORK ORDER would block or prohibit the display of the CLOSE WORK ORDER until the worker has completed the PARTS AND SERVICES action item. Although the CLOSE WORK ORDER is displayed on the worker's main menu, access to the CLOSE WORK ORDER sub-menu is blocked by the applicable SHOW WORK ORDER rule.

The SHOW WORK ORDER rule can be applied to a job offer by the Sys Admin to one or more mobile workers. This is a request from the Sys Admin that a designated worker ACCEPT or REJECT a project or job to be performed. As example, assume that the system operator is sending a designated mobile worker a task and the mobile worker must ACCEPT the task prior to a "formal" assignment by the Sys Admin to the worker. The Assignment resulting in a posting of the job/project on the ADS dashboard. In this situation, the only ACTION ITEM would be the "Accept Task" option shown to the proposed worker. However, the worker would see STATUS: Potential Task; TYPE: (generally what needs to be done): Assigned To: Open: Date: proposed date and time; Customer: either disclosed or data hidden until worker Accepts the job/project; Contact: hidden data; Location: either disclosed or data hidden until worker Accepts the job/project. See generally, FIG. 47 Worker Main Menu for Repair (Dispatched). Of course, the worker could Reject the proposed task work. The Sys Admin would then select another worker or shop the job/project to a group of workers.

The present invention provides a novel and efficient system for establishing, maintaining, and expanding a MF automation data structure for the benefit of MF-enabled vendors of goods and services, mobile workers who are supported by these vendors, and customers who interact onsite with the mobile workers. Embodiments of the invention provide a several mobile applications (or a series of communicatively coupled mobile applications) provided via a server (cloud-based or web-based) to a plurality of mobile workers, some of whom are in transit to a customer location, others are at their respective customer destinations, and a third group in transit to either another customer locations or the worker's home base which are communicatively coupled in order to provide the ADS system. The ADS systems and methods described herein are configured to monitor workers and create controlled environments for said workers by generating venue-specific and worker-specific instructions, manuals, and sequential operational data commensurate with onsite customer conditions. The system is further configured to track and monitor worker activities in order to gather pre-task data, confirm such pre-task data with the onsite customer, engage the worker to complete the repair, service, collection and transport, or close the sales call with a high level of customer satisfaction. The ADS backend office system continually communicates with the worker's cell phone, tablet or computing device providing forms, processing data captured by the worker, and generating further forms, reports and invoices commensurate with the data captured by the worker, generally onsite, but also, to a limited extent, when the worker is in transit to and from the worker's dispatching of home office.

The ADS system involves a cloud-based or web-based server coupled to a data store. See FIG. 48. The data store is typically uniquely configured on a per-vendor basis, using a (i) a MF vendor-user or MF worker personal profile (UPP) and (ii) a customer UPP. FIG. 49, UPPs 312. The ADS supports multiple vendors in a siloed, data secure manner such that the data stores of one vendor will not be shared with another vendor. See UPP module 312. Each worker has a mobile device. The mobile device is a cell phone (including a smart phone), a tablet or a computing device. See FIG. 48, devices 110, 112. A communications network 106, FIG. 48, communicatively couples the worker's mobile device to the server and the MF-enabled vendor's back office. As noted above in connection with certain sub-menus, each mobile device has a camera, a geolocation module generating geolocation data based upon the location of the mobile device, and an interactive mobile device display screen with perceptual inputs including at least a textual input and a tactile input. A perceptual input is an input that can be perceived and actuated by the user/worker. A textual input may include a pop-up keyboard. A tactile input may be a slide or a touch sensitive button or icon.

Figure 49:
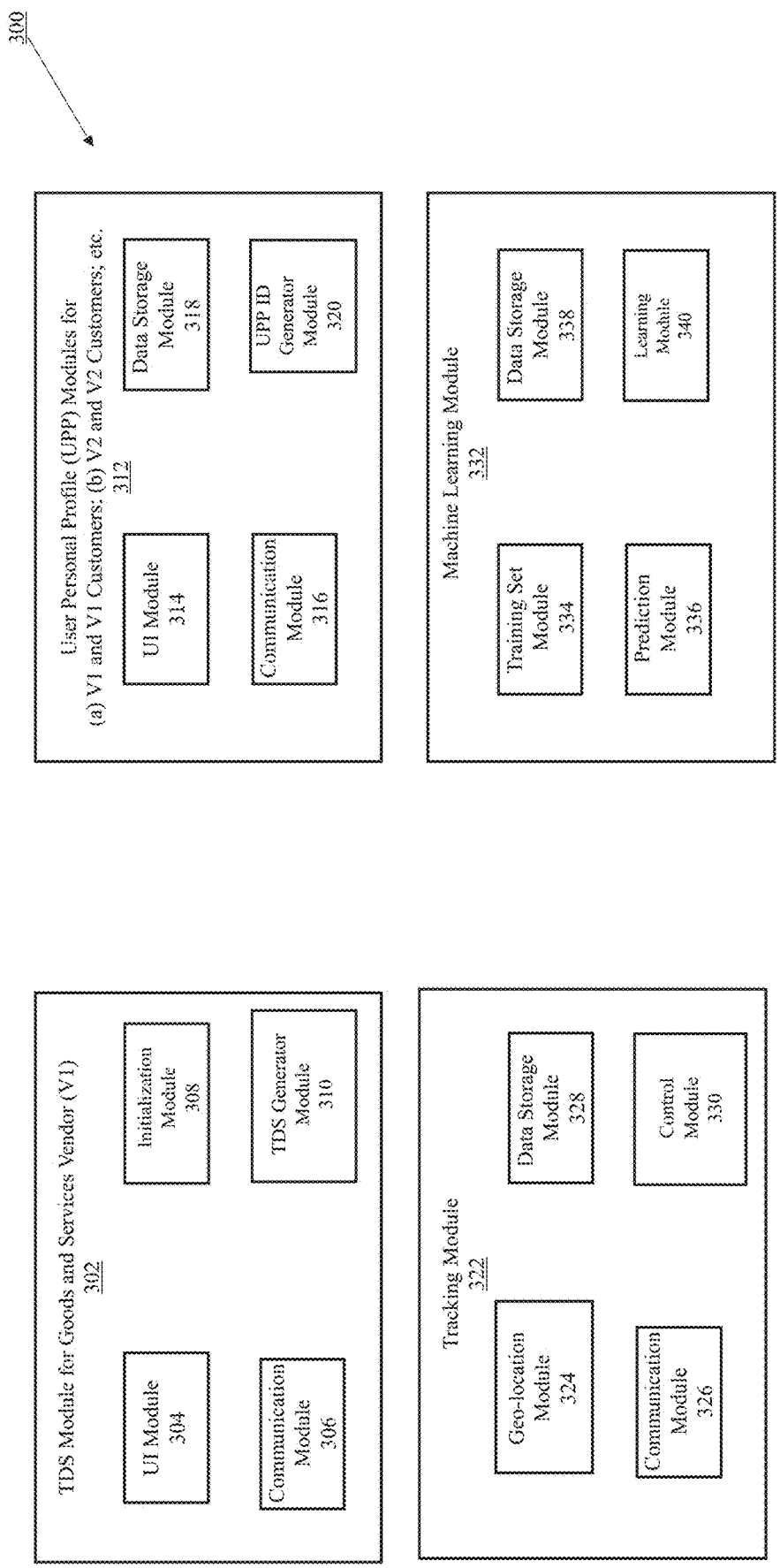
FIG. 49 diagrammatically illustrates various modules functionally establishing the operative ADS system.

Referring now further to FIG. 48, an ADS system 100 is depicted according to an exemplary embodiment. In one embodiment, ADS system 100 includes a server 102 (web-based or cloud-based), a database 104 (cloud-based or server-based), a telecommunications network 106, worker B 108 who is in transit to a customer's location (not shown in the Figure), worker B cell phone, tablet, or mobile computing device 110 associated with worker B 108, a customer facility or venue 114, and a worker B cell phone, tablet, or mobile computing device 112 associated with worker A (not shown) at facility 114. System 100 is a computer-based system and the various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. System 100 illustrates one of many possible arrangements of components configured to perform the functionality described herein. FIG. 48 shows several advantageous features of the present invention, but, as described above, the invention can be provided in several shapes, sizes, combinations of features and components, and varying numbers and functions of the components. Other arrangements may include fewer or different components, and the division of work between the components may vary depending on the arrangement. In particular, server 102 may be a local and/or cloud server configured to allocate or assign tasks inherent to server 102 to any applicable component or module of system 100. For example, server 102 may utilize and/or coordinate with Worker A's device 112 at facility 114 in addition to performing monitoring of actions of worker B 108 in transit to a different facility or customer location.

In one embodiment, server 102 receives and transmits data from mobile computing device 112 over network 106 allowing worker A in facility 114 to interact with server 102 via one or more graphical user interfaces presented on mobile computing device 112; thus, server 102 is configured to deploy an application on mobile computing device 112 designed and configured to operate as a centralized platform for worker A to transmit and/or receive data relating to system 100. Likewise, server 102 receives and transmits data from mobile computing device 110 over network 106 allowing worker B to interact with server 102 while in transit via one or more graphical user interfaces presented on mobile computing device 110. Server 102 is configured to deploy applications on the plurality of worker mobile computing devices designed and configured to operate as a centralized platform for workers to transmit and/or receive data relating to system 100. In one embodiment the centralized platform deployed by server 102 may be a plurality of platforms associated with system 100, wherein each platform of the plurality of platforms serves a specific function within system 100.

In one embodiment, server 102 is further configured to collect, analyze, and transmit one or more datasets either collected from one or more modules associated with system 100 or generated by server 102. For example, server 102 may collect one or more datasets associated with worker A, via mobile computing device 110 and/or the one or more modules associated with system 100, and perform one or more analyses based on the collected datasets in order to generating venue-specific and worker-specific instructions, manuals, and sequential operational data with onsite customer conditions.

Datasets associated with worker A may include, but is not limited to, initial condition of the customer's remote location, tasks and related sequential action items to be performed onsite, parts and labor associated with those tasks, billing and payment. If worker A is a salesperson, the datasets may include sales materials, promotional sales data, comparative tests with competitor's goods and/or services, surveys, instructions, manuals, and sequential best practices sales steps to favorably interact with onsite customers. Any other applicable worker/sales person-specific data can be configured and stored in database 104. Datasets associated with workers A and B are configured to be stored to a database associated with reasonable security to ensure that confidential data is secured from disclosure. System 100 may be used as a porting mechanism to collect and transfer the datasets associated with workers A, B to the database. In one embodiment, server 102 communicates data generated by mobile computing devices 110, 112 or any other applicable third party configured device associated with system 100.

Referring now to FIG. 49, a plurality of modules 300 of system 100 is depicted according to an exemplary embodiment. In one embodiment, the plurality of modules includes an ADS module for goods or services Vendor (V1) module 302 including a user interface (UI) module 304, an worker/salesperson communication module 306, an initialization module 308 (permitting the V1 Sys Admin to preprogram the ADS system), and an ADS generator module 310 configured to generating venue-specific and worker-specific instructions, manuals, and sequential operational data commensurate with onsite customer conditions. The plurality of modules further includes a user personal profile (UPP) module 312 (a separate UPP for each goods and/or services MF-enabled vendor (V1. V2) and, for each vendor, a specific UPP for each vendor customer), a UPP user interface (UI) module 314, a UPP communication module 316, a data storage module 318, a UPP ID generator module 320. The UPP ID generator is the data security portal and gateway which silos each vendor and vendor customer data set separate and apart from other vendor data.

The plurality of modules further includes a tracking module 322 including a geo-location module 324, a communication module 326, a data storage module 328, and a control module 330. In one embodiment, tracking module 322 includes continual monitoring of all mobile workers and salespersons via the worker's cell phone or computing device via the telecommunications network between the server and the phone/computer. As described earlier, tracking involves close geolocation monitoring of workers in transit to and from customer destinations. Control module 330 generates management alarms (e.g., traffic delay alarms), onsite triggers and "leaving customer site" triggers which change the MF-enabled vendor's backend system. The geo-tracking of the plurality of cell phones or computing devices in the field with the mobile workers are allocated among components of system 100 such phones/devices at customer facility 114 and the in transit activity of worker B. The plurality of geographic designators (phones/devices) associated with workers A and B allowing geo-location module 324 to receive sensor data in real-time associated with workers A, B and server 102 to function as the eyes and ears of system 100. The location data collected by geo-location module 324 is stored in data storage module 328 and is transmitted from tracking module 322 to server 102 via communication module 326. In one embodiment, control module 330 is designed and configured to ensure that system 100 and its components are operating at optimal capacity. For example, control module 330 may be utilized to establish one or more thresholds or filters relating to location data received by location module 324 in order to ensure that communication module 326, data storage module 328, and server 102 are not overwhelmed by the continuous collection of sensor data relating to mobile worker locations.

The plurality of modules further includes a machine learning module 332 including a training set module 334, a prediction module 336, a data storage module 338, and a learning module 340. Machine learning module 332 may be employed to enhance the ADS system configuration. As explained earlier, the Sys Admin pre-programs the ADS system for particular TASK with corresponding action items. In order to improve the ADS system, the operator (Sys Admin) may obtain data sets from a skilled set or group of repairmen. If this skilled group of repairmen generally consistently use and additional action item not currently programmed into the ADS system, machine learning module 332 can be used to identify that common but not programmed action item. The skilled group of repairmen could be used in the training set module 334 to identify the previously unplanned action item. Also, prediction module 336 utilized to better organize the sequence of required action items from and earlier set of "optional" action items (those items being color-coded in GRAY) on the worker's main menu interactive screen display. Data storage module 338 contains both the initial data sets for the training module and the prediction module as well as the resulting data set, form or sequence indicator. Learning module 340 is the particular artificial intelligence or machine learning parameters which the operator controls by including good data sets or excluding nonproductive or erroneous data sets.

Machine learning module 332 is designed and configured to utilize a machine learning model or rule-based model via training data generated by training set module 334 in order for prediction module 336 to generate one or more predictions associated with the monitoring of workers and creation of controlled environments for said workers by generating venue-specific and worker-specific instructions, manuals, and sequential operational data commensurate with onsite customer conditions. It is to be understood that machine learning is the study and construction of algorithms that can learn from, and make predictions on, data. Such algorithms operate by building a model from inputs in order to make data-driven predictions or decisions. Thus, a machine learning technique utilized by machine learning module 332 is configured to generate a statistical that is trained based off or on data from training set module 334 and subsequently stored in data storage module 338. In one embodiment, learning module 340 is designed for supervised and unsupervised learning and configured to generate one or more machine learning ensembles that exhibit the highest predictive performances. For example, machine learning module 332 may receive data sets of CLOSED tasks and data stored in data storage module 328 in order to utilize training set module 334 to generate and train a machine-learned model based on the received sensor data. It is to be understood that training set module 334 is configured to extract subsets of data from the CLOSED task data and the plurality of MF-enabled vendor-specific data from UPP module 312 allowing machine learning module 332 to perform data analytics on the subsets of data in an efficient manner. The learning module 332 is vendor-specific in order to avoid a conflict with competitive data in storage module 318. In one embodiment, a new machine is generated regularly by machine learning module 332, such as every month, week, or other period of time. Thus, the new machine-learned model may replace a previous machine-learned model and newly acquired or changed training data may be used to update the model.

Figure 50:
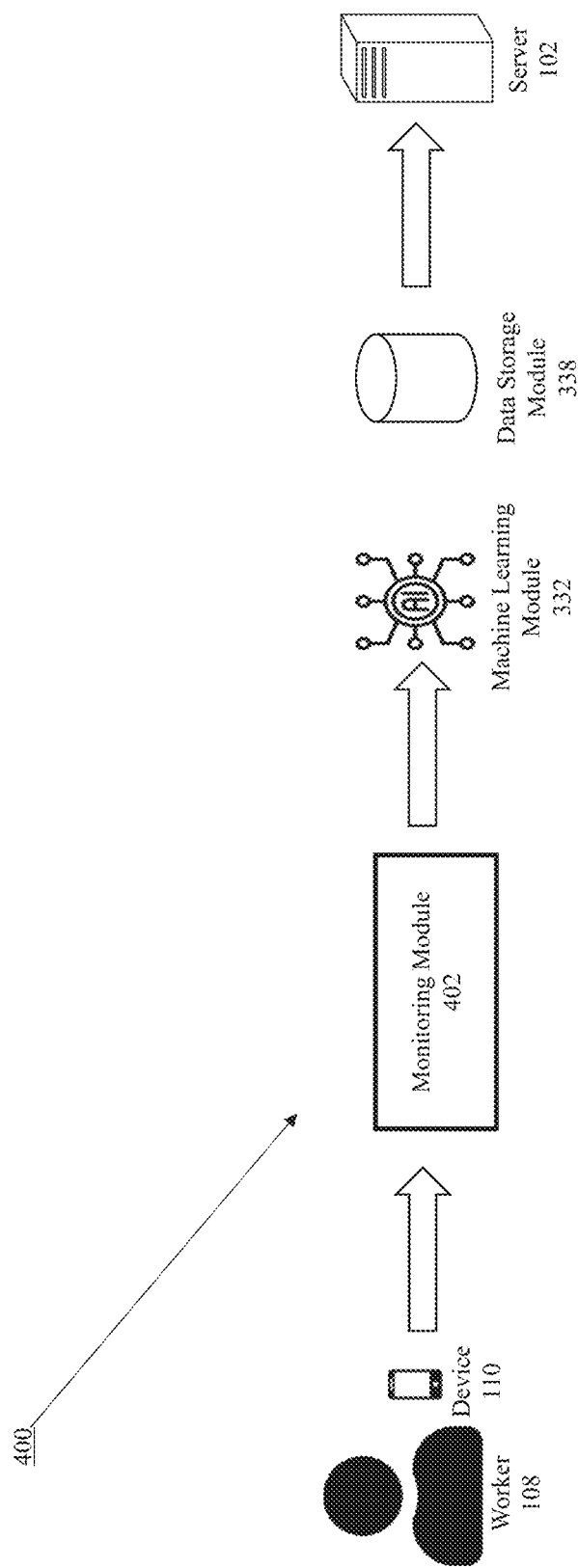
FIG. 50 diagrammatically illustrates the genial operation of the machine learning or artificial intelligence AI functionality of the ADS system.

Referring now to FIG. 50, an exemplary dataflow 400 depicting the aforementioned machine learning components associated with machine learning module 332 is presented, according to an embodiment. In one embodiment, system 100 may further include a worker monitoring module 402 (worker 108 representing a plurality or collection of workers or salespersons) configured to be communicatively coupled to server 102, tracking module 322, and machine learning module 332. It is to be understood that worker monitoring module 402 is configured to assist server 102 in tracking and monitoring the activities of work group 108 within customer facility 114.

In one embodiment, worker monitoring module 402 may be configured to receive group worker data from server 102 collected directly from the corresponding plurality of mobile computing devices 110 allowing worker monitoring module 402 to perform one or more analyses based on a plurality of interaction data relating to interactions between worker 112 and the plurality of geographic designators represented by customer facility 114.

In one embodiment, data and analyses generated by user monitoring module 402 is configured to be transmitted to machine learning module 332 for one or more machine learning techniques to be applied to the data and the resulting data subsequently being stored in data storage module 338 configured to function as a machine learning database. Machine learning module 332 utilizes the one or more predictions generated by prediction module 336 in order to assist learning module 340 with generating at least a scoring reflecting productivity of worker 108, 112 given similar CLOSED tasks by the group of workers. The productivity scoring is transmitted to server 102 and subsequently associated with MF-enabled vendor and possibly the customer facility 114. Ultimately, the productivity scoring and the suggested addition action items (or suggested deletion or consolidation of action items) is presented to the specific vendor.

Figure 51:
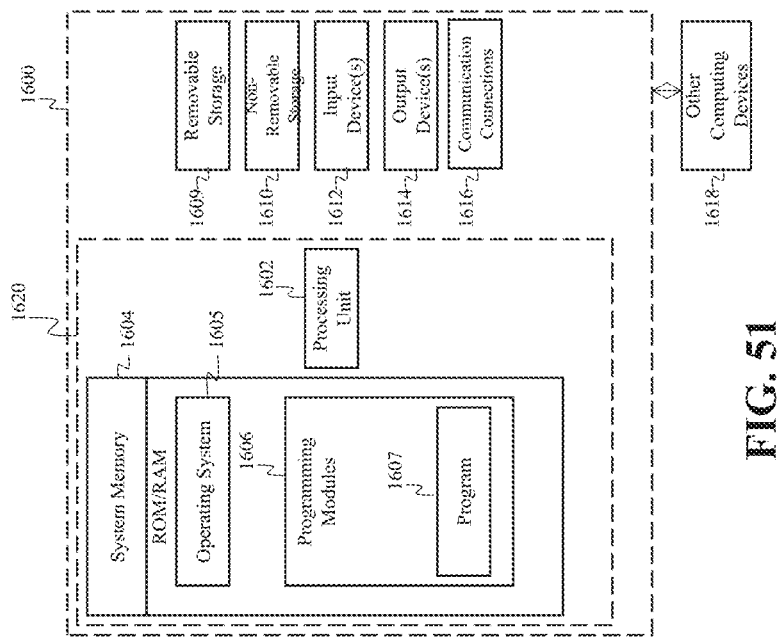
FIG. 51 diagrammatically illustrates the web-based server ADS system.

FIG. 51 is a block diagram of a system including an example computing device 1600 and other computing devices. Consistent with the embodiments described herein, the aforementioned actions performed by devices 110, 112, and server 102 may be implemented in a computing device, such as the computing device 1600 of FIG. 51. Any suitable combination of hardware, software, or firmware may be used to implement the computing device 1600. The aforementioned system, device, and processors are examples and other systems, devices, and processors may include the aforementioned computing device. Furthermore, computing device 1600 may include an operating environment for system 100 and processes/methods discussed hereinabove. These processes and data related to said processes may operate in other environments and are not limited to computing device 1600.

With reference to FIG. 51, a system consistent with an embodiment of the invention may include a plurality of computing devices, such as computing device 1600. In a basic configuration, computing device 1600 may include at least one processing unit 1602 and a system memory 1604. Depending on the configuration and type of computing device, system memory 1604 may include, but is not limited to, volatile (e.g. random access memory (RAM)), non-volatile (e.g. read-only memory (ROM)), flash memory, or any combination or memory. System memory 1604 may include operating system 1605, and one or more programming modules 1606. Operating system 1605, for example, may be suitable for controlling computing device 1600's operation. In one embodiment, programming modules 1606 may include, for example, a program module 1607 for executing the actions of server 102 and devices 110 and 112, for example. Furthermore, embodiments of the invention may be practiced in conjunction with a graphics library, other operating systems, or any other application program and is not limited to any particular application or system. This basic configuration is illustrated in FIG. 51 by those components within a dashed line 1620.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 51 by a removable storage 1609 and a non-removable storage 1610. Computer storage media may include volatile and nonvolatile, removable and non-removable media implemented in any method or technology for storage of information, such as computer readable instructions, data structures, program modules, or other data. System memory 1604, removable storage 1609, and non-removable storage 1610 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a camera, a touch input device, etc. Output device(s) 1614 such as a display, speakers, a printer, etc. may also be included. The aforementioned devices are only examples, and other devices may be added or substituted.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1604, including operating system 1605. While executing on processing unit 1602, programming modules 1606 (e.g., program module 1607) may perform processes including, for example, one or more of the stages of the processes described above. The aforementioned processes are examples, and processing unit 1602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

The claims appended hereto are meant to cover all modifications and changes within the scope and spirit of the present invention.

What is claimed is:

1. Computer implemented method for configuring and operating a workflow automation data structure for a vendor having a plurality of customers each with a geographically dispersed destination serviced by a plurality of mobile workers comprising:
   providing a cloud-based or web-based server coupled to a data store;
   providing each worker, of the plurality of workers, with a mobile device, the mobile device being a cell phone, a tablet or a computing device, providing a communications network which communicatively couples the mobile device to the server, each mobile device having a camera, a geolocation module generating geolocation data based upon the location of the mobile device, and an interactive display screen with perceptual inputs including at least a textual input and a tactile input;
   initially configuring and storing in the data store for one customer of the plurality of customers:
   an interactive worker main menu mobile device display with a horizontally bifurcated user interface (UI) display with first and second UI segments, the first UI segment displaying static displayable datasets including at least: (a) a customer dataset unique to the one customer Including customer name, destination address and contact data, and (b) a customer-related job or project type which is one job or project type (Type) of a plurality of job or project types, the one Type being preselected dependent upon a request for goods or services by the one customer;
   the first UI segment having a changeable displayable worker current-status indicator dataset based upon a real-time (RT) geolocation dataset captured by the server from a respective mobile device of an assigned worker of the plurality of workers, the assigned worker being one of a plurality of assigned workers engaging the interactive worker main menu mobile device display;
   the second UI segment having a plurality of worker interactive displayable datasets including (i) at least three required worker action items (R-actions) of a plurality of R-actions, all R-actions only being sequentially actuatably selectable by the assigned worker, and (ii) at least one optional worker action item (O-action) of a plurality of O-actions, the at least one O-action being actuatably selectable as needed by the assigned worker;
   the at least three R-actions required to fulfill the one Type, the at least three R-actions including: a first R-action representing an in transit to destination task event by the assigned worker, a second R-action related to a worker fulfillment task event of the one Type, and a third R-action representing either a completion action or a close action task event by the assigned worker;
   the at least one O-action being optionally selectable by the assigned worker as supplement fulfillment task events for the one Type for the one customer;
   a plurality of interactive sub-menu datasets including at least one of: (m) a work to perform (WP) sub-menu dataset including a WP textual input sub-segment, WP photo capture input, a WP photo image display sub-segment, or a WP tactile signature input sub-segment, (n) one goods-related (GR) sub-menu dataset from a group of GR sub-menu datasets including a parts-installed sub-menu dataset displaying a selectable list of potential parts to be installed, a parts-to-order sub-menu dataset displaying a selectable list of potential parts-to-order, and a goods-available for sale sub-menu dataset display a selectable list of potential goods for sale, or (o) a services to perform (SP) sub-menu data dataset including at least a SP textual input sub-segment or a SP sub-menu dataset displaying a selectable list of potential services to be provided and the installed;

the at least one of WP sub-menu, the one GR sub-menu, and the SP sub-menu related to the one Type and hierarchically below the at least three R-actions or the at least one O-action;
a completion/close action (CC) interactive sub-menu dataset for the completion action or close action task event, the CC sub-menu dataset including at least one of: a CC textual input sub-segment, a CC photo capture input, a CC photo image display sub-segment, or a CC tactile signature input sub-segment;
a time constraint and a location constraint which are both unique to the one customer, the time constraint based upon a respective temporal customer (Time) dataset imposed by the one customer as one destination limit, and the location constraint based upon a respective compulsory destination access or egress limitation (LOC) dataset based upon another destinational limit imposed by the one customer;
after initially configuring the data store, the server, interactively with the assigned worker's mobile (AW mobile) device;
generating a vendor back office multi-worker time-blocked schedule display for all assigned workers of the plurality of assigned workers associated with scheduled jobs or projects, each assigned worker of the plurality of assigned workers being displayed by a worker or task identifier in a respective assigned worker cell in the time-blocked schedule display in addition to customer or task data associated with each respective assigned worker, the time-blocked schedule conforming to the Time dataset for the one customer;
for the respective assigned worker, accepting a respective assigned worker actuation of the first R-action presenting the in transit to destination task event;
monitoring and accepting an updated RT geolocation data from the AW mobile device;
for the respective assigned worker, color-coding the respective assigned worker cell in the time-blocked schedule display with a first color-code upon the respective assigned worker's actuation of the first R-action showing the in transit task event;
for the respective assigned worker, changing the changeable displayable worker current-status indicator dataset on the AW mobile device to indicate the in transit event based upon an updated RT geolocation automation dataset transmitted to the AW mobile device;
for the respective assigned worker, changing the color-coding on the AW mobile device with a first R-action UI displayable dataset based upon the updated RT geolocation data;
for the respective assigned worker, accepting respective assigned worker actuation of the second R-action representing the worker fulfillment task event and: (q) further color-coding the respective assigned worker cell with a second color-code upon the respective assigned worker actuation of the second R-action, (r) downloading at least one or more of the WP sub-menu dataset, the GR sub-menu dataset or the SP sub-menu dataset to the AW mobile device, (s) accepting and storing, in the data store, corresponding second R-action data input, by the respective assigned worker into the AW mobile device, one or more of a supplemental WP sub-menu (sWP) dataset, a supplemental GR sub-menu (sGR) dataset or a supplement SP sub-menu (sSP) dataset, and (t) changing the color-coding on the AW mobile device with a second R-action UI displayable dataset based upon the respective assigned worker actuation of the second R-action and the downloading at least one or more of the WP sub-menu dataset, the GR sub-menu dataset or the SP sub-menu dataset;
accepting the respective assigned worker's optional selection of the at least one O-action and, in that event, downloading one or more of the WP sub-menu dataset, the GR sub-menu dataset or the SP sub-menu dataset to the AW mobile device, then accepting and storing in the data store corresponding O-action data input data by the respective assigned worker as sWP dataset, sGR dataset or sSP dataset;
in the event of the respective assigned worker optional selection of the at least on O-action, generating invoice data based upon the sWP, sGR, and sSP datasets;
accepting the respective assigned worker actuation of the third R-action representing either a completion action or a close action task event and; (v) color-coding the respective assigned worker cell with a third color-code, (w) downloading or activating the CC sub-menu dataset on the AW mobile device, (x) accepting and storing, in the data store, a corresponding third R-action data input, by the respective assigned worker which is one or more of a supplemental CC textual input (sCC-text); a supplemental CC photo input (sCC-photo), or a supplemental CC tactile signature input (sCC-sig), and (y) changing the color-coding on the AW mobile device with a third R-action UI displayable dataset based upon the storage of the one or more of the sCC-text, the sCC-photo, or the sCC-sig;
downloading supplemental invoice data to the AW mobile device based upon one or more of the sCC-text, the sCC-photo, or the sCC-sig.

2. The method for configuring and operating a workflow automation data structure as claimed in claim 1 wherein the plurality of job or project types includes a job or project type from the group of job or project types including a repair job, a generic service job, a sales presentation project, a maintenance service job, and a service call job.

3. The method for configuring and operating a workflow automation data structure as claimed in claim 1 wherein initially configuring and storing in the data store includes:
color-coding all non-completed R-actions, with a first color display, indicia for all non-completed R-actions in the worker interactive displayable datasets;
color-coding all optionally selectable respective assigned worker action O-actions, with a second color, indicia for all O-actions in the worker interactive playable datasets; and
after initially configuring the data store, the server changes the color-coding to a third color for all R-actions in the worker interactive displayable datasets after completion of the R-action, and downloads a third color R-action worker interactive displayable dataset to the AW mobile device.

4. The method for configuring and operating a workflow automation data structure as claimed in claim 1 wherein one or more of the WP sub-menu dataset, the GR sub-menu dataset or the SP sub-menu dataset may be a further R-action in addition to the three R-actions;
wherein the further R-action is sequentially actuatable after the second R-action related to the worker fulfillment task;
wherein the further R-action is a further worker interactive displayable dataset in the plurality of worker interactive displayable datasets in the second UI segment;

such that the further R-action is sequentially and hierarchically below the second R-action and access to a further R-action dataset is blocked until completion of the second R-action dataset.

5. The method for configuring and operating a workflow automation data structure as claimed in claim 1 wherein the perceptual inputs include a tactile alphanumeric input and a touch-activated input on the mobile device.

6. The method for configuring and operating a workflow automation data structure as claimed in claim 5 wherein the SCC-sig is a required input by the respective assigned worker actuation of the third R-action and the server accepts and stores the sCC-sig prior to downloading the supplemental invoice data, wherein the sCC-sig represents an electronic signature capture on the AW mobile device as indicia of completion of the one Type action.

7. The method for configuring and operating a workflow automation data structure a claimed in claim 6 wherein the WP sub-menu dataset includes an optional WP photo capture prior to the second R-action data input by the assigned worker into the AW mobile device.

8. The method for configuring and operating a workflow automation data structure as claimed in claim 7 wherein the sCC-photo is a required secondary input by the respective assigned worker actuation of the third R-action and the server accepts and stores the sCC-photo prior to downloading the invoice data, wherein the sCC-photo is indicia of completion of the one Type action.

9. The method for configuring and operating a workflow automation data structure as claimed in claim 8 wherein the Time dataset is an exclusionary time frame for the one customer and the server, in generating the time-blocked schedule display, excludes display of the assigned worker cell within the exclusionary time frame.

10. The method for configuring and operating a workflow automation data structure as claimed in claim 9 wherein the LOC dataset is one of a permissive destinational limit wherein the one customer permits mobile worker service at the one customer destination or one of an exclusionary destinational limit wherein the customer prohibits mobile worker service at the one customer destination; and wherein the server either; (j) converts the permissive destinational limit into a LOC exclusionary time frame and the server, in generating the time-blocked schedule display, excludes the display of the assigned worker cell within the LOC exclusionary time frame, or (k) converts the exclusionary destinational limit into the LOC exclusionary time frame and the server, in generating the time-blocked schedule display, excludes the display of the respective assigned worker cell within the LOC exclusionary time frame.

11. The method for configuring and operating a workflow automation data structure as claimed in claim 10 wherein, absent the one customer time or location preference data, the time constraint is a NULL dataset or the location constraint is a NULL dataset.

12. The method for configuring and operating a workflow automation data structure as claimed in claim 11 wherein, in the initial configuration of the data store, the third R-action represents the completion (Comp) action task event and the initial configuration of the data store includes a fourth R-action as the close action (Close) task event;

the CC interactive sub-menu dataset including a Comp sub-menu dataset and a Close sub-menu dataset;

wherein the CC textual input sub-segment, the CC photo capture input, the CC photo image display sub segment, or the CC tactile signature input sub-segment is respectively a Comp textual input sub-segment, a Comp photo capture input, a Comp photo image display sub-segment, or a Comp tactile signature input sub-segment;

wherein the sCC text, the sCC-photo, or the sCC-sig is respectively a supplemental Comp textual input (sComp-text), a supplemental Comp photo input (sComp-photo), or a supplemental Comp tactile signature input (sComp-sig);

wherein accepting the respective assigned worker actuation of the third R-action includes accepting and storing, in the data store, the sComp-text, the sComp-photo, or the sComp-sig;

wherein downloading the invoice data to the AW mobile device is based upon one or more of the sComp-text, sComp-photo, or sComp-sig;

wherein the initial configuration of the data store includes a payment portal sub-menu dataset;

wherein after initially configuring the data server;

accepting the respective assigned worker actuation of the fourth R-action and; (l) downloading the payment portal sub-menu dataset to the AW mobile device, (m) accepting and storing, in the data store, corresponding fourth R-action data input by the assigned worker into the AW mobile device as supplemental payment data, and (y) changing the color-coding on the AW mobile device with a fourth R-action UI displayable dataset based upon the storage of the payment data; and generating paid invoice data based upon the payment data.

13. The method for configuring and operating a workflow automation data structure as claimed in claim 12 including the at least three O-actions being optionally selectable by the respective assigned worker as supplement fulfillment task events for the one Type for the one customer;

the at least three O-actions including the WP sub-menu dataset, the one GR sub-menu dataset from the group of GR sub-menu datasets, or the SP sub-menu dataset;

wherein after initially configuring the data store, the server:

accepting the respective assigned worker's optional selection of the at least three O-actions includes downloading WP sub-menu dataset, the GR sub-menu dataset or the SP sub-menu dataset to the AW mobile device, then accepting and storing in the data store corresponding O-action data input data by the respective assigned worker as the sWP dataset, the sGR dataset or the sSP dataset;

in the event of a NULL dataset from one or all of the downloaded the sWP dataset, the sGR dataset or and the sSP dataset, the server storing a NULL indicator in the data store for the one Type.

14. The method for configuring and operating a workflow automation data structure as claimed in claim 9 wherein the first R-action representing the in transit to destination task event by the assigned worker includes an in transit worker interactive displayable dataset, and the data store is initially configured to display a route map to the assigned worker as a map sub-menu hierarchically below the first R-action actuation by the assigned worker.

15. The method for configuring and operating a workflow automation data structure as claimed in claim 1 wherein the Time dataset is an exclusionary time frame for the one customer and the server, in generating the time-block schedule display, excludes display of the assigned worker cell within the exclusionary time frame.

16. The method for configuring and operating a workflow automation data structure as claimed in claim 1 wherein the LOC dataset is one of a permissive destinational limit wherein the one customer permits mobile worker service at the one customer destination or one of an exclusionary destinational limit wherein the one customer prohibits mobile worker service at the one customer destination; and wherein the server either; (j) converts the permissive destinational limit into a LOC exclusionary time frame and the server, in generating the time-blocked schedule display, excludes the display of the assigned worker cell within the LOC exclusionary time frame, or (k) converts the exclusionary destinational limit into the LOC exclusionary time frame and the server, in generating the time-blocked schedule display, excludes the display of the respective assigned worker cell within the LOC exclusionary time frame.

17. The method for configuring and operating a workflow automation data structure as claimed in claim 1 wherein, in the initial configuration of the data store, the third R-action represents the completion (Comp) action task event and the initial configuration of the data store includes a fourth R-action as the close action (Close) task event;
- the CC interactive sub-menu dataset including a Comp sub-menu dataset and a Close sub-menu dataset;
- wherein the CC textual input sub-segment, the CC photo capture input, the CC photo image display sub-segment, or the CC tactile signature input sub-segment is respectively a Comp textual input sub-segment, a Comp photo capture input, a Comp photo image display sub-segment, or a Comp tactile signature input sub-segment;
- wherein the sCC-text, the sCC-photo, of the sCC-sig is respectively a supplemental Comp textual input (sComp-text), a supplemental Comp photo input (sComp-photo), or a supplemental Comp tactile signature input (sComp-sig)
- wherein accepting the respective assigned worker actuation of the third R-action includes accepting and storing, in the data store, the sComp-text, the sComp-photo, or the sComp-sig;
- wherein downloading the invoice data to the AW mobile device is based upon one or more of the sComp-text, sComp-photo, or the sComp-sig;
- wherein the initial configuration of the data store includes a payment portal sub-menu dataset;
- wherein after initially configuring the data store, the server;
- accepting the respective assig worker actuation of the fourth R-action and; (l) downloading the payment portal sub-menu dataset to the AW mobile device, (m) accepting and storing, in the data store, corresponding fourth R-action data input by the assigned worker into the AW mobile device as supplemental payment data, and (y) changing the color-coding on the AW mobile device with a fourth R-action UI displayable dataset based upon the storage of the payment data; and
- generating paid invoice data based upon the payment data.

18. The method for configuring and operating a workflow automation data structure as claimed in claim 1 including the at least three O-actions being optionally selectable by the assigned worker as supplement fulfillment task events for the one Type for the one customer;
- the at least three O-actions including the WP sub-menu dataset, the one GR sub-menu dataset from the group of GR sub-menu datasets, or the SP sub-menu dataset;
- wherein after initially configuring the data store, the server:
- accepting the assigned worker's of optional selection of the at least three O-actions includes downloading WP sub-menu dataset, the GR sub-menu dataset or the SP sub-menu dataset to the AW mobile device, then accepting and storing in the data store corresponding O-action data input data by the assigned worker as the sWP dataset, the sGR dataset or the sSP dataset;
- in the event of a NULL dataset from one or all of the downloaded the sWP dataset, the sGR dataset or the sSP dataset, the server storing a NULL indicator in the data store for the one Type;
- after initially configuring the data store for the one customer, the server initially configuring the data store for the plurality of customers for the vendor;
- the server, for the plurality of customers, generating the vendor back office multi-worker time-blocked schedule display for all assigned workers associated the plurality of customers having scheduled jobs or projects;
- accepting and storing, in the data store for the vendor and for the plurality of customers, the sWP datasets, the sGR datasets or the sSP datasets;
- organizing the sWP datasets, the sGR datasets or the sSP datasets by Type of job or project; and
- converting one or more of the three O-actions into R-actions for a respective Type of job or project when the sWP datasets, the sGR datasets or the sSP datasets by respective Type exceeds a predetermined statistical threshold.

* * * * *